(12) United States Patent
Walker et al.

(10) Patent No.: US 11,631,336 B1
(45) Date of Patent: *Apr. 18, 2023

(54) MULTIPLEXED COMMUNICATIONS FOR COORDINATION OF PILOTED AERIAL DRONES ENLISTED TO A COMMON MISSION

(71) Applicant: DRONEUP, LLC, Virginia Beach, VA (US)

(72) Inventors: Thomas Walker, Virginia Beach, VA (US); John Vernon, Virginia Beach, VA (US)

(73) Assignee: DRONEUP, LLC, Chesapeake, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/712,680

(22) Filed: Apr. 4, 2022

Related U.S. Application Data

(63) Continuation of application No. 16/936,932, filed on Jul. 23, 2020, which is a continuation of application
(Continued)

(51) Int. Cl.
*H04W 4/021* (2018.01)
*G08G 5/00* (2006.01)
(Continued)

(52) U.S. Cl.
CPC ......... *G08G 5/0095* (2013.01); *B64C 39/024* (2013.01); *G08G 5/0008* (2013.01);
(Continued)

(58) Field of Classification Search
None
See application file for complete search history.

(56) References Cited

U.S. PATENT DOCUMENTS 7,123,169 B2 10/2006 Farmer et al.
8,117,549 B2 2/2012 Reiner
(Continued)

FOREIGN PATENT DOCUMENTS

WO WO 2016/203322 A2 12/2016

OTHER PUBLICATIONS

Durfee, E. H., "Distributed Continual Planning for Unmanned Ground Vehicle Teams," AI Magazine, vol. 20, No. 4, 1999, 8 pages; https://www.aaai.org/ojs/index.php/aimagazine/article/view/1479.
(Continued)

*Primary Examiner* — Jenkey Van

(57) ABSTRACT

A method for coordinating multiplexed communications among multiple piloted assets enlisted to a common mission and multiple requestors includes defining a mission based on a mission request received from at least one requestor via a software application, receiving enrollment requests for multiple asset pilots, receiving indications of geolocations associated with the asset pilots, matching the geolocations to the mission, and sending invitations to mobile devices of the multiple asset pilots based on the matching. Upon receipt of indications of acceptance from the asset pilots, operating multiplexed communications among the asset pilots and the requestor. The multiplexing can include relaying a first mission-related data from mobile devices of the asset pilots to a mobile device of the requestor via a common communication channel, and relaying a second mission-related data from the mobile device of the requestor to the mobile devices of the asset pilot via the common communication channel.

21 Claims, 57 Drawing Sheets

Related U.S. Application Data

No. 16/146,734, filed on Sep. 28, 2018, now Pat. No. 10,741,088, which is a continuation of application No. 16/104,547, filed on Aug. 17, 2018, now abandoned.

(60) Provisional application No. 62/565,392, filed on Sep. 29, 2017.

(51) Int. Cl.
*B64C 39/02* (2023.01)
*H04W 4/06* (2009.01)
*H04W 4/44* (2018.01)

(52) U.S. Cl.
CPC ......... *G08G 5/0013* (2013.01); *G08G 5/0021* (2013.01); *G08G 5/0026* (2013.01); *H04W 4/022* (2013.01); *H04W 4/06* (2013.01); *B64C 2201/122* (2013.01); *H04W 4/44* (2018.02)

(56) References Cited

U.S. PATENT DOCUMENTS

| | | | |
|---|---|---|---|
| 8,644,512 B2 | 2/2014 | Khazan et al. | |
| 9,064,222 B2 | 6/2015 | Saad et al. | |
| 9,466,219 B1 * | 10/2016 | Stefani | G08G 5/0043 |
| 9,477,226 B2 | 10/2016 | Olson et al. | |
| 9,547,311 B2 | 1/2017 | Tamir et al. | |
| 9,560,493 B2 | 1/2017 | Yousefi'zadeh et al. | |
| 9,651,945 B1 | 5/2017 | Erickson et al. | |
| 9,685,088 B2 | 6/2017 | Trent et al. | |
| 9,688,399 B1 | 6/2017 | Dobbins | |
| 9,688,403 B2 | 6/2017 | Winn et al. | |
| 9,690,289 B2 | 6/2017 | Yang et al. | |
| 9,847,032 B2 | 12/2017 | Postrel | |
| 9,910,432 B1 | 3/2018 | Chambers et al. | |
| 9,922,282 B2 | 3/2018 | Weller et al. | |
| 9,927,807 B1 | 3/2018 | Ganjoo | |
| 9,933,780 B2 | 4/2018 | Chau et al. | |
| 9,959,773 B2 | 5/2018 | Raptopoulos et al. | |
| 10,036,648 B1 | 7/2018 | Hobbs et al. | |
| 10,271,261 B1 * | 4/2019 | Lindsley | H04W 40/12 |
| 10,741,088 B1 | 8/2020 | Walker et al. | |
| 10,872,533 B1 | 12/2020 | Walker et al. | |
| 11,436,931 B1 | 9/2022 | Walker et al. | |
| 2012/0231887 A1 | 9/2012 | Lee et al. | |
| 2013/0289858 A1 | 10/2013 | Mangiat et al. | |
| 2015/0025927 A1 * | 1/2015 | Hershey | G06Q 10/063112 705/7.14 |
| 2015/0234387 A1 | 8/2015 | Mullan et al. | |
| 2016/0111006 A1 | 4/2016 | Srivastava et al. | |
| 2016/0232721 A1 | 4/2016 | Singh et al. | |
| 2016/0125068 A1 | 5/2016 | Dongieux | |
| 2016/0247404 A1 | 8/2016 | Srivastava et al. | |
| 2016/0253908 A1 | 9/2016 | Chambers et al. | |
| 2016/0284221 A1 | 9/2016 | Hinkle et al. | |
| 2016/0307449 A1 | 10/2016 | Gordon et al. | |
| 2016/0357183 A1 | 12/2016 | Shaw | |
| 2016/0360562 A1 * | 12/2016 | Chong | H04W 4/024 |
| 2016/0370800 A1 * | 12/2016 | Chau | G05D 1/0011 |
| 2017/0076233 A1 | 3/2017 | Finn et al. | |
| 2017/0083979 A1 * | 3/2017 | Winn | G06Q 20/3224 |
| 2017/0092109 A1 | 3/2017 | Trundle et al. | |
| 2017/0206790 A1 | 7/2017 | Reddy et al. | |
| 2017/0277203 A1 | 9/2017 | Castillo-Effen et al. | |
| 2017/0304707 A1 | 10/2017 | Morton et al. | |
| 2018/0074520 A1 | 3/2018 | Liu et al. | |
| 2018/0093769 A1 | 4/2018 | Sequeira et al. | |
| 2018/0111682 A1 | 4/2018 | Kim | |
| 2018/0111683 A1 | 4/2018 | Di Benedetto et al. | |
| 2018/0220453 A1 * | 8/2018 | Johnston | H04W 74/0808 |
| 2018/0330624 A1 * | 11/2018 | Gong | H04W 12/64 |

OTHER PUBLICATIONS

Eick, V., "The Droning of the Drones. The increasingly advanced technology of surveillance and control," 2010, 12 pages; https://pdfs.semanticscholar.org/33fd/26f7cda465df4c3b8d066330b033ef9a2a91.pdf.

Erdelj, M. & Natalizio, E., "UAV-assisted disaster management: Applications and open issues," International Conference on Computing, Networking and Communications (ICNC 2016), Feb. 2016, Kauai, United States, pp. 1-5, 2016; 10.1109/ICCNC.2016.7440563; hal-01305371.

Maza, I. et al., "Multi-UAV Cooperation," Encyclopedia of Aerospace Engineering, Online Dec. 2015, 10 pages; doi: 10.1002/9780470686652.eae1130.

Mohamed, N. et al., "A Service-Oriented Middleware for Building Collaborative UAVs," J Intell Robot Syst, 74(1-2), 2014, 14 pages; doi: 10.1007/s10846-013-9942-3.

Scherer, J. et al., "An Autonomous Multi-UAV System for Search and Rescue," Proceedings of the First Workshop on Micro Aerial Vehicle Networks, Systems, and Applications for Civilian Use, May 2015, 6 pages; https://pervasive.aau.at/publications/pdf/Scherer_DroNet2015.pdf.

Waharte, S. et al., "Supporting Search and Rescue Operations with UAVs," 2010, 6 pages; https://www.scribd.com/document/340565535/supporting-search-and-rescue-operations-with-uav.

Zeng, Y. et al., "Wireless Communications with Unmanned Aerial Vehicles: Opportunities and Challenges," 15 pages; arXiv:1602.03602v1 Feb. 11, 2016.

U.S. Appl. No. 16/936,932, filed Jul. 23, 2020.
U.S. Appl. No. 17/128,806, filed Dec. 21, 2020.

* cited by examiner

| Mission ID | Mission Name | Requestor ID | Mission Geographic Region | Piloted Asset #1 ID | Operator/Pilot #1 ID | Piloted Asset #2 ID | Operator/Pilot #2 ID | Piloted Asset #3 ID | Operator/Pilot #3 ID |
|---|---|---|---|---|---|---|---|---|---|
| 1 | Lost Dog A | A100 | (40° N, 75° W) | 72ABC | H0HHX1 | 54LMN | DXDDX1 | | |
| 2 | Lost Child A | A101 | (42° N, 73° E) | 55AAA | C6CCY6 | 44BBB | W11WA | 44KKL | W2ZWA |
| 3 | Disaster Relief A | A102 | (20° N, 95° W) | 66XYZ | F0FFX1 | 22PQA | G1GG4 | 211LM | A4AA5 |
| 3 | Disaster Relief A | A103 | (20° N, 95° W) | 66XYZ | F0FFX1 | 22PQA | G1GG4 | 211LM | A4AA5 |
| 3 | Disaster Relief A | A104 | (20° N, 95° W) | 66XYZ | F0FFX1 | 22PQA | G1GG4 | 211LM | A4AA5 |
| 3 | Disaster Relief A | A105 | (20° N, 95° W) | 66XYZ | F0FFX1 | 22PQA | G1GG4 | 211LM | A4AA5 |
| 3 | Disaster Relief A | A106 | (20° N, 95° W) | 66XYZ | F0FFX1 | 22PQA | G1GG4 | 211LM | A4AA5 |
| 4 | Land Survey A | A107 | (35° N, 45° W) | 11DEF | H5HHX5 | 99ABC | H2HHX8 | 5STRW | 1SLL7 |
| 4 | Land Survey A | A108 | (35° N, 45° W) | 11DEF | H5HHX5 | 99ABC | H2HHX8 | 5STRW | 1SLL7 |
| 4 | Land Survey A | A109 | (35° N, 45° W) | 11DEF | H5HHX5 | 99ABC | H2HHX8 | 5STRW | 1SLL7 |
| 5 | Disaster Relief B | A110 | (18° N, 72° W) | 11BRT | B1BBX9 | 55QRS | E9EEX7 | 618LM | Z1ZZX4 |
| 6 | Lost Child B | A111 | (40° N, 65° W) | 54LMN | DXDDX1 | | | | |
| 6 | Lost Child B | A112 | (40° N, 65° W) | 54LMN | DXDDX1 | | | | |
| 6 | Lost Child B | A113 | (40° N, 65° W) | 54LMN | DXDDX1 | | | | |

MULTIPLEXED COMMUNICATIONS FOR COORDINATION OF PILOTED AERIAL DRONES ENLISTED TO A COMMON MISSION

CROSS-REFERENCE TO RELATED APPLICATIONS

This application is a continuation of co-pending U.S. patent application Ser. No. 16/936,932, filed Jul. 23, 2020 and titled "Multiplexed Communications for Coordination of Piloted Aerial Drones Enlisted to a Common Mission," now U.S. Pat. No. 11,436,931, issued Sep. 6, 2022; which is a continuation of U.S. patent application Ser. No. 16/146,734, filed Sep. 28, 2018 and titled "Multiplexed Communications for Coordination of Piloted Aerial Drones Enlisted to a Common Mission," now U.S. Pat. No. 10,741,088, issued Aug. 11, 2020; which is a continuation of U.S. patent application Ser. No. 16/104,547, filed Aug. 17, 2018 and titled "Multiplexed Communications for Coordination of Piloted Aerial Drones Enlisted to a Common Mission," which claims priority to and the benefit of U.S. Provisional Patent Application No. 62/565,392, filed Sep. 29, 2017 and titled "GAMPS Dynamically Improve the Management of Drone Operators and Other Critical Resources"; the entire contents of each of the foregoing applications are incorporated herein by reference in their entireties. This application is related to U.S. patent application Ser. No. 16/146,758, filed Sep. 28, 2018 and titled "Multiplexed Communications of Telemetry Data, Video Stream Data and Voice Data Among Piloted Aerial Drones Via a Common Software Application," now U.S. Pat. No. 10,872,533, issued Dec. 22, 2020; the entire contents of which are incorporated herein by reference in their entirety.

FIELD

The disclosure herein describes methods and apparatus for coordinating multiplexed communications among piloted assets such as aerial drones.

BACKGROUND

Unmanned aerial vehicles (UAVs), commonly referred to as drones, are aircraft that are operated without a human pilot onboard. Drones can be piloted autonomously via onboard computers, or remotely controlled by human operators.

SUMMARY

In some embodiments, a method for coordinating multiplexed communications among multiple piloted assets enlisted to a common mission and multiple requestors includes receiving a mission request from a mobile device of a first requestor via a software application (or "app"), and defining a mission based on the mission request via the software application. Enrollment requests (also referred to herein as "enlistment requests") for first and second asset pilots, and indications of geolocations associated with the first and second asset pilots, are received via the software application. The method also includes matching each geolocation to a characteristic of a mission. For example, the matching can be based on one or more of: geolocations adequately matching mission needs, organizations associated with the piloted asset(s), asset type associated with the piloted asset(s), or filtering (e.g., based on piloted asset credentials, operator/pilot credentials, mission identifiers included in the enrollment requests, etc. For example, the matching can be based on a geographic area associated with the mission and a first geolocation at least partially overlapping with a geographic area associated with a second geolocation. Alternatively or in addition, the matching can be based on a determination that the first asset is controlled by a first organization and the second asset is controlled by a second organization different from the first organization. Alternatively or in addition, the matching can be based on a determination that an asset type of the first asset is different from an asset type of the second asset. Alternatively or in addition, the matching can be based on filtering of the mission requests, for example based on one or more credentials of the piloted assets and/or their associated operator/pilots. Alternatively or in addition, the matching can be based on a taxonomy, the taxonomy including tabular data including (1) representations of capabilities and (2) associations between (i) each of the first asset pilot and the second asset pilot and (ii) the capabilities. An invitation to participate in the mission is sent, via the software application, to each of the first asset pilot and the second asset pilot based on the matching. In response to receiving indications of acceptance from mobile devices of the first asset pilot and the second asset pilot via the software application, data can be stored, indicating that each of the first asset pilot and the second asset pilot is mission-enlisted, and multiplexed communications can be coordinated among the first asset pilot, the second asset pilot, and multiple requestors including the first requestor. The coordinating of the multiplexed communications can include receiving signals encoding first mission-related data from each of the mobile device of the first asset pilot and the mobile device of the second asset pilot via associated communication channels from a plurality of communication channels, sending signals encoding the first mission-related data to mobile devices of the multiple requestors via a first plurality of further communication channels from the plurality of communication channels, receiving signals encoding a second mission-related data from the mobile devices of the multiple requestors via a second plurality of further communication channels from the plurality of communication channels, and sending a signal encoding the second mission-related data to at least one of the first asset pilot and the second asset pilot via a further communication channel from the plurality of communication channels.

BRIEF DESCRIPTIONS OF THE DRAWINGS

FIG. 5 is an example table for coordinating multiplexing communications, according to an embodiment.

Figure 32:
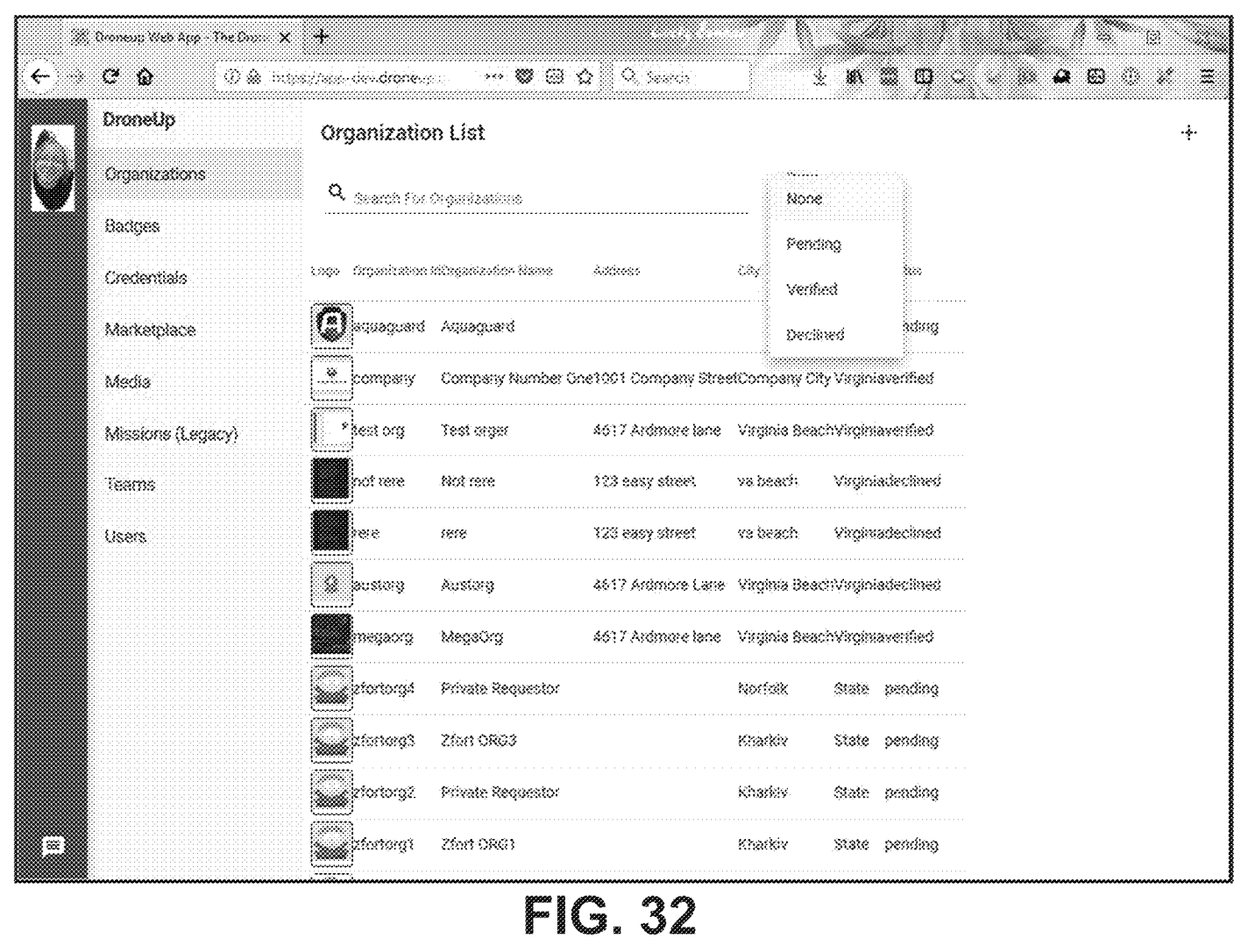

FIG. 32 is a web interface screenshot showing options for filtering an organizations list, viewable via an administrator view of a software application, according to an embodiment.

FIG. 54 is a web interface screenshot showing a Marketplace entry sort feature, viewable via an administrator view of a software application, according to an embodiment.

Figure 66:
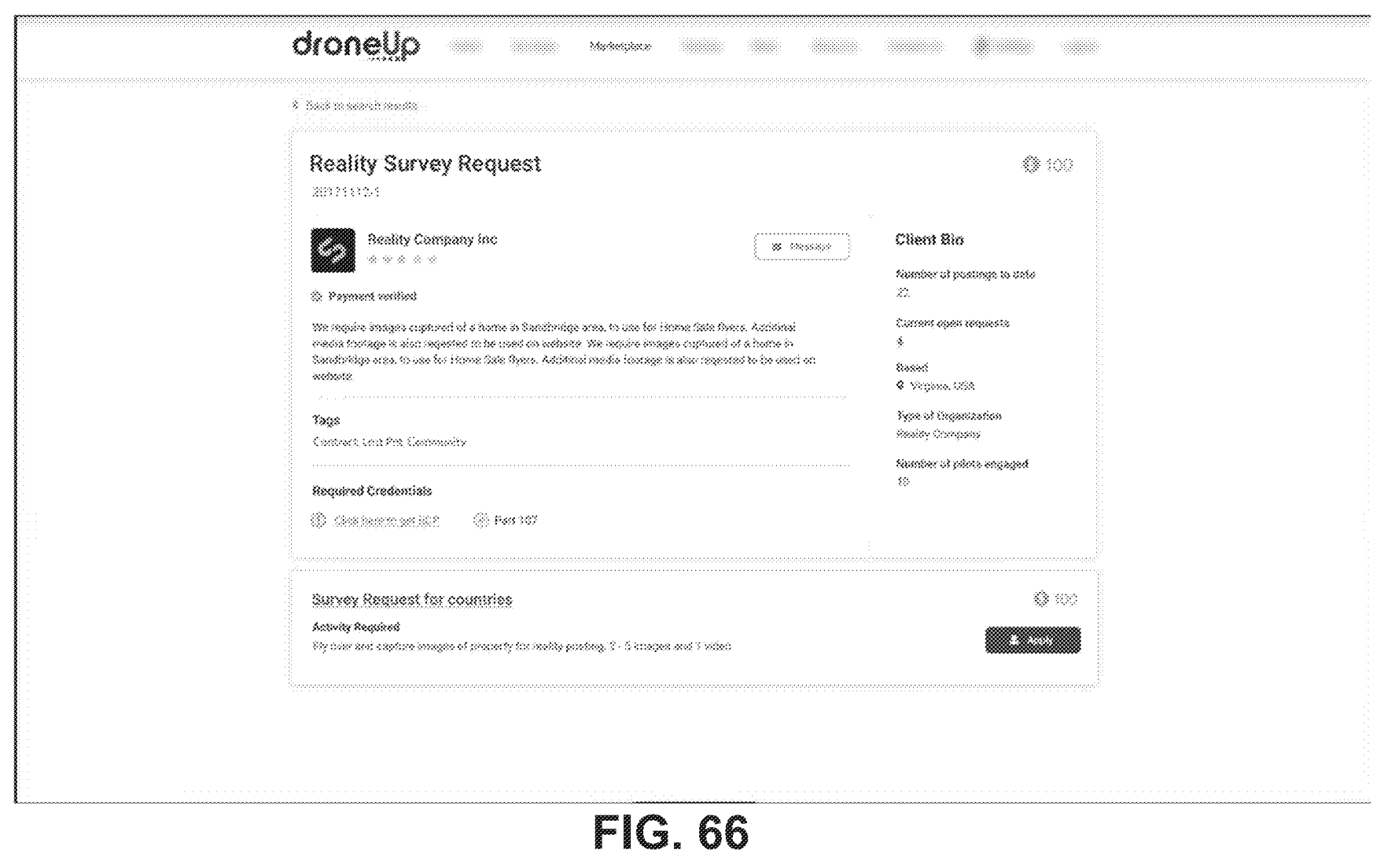

FIG. 66 is a web interface screenshot showing a Marketplace request, viewable via an administrator view of a software application, according to an embodiment.

DETAILED DESCRIPTION

Figure 1:
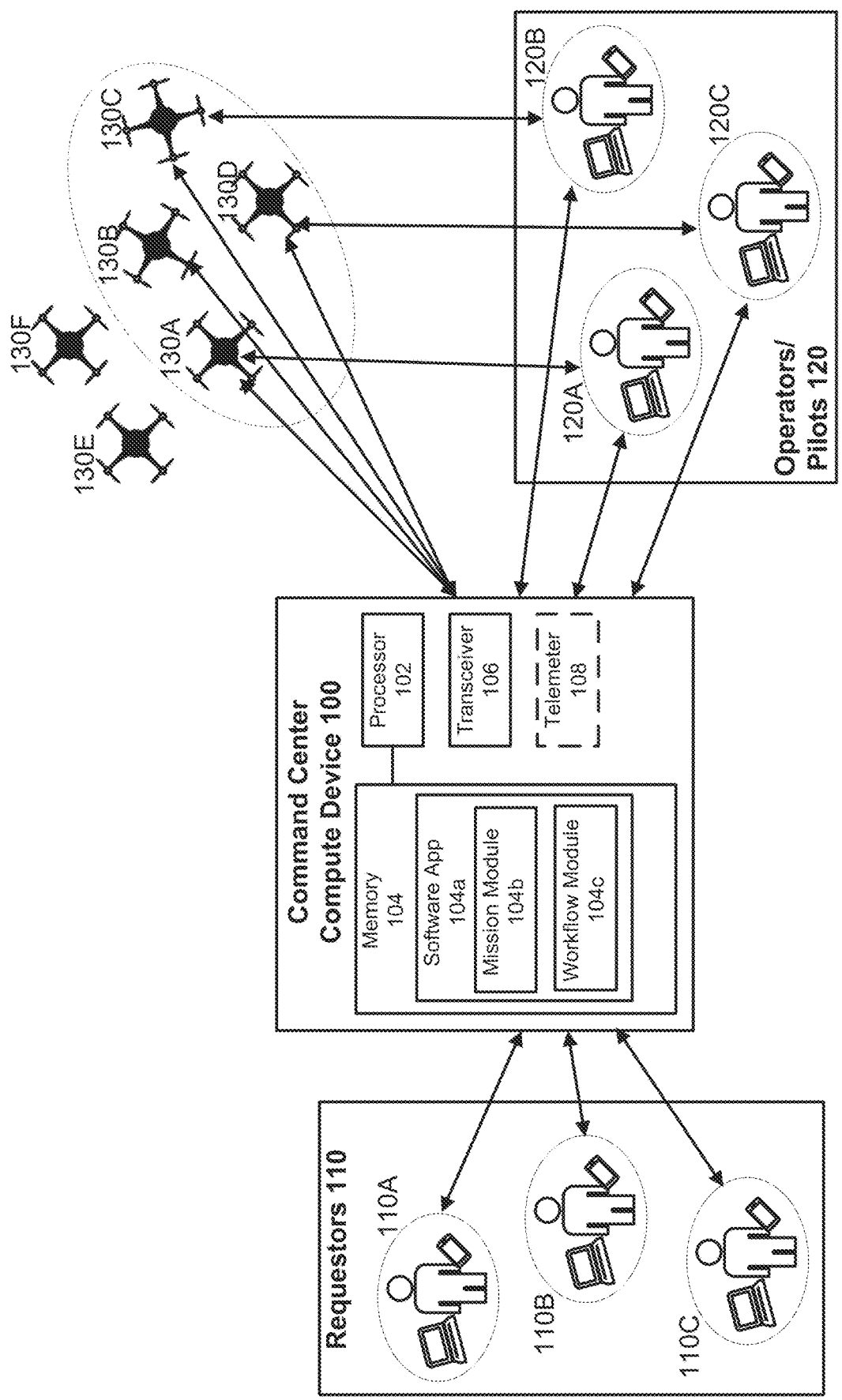
FIG. 1 is a system block diagram including a centralized compute device and a fleet of mission-deployed, piloted assets, according to an embodiment.

Unmanned aerial vehicles (UAVs) are commonly used in civilian, commercial, military and aerospace applications. Examples of such applications include reconnaissance, surveillance (e.g., for law enforcement), surveying, and disaster relief. Existing systems for managing UAV operations are typically "stove-piped," in that they rely on multiple and manual communications among disparate organizations, for example to avoid collisions within an airspace. Resource allocation within such known systems is often ad-hoc and inefficient. Also, many UAVs are each pre-programmed for autonomous flights to/from a destination without modification to their path.

The present disclosure sets forth systems and methods for coordinating multiplexed communications between piloted assets and other entities, such as mission requestors, operator/pilots, and system administrators (each of the foregoing of which may be referred to as "mission participants"), via a single, common software application. Using dynamic geo-fencing, complex metadata filtering, and/or other data models, UAV operators (or "pilots") can be assigned missions (e.g., including one or more tasks), be granted access to encrypted communication channels, and/or gather critical data for storage and analysis as needed. By using a single, common software application, comprehensive situational awareness of an aerial drone mission can be achieved, and a variety of improvements to the efficiency and data quality of the mission can be realized. For example, flight path modifications can be made in real-time or substantially real-time, in response to new data or requests relayed to the aerial drones from requestors or administrators, and airspace management and collision avoidance can be streamlined. In some implementations, communications among mission participants occur via a centralized control station that is hosting the software application, in real-time or substantially real-time during a mission, e.g., between multiple aerial drones and multiple mission requestors, in a "many-to-many" relationship. Since all participants can monitor and interact with aerial drones assigned to a mission as the mission is carried out, resource allocation decisions can be made in a highly efficient and expedient manner. For example, when a mission objective is achieved, some or all of the aerial drones can be de-enlisted and redeployed to another mission. Also, resource allocation can be dynamically refined in response to dynamically changing mission needs. For example, when an aerial drone not currently assigned to the mission is determined to be positioned at a preferable geolocation or to be a better match to mission credentials than an existing participant drone, a swapping out of those two drones can be performed, to improve safety and/or an outcome of the mission.

In some implementations, an aerial asset pilot can complete the federal aviation administration (FAA) drone certification process using the system, and/or the system can verify the existence of an existing FAA drone certification for an aerial asset pilot.

As used herein, the terms "pilot," "operator," and "user" are used interchangeably, and refer to the individual most directly controlling the movements of a piloted asset during a mission. Also, as used herein, the terms "drone," "aerial asset," and "piloted aerial asset" are used interchangeably. A "piloted asset" refers to any asset that can be remotely controlled by an operator/pilot, including but not limited to land rovers, robots, aircraft, space probes, submarines, remote control vehicles (RCV), drone carriers, hovercycles, etc. Example piloted assets compatible with the methods and systems set forth herein include, but are not limited to, fixed-wing drones, single-rotor rotary drones, multi-rotor rotary drones (e.g., tricopter, quadcopter, hexacopter, octocopter, etc.). Suitable drones can be of any size (e.g., very small, mini, medium, or large) and range (very close range (i.e., up to 45 km), close range (i.e., up to 55 km), short range (i.e., up to 150 km), mid-range (i.e., up to 650 km), or endurance (i.e., up to 36 hours of flight time up to a maximum height of 3,000 feet). Suitable drones can be of any type or "ability," including but not limited to, GPS drones, ready-to-fly (RTF) drones, trick drones, helicopter drones, deliver drones, photography drones, racing drones, alternative-powered drones, etc. Systems and methods set forth herein can be used for drone flight management, first responder task assignment, geospatial visualization, and resource and volunteer management.

Drones of the present disclosure can be equipped with one or more sensors or other devices for gathering data that may subsequently be communicated via the multiplexed communications system. Examples of such sensors include, but are not limited to, location sensors, GPS modules, accelerometers, gyroscopes or other flight stabilizers, cameras, thermal optics, temperature sensors, microphones, altimeters, and barometers. Drones of the present disclosure also include communication interfaces for linking to one or more dedicated communications channels for sending sensor data and receiving sensor adjustment instructions, and communication interfaces for communicating with associated operator/pilots.

Note that although the systems and methods described herein are often discussed in the context of drones and drone pilots, it should be understand that systems and methods described herein can be used with other types of assets and operators. Such non-drone assets include, for example, land rovers, robots, space probes, submarines, remote control vehicles (RCV), hovercycles, etc.

Systems and methods set forth herein are suitable for coordinating missions for a wide range of applications, including (but not limited to): public safety-related missions (e.g., neighborhood watch), disaster relief, location of lost assets, location of lost pets, location of lost children, location of fugitives, law enforcement, crime prevention, counter-terrorism, aerial surveillance, filmmaking, journalism, scientific research, surveying (e.g., of natural or man-made disaster after-effects and remediation processes, or of land for real estate development or sales purposes), cargo transport, agriculture, reconnaissance, warfare, demining, target practice, archeology, conservation (e.g., pollution monitoring, anti-poaching), real-estate inspections, inspections and/or assessments for insurance claim investigation, inspection of cell towers and/or other remote structures, pest control (e.g., assess population of mosquitoes), and/or the like.

In some implementations, a system of the present disclosure includes a command center (or "base station") compute device, multiple mission requestors ("requestors") with associated compute devices (e.g., mobile devices), multiple piloted aerial assets (e.g., "drones"), and multiple mission requestors ("requestors") with associated compute devices (e.g., mobile devices). The command center compute device includes a processor, a memory operably coupled to the processor, and a transceiver. The memory can store digital assets (e.g., image content, video content, file content, etc.) for subsequent distribution, transformation and/or delivery thereof. The memory can also store program instructions (e.g., a software application or "app"). The software application can include multiple software modules including programmed instructions to cause the processor to execute sequences of steps. The system can be configured to operate and coordinate multiplexed communications, in a one-to-many, many-to-one, or many-to-many manner, using a single, common software application. By way of illustration, an example mission for which one-to-many multiplexed communications may be suitable is a land surveying mission that is requested by a real-estate developer ("one" requestor) and carried out by multiple piloted aerial assets ("many" piloted aerial assets having "many" associated operator/pilots). An example mission for which many-to-one multiplexed communications may be suitable is a lost child mission that is requested by two parents ("many" requestors) and carried out by one piloted aerial asset ("one" piloted aerial asset having "one" associated operator/pilot). An example mission for which many-to-many multiplexed communications may be suitable is a disaster relief mission that is requested by multiple disaster relief organizations and multiple media-related organizations ("many" requestors) and carried out by multiple piloted aerial assets ("many" piloted aerial assets having "many" associated operator/pilots).

The single, common software application can be interacted with by each system participant via a different "view" thereof. For example, an administrator managing the central computer (i.e., command center or base station) can access data of the software application via an "administrator view" (i.e., a graphical user interface (GUI) specific for the data viewed by the administrator) of the software application. The administrator view can have a first "look and feel" and a first set of capabilities (e.g., as defined by enabled functionality security settings, data privileges, etc.). An operator or pilot of an aerial asset can access data of the software application via an "operator view" (i.e., a GUI specific for the data viewed by an operator/pilot) of the software application. The operator view can have a second "look and feel" different from the first "look and feel," and a second set of capabilities (e.g., as defined by enabled functionality security settings, data privileges, etc.) different from the first set of capabilities. A requestor of a mission (e.g., a customer who seeks to "hire" a fleet of piloted aerial assets to accomplish a task) can access data of the software application via a "requestor view" (i.e., a GUI specific for the data viewed by a requestor) of the software application. The requestor view can have a third "look and feel" different from the first and/or second "look and feel," and a third set of capabilities (e.g., as defined by enabled functionality security settings, data privileges, etc.) different from the first and/or second set of capabilities.

As used in this specification, the singular forms "a," "an" and "the" include plural referents unless the context clearly dictates otherwise. Thus, for example, the term "an audio input port" is intended to mean a single audio input port or a combination of multiple audio input ports.

FIG. 1 is a system block diagram including a centralized compute device and a fleet of mission-deployed, piloted assets, according to an embodiment. As shown in FIG. 1, the system includes a command center compute device 100, multiple requestors 110 (110A-110C) with associated compute devices (e.g., mobile devices), multiple operators/pilots 120 (120A, 120B, 120C) with associated compute devices (e.g., mobile devices), and multiple piloted aerial assets 130A-130F (e.g., "drones"). The command center compute device 100 includes a processor 102, a transceiver 106, an optional telemeter 108, and a memory 104 storing a software application 104a having software modules, including at least a mission module 104b and a workflow module 104c. The memory 104 can be any appropriate type of fixed and/or removable storage device. The memory can be, but is not limited to, a tape, digital-video-disk (DVD), digital-video-cassette (DVC), random-access-memory (RAM), solid-state drive (SSD), flash memory and/or hard disk drive. Although shown and described as being implemented in software, the modules of the software application 104a can alternatively or additionally be implemented in hardware. Hardware components of the command center compute device 100 can include, for example, one or more application specific integrated circuits (ASICs), central processing units (CPUs), field programmable gate arrays (FPGA), modules, digital signal processors (DSPs), processors and/or co-processors, which may be configured to perform functions specifically related to coordinating multiplexed communications between system participants. In some embodiments, the command center compute device 100 can include other software and/or hardware modules to perform other processing functions such as, for example, encoding, decoding, compression, decompression, scheduling, indexing, splitting, stabilization, synchronization and/or formatting of received signals.

The command center compute device 100 is configured for bidirectional communication (e.g., via the transceiver) with each of the piloted aerial assets 130A-130F, with compute devices of each of the requestors 110, and with compute devices of each of the operators/pilots 120. The command center compute device 100 may be interacted with and/or managed by one or more system administrators. The specific piloted aerial assets of the multiple piloted aerial assets 130A-130F with which the command center compute device 100 is actively communicating at any given time can be mission dependent, or dependent upon a mission status at that given time. For example, the command center compute device 100 may only be actively communicating with a subset of the piloted aerial assets 130A-130F (e.g., piloted aerial assets 130A-130D, as shown by the dashed circling in FIG. 1) at a given time when only piloted aerial assets 130A-130D are currently assigned (or "enlisted") to a mission. During operation, the piloted aerial assets assigned to the mission can change, in which event the command center compute device 100 may automatically modify its communication settings such that it communicates with a different subset of the piloted aerial assets 130A-130F.

Given the manifold communication capability of the command center compute device 100, a "many-to-many" communications relationship can be established between any participant in the system with any other participant of the system. As used herein, a "participant" refers to any of the requestors 110, the operators/pilots 120, the piloted aerial assets 130A-130F, and the one or more administrators of the command center compute device 100. Each communication between the command center compute device and each of the piloted aerial assets 130A-130F, the compute devices of each of the requestors 110 and the compute devices of each of the operators/pilots 120 can include one or more of: cellular communication (i.e., 3G, 4G, 5G, etc.), radio frequency (RF), WiFi®, or the like. Each of the operators/pilots 120 is associated with one or more compute devices (e.g., mobile device, laptop, etc.) configured to communicate directly with an associated one or more of the piloted aerial assets 130A-130F via one or more of: cellular communication (i.e., 3G, 4G, 5G, etc.), radio frequency (RF), WiFi®, or the like.

Figure 2:
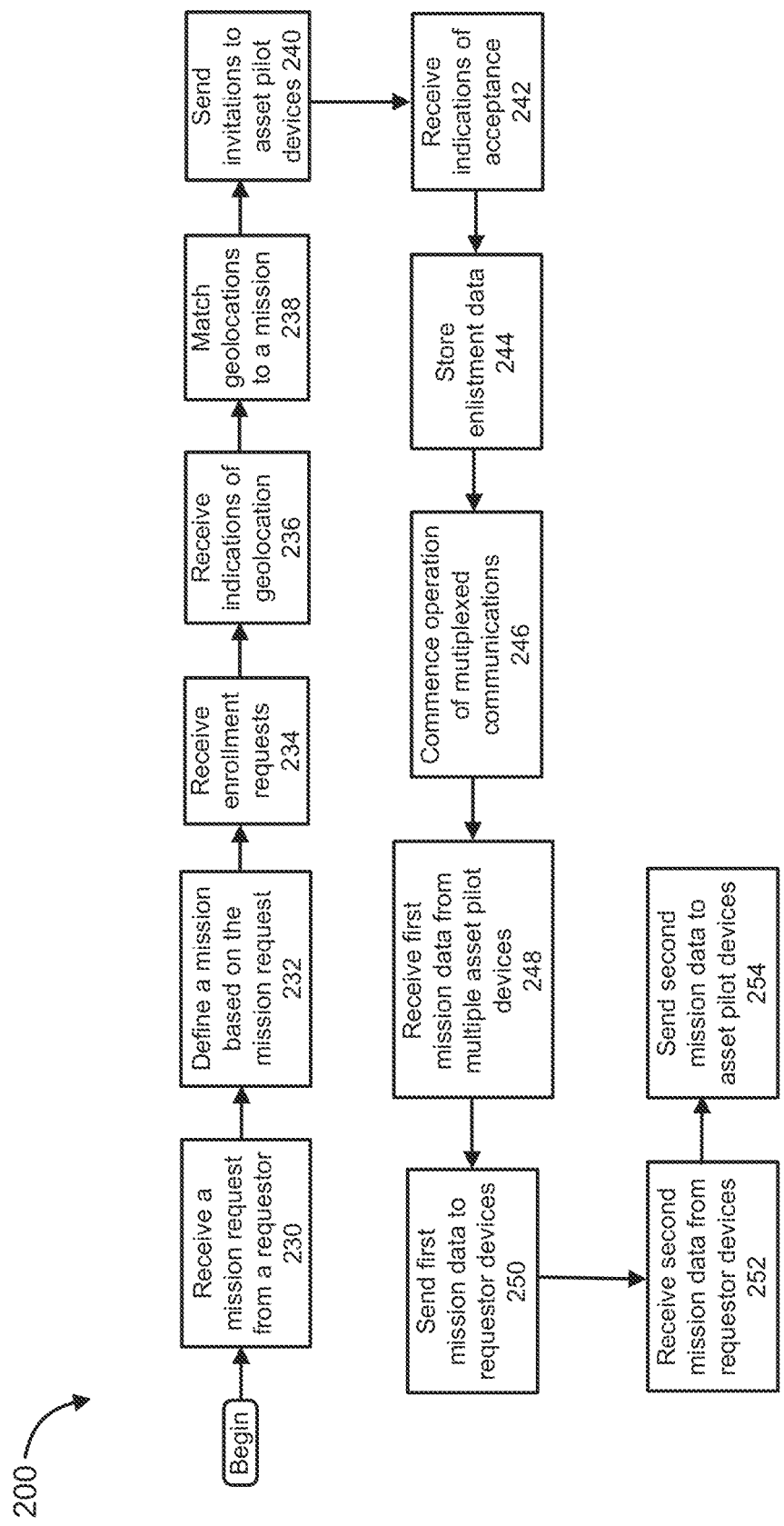
FIG. 2 is a flowchart that illustrates a method for coordinating multiplexed communications for piloted assets enlisted to a common mission, according to an embodiment.

FIG. 2 is a flowchart that illustrates a method for coordinating multiplexed communications among multiple piloted assets enlisted to a common mission and multiple requestors, according to an embodiment. As shown in FIG. 2, the method 200 includes receiving, via a common software application, a mission request at 230 from a mobile device or other compute device of a requestor. At 232, a mission is defined based on the mission request. A mission can have a "mission type" associated with it, examples of which include, but are not limited to, non-marketplace, marketplace, alert, commercial, community, invitation-only, and search. Missions can include one or more tasks, each of which can be associated with a "task type." Example task types include, but are not limited to, open and private. In some cases, private tasks do not appear in a marketplace interface. At 234, enrollment requests for multiple asset pilots (e.g., a first asset pilot and a second asset pilot) are received via the software application. The enrollment requests can include one or more of: an indicator of one or more missions, indicators of one or more capabilities of the piloted asset and/or its associated operator/pilot, etc.

Indications of geolocations associated with the asset pilots are received at 236, and the geolocations are matched, at 238, to the mission. The matching can be based on one or more of: geolocations adequately matching mission needs, organizations associated with the piloted asset(s), asset type associated with the piloted asset(s), or filtering (e.g., based on piloted asset credentials, operator/pilot credentials, mission identifiers included in the enrollment requests, etc.). For example, the matching can be based on a geographic area associated with the mission and a first geolocation at least partially overlapping with a geographic area associated with a second geolocation. Alternatively or in addition, the matching can be based on a determination that the first asset is controlled by a first organization and the second asset is controlled by a second organization different from the first organization. Alternatively or in addition, the matching can be based on a determination that an asset type of the first asset is different from an asset type of the second asset. Alternatively or in addition, the matching can be based on filtering of the mission requests, for example based on one or more credentials of the piloted assets and/or their associated operator/pilots.

Based on and/or in response to the matching, invitations are sent (240) to mobile devices (or other compute devices) of the multiple asset pilots. In some implementations, the matching can be based on a taxonomy having tabular data including (1) representations of capabilities and (2) associations between (i) each of the first asset pilot and the second asset pilot and (ii) the capabilities. An example taxonomy definition is provided herewith as Appendix A. Upon receipt of indications of acceptance from the asset pilots at 242, enlistment data is stored at 244 and multiplexed communications among the asset pilots and the requestor commences at 246. In some embodiments, steps 234 through 242 can be referred to as an "enlistment process." The multiplexing can include relaying a first mission-related data, received (at 248) from mobile devices of the asset pilots, to a mobile device of the requestor (at 250) via multiple communication channels. The multiplexing can also include relaying a second mission-related data, received at 252 from the mobile device of the requestor, to the mobile devices of the asset pilots (at 254) via multiple communication channels. The mission request and the second mission-related data can be received in response to associated inputs via a requestor view of the software application. One or more of the defining the mission, the matching, and the sending of the invitations can be performed in response to associated inputs via an administrator requestor view of the software application. One or more of receiving the enrollment requests and receiving the first mission-related data can be in response to associated inputs via an operator view of the software application.

Figure 3:
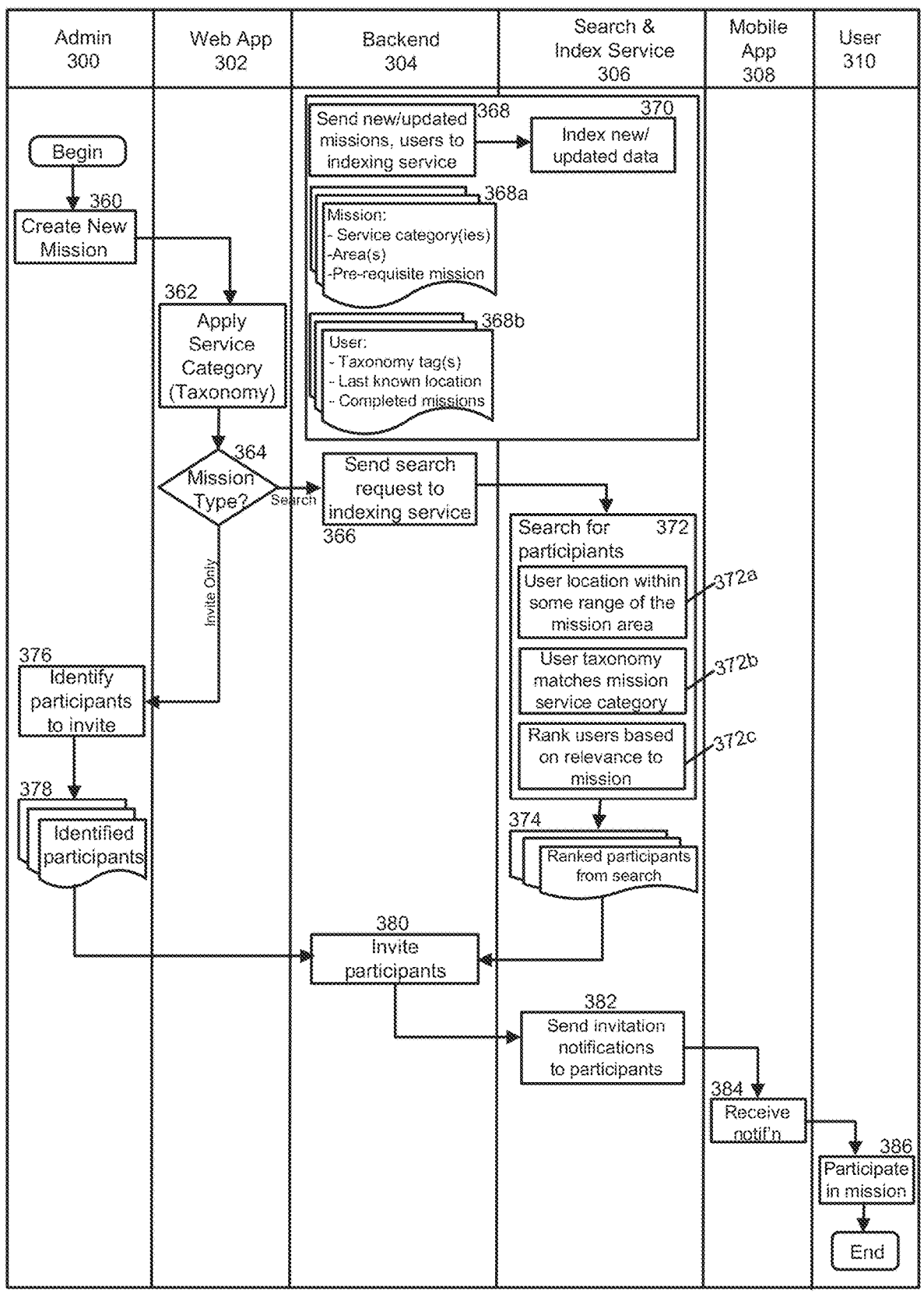
FIG. 3 is a diagram illustrating method for enlisting piloted asset participants to a common mission, according to an embodiment.

FIG. 3 is a diagram illustrating a method for enlisting piloted asset participants to a common mission, according to an embodiment. As shown in FIG. 3, the method begins with the creation (or definition) of a new mission (at 360), e.g., automatically or by an administrator (300) managing the command center compute device 100 of FIG. 1. The creation of the new mission can be in response to, or triggered by, a request submitted to the system by a requestor via an input to a requestor view of the common software application. At 362, a taxonomy (e.g., a service category) is associated with the newly-created mission via a web app (302) of the common software application (e.g., via an administrator view thereof). If determined, at 364, that the mission type is "invitation only," participants are identified, at 376, to participate in the mission (e.g., by an administrator and/or automatically). Participants identified at 376 as being eligible and/or suitable for invitation to join the mission are compiled (at 378), and invitations are sent to those participants (at 380). The sending of invitations at 380 can be accomplished, for example, by a "backend" 304 of the command center compute device 100 of FIG. 1.

The backend 304 can be, for example, the hardware and/or software components (or modules) that are not public facing. Such non-public-facing hardware and/or software components can include, for example, databases, service endpoints, event triggers, business logic, queuing, image compression and optimization, media storage, indexing, search, deferred processor, demand-based scaling and other similar infrastructure capabilities. Interactions with the backend 304 are accomplished through services (processes or functions) of the web interface. For example, a user of the web interface typically would not have direct access to databases, and instead the web interface can cause the software application to access the database (and other aspects of the backend 304) via "get" or "put"/"post" commands (or messages) to the software application. Although search & index service 306 is shown in FIG. 3 as being separate from the backend 304, it should be understood that search & index service 306 is also not public facing and can be considered in some embodiments to be included within the backend. The search & index service 306 can be, for example, can be a remote, cloud-based service such as that provided by Algolia, Inc.

In some implementations, as shown in FIG. 3, upon creation of a new mission (at 360) or separate from the creation of a new mission (e.g., based on a schedule), the new and/or updated mission information is sent (at 368) to a search & index service (e.g., by the backend of the command center), and the search & index service indexes the new/updated data (mission information) (370). Note that sending the new and/or updated mission information at 368 and the indexing of the new/updated data need not be performed synchronously with the other steps 360-366 and 372-386 of FIG. 3. Rather, the backend 304 can send the index updates (e.g., new and/or updated mission information) based on, for example, a schedule; similarly the search & index service 306 can perform its indexing separately. The updated mission information can include mission data and user data. Mission data 368a can include, but is not limited to, service category, geographic area, and/or any prerequisite mission that an asset pilot must have completed in order to be eligible to participate. Example service categories include, but are not limited to, night operations, commercial operations, recreation operations, and volunteer operations. User data 368b can include, but is not limited to, taxonomy tags, last known location data, completed mission data, etc.

If determined, at 364, that the mission type is "search," a search request is sent (at 366) to an indexing service. The sending of the search request at 366 can be accomplished, for example, by the backend 304 of the command center compute device 100 of FIG. 1. At the search and index service (306), a search for participants is performed (at 372) in response to the search request. The search criteria can include, but are not limited to, one or more of: user location within a specified range of a geographic area associated with the mission (372a), user taxonomy matching the mission service category (372b), and/or a ranking of users based on a relevance of each user to the mission (372c). Once the search results from 372 have been obtained, the search & index service (306) ranks the participants identified through the search (at 374) and invitations are sent to those participants (at 380). As described above, the sending of invitations at 380 can be accomplished, for example, by a "backend" 304 of the command center compute device 100 of FIG. 1.

Whether reached via the "invite only" portion of the process flow or the "search" portion of the process flow, once the "invite participants" step (at 380) is reached, invitation notifications are sent, at 382, to all identified participants, by the search & index service (306). The invitation notifications are received (384) by the invitees via the common software application, and are presented via an operator view thereof, and some or all of the invitee users (310), depending upon mission requirements and users' acceptance of their respective invitations, will participate in the mission (386).

Figure 4:
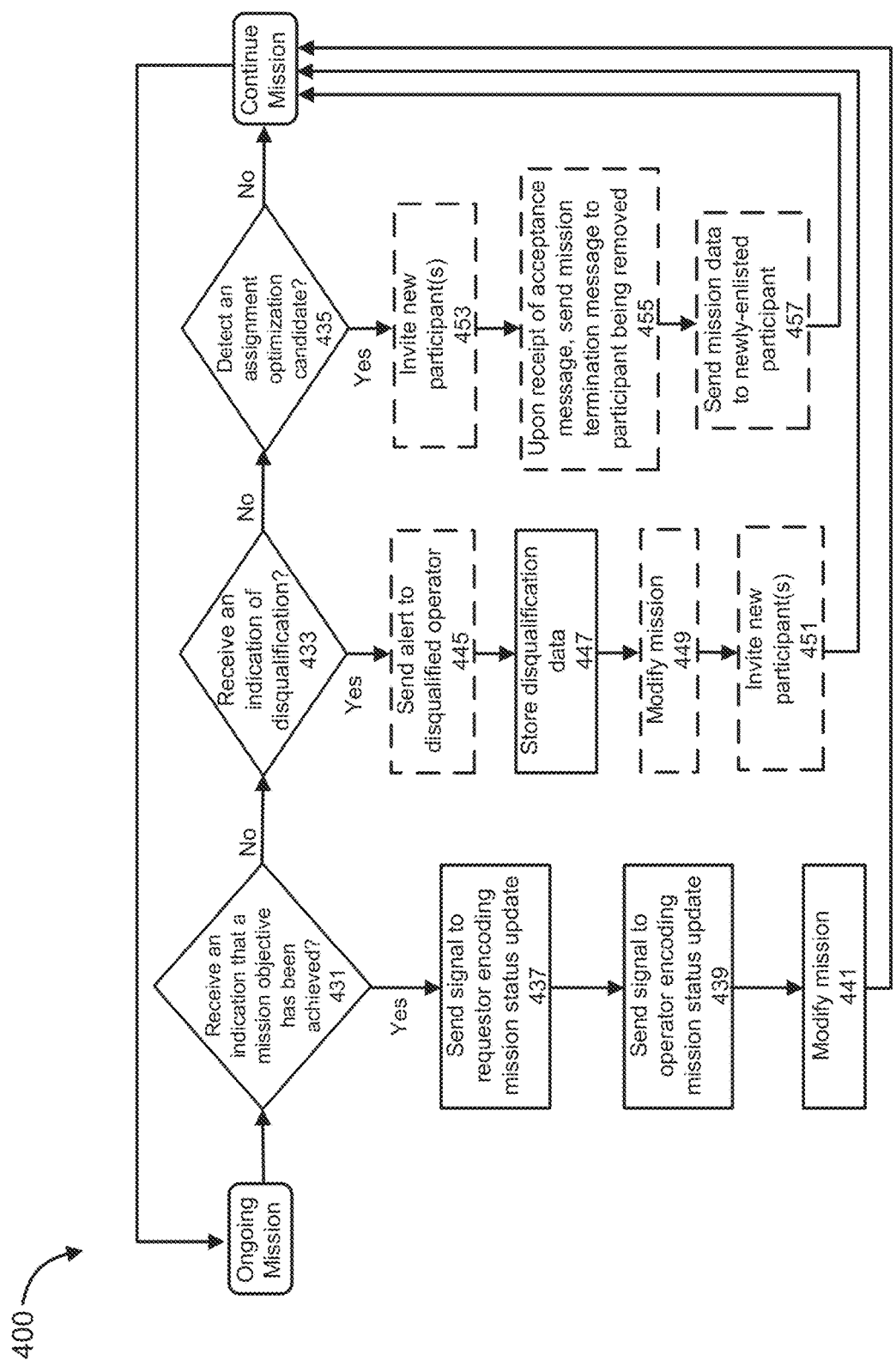
FIG. 4 is a flowchart that illustrates a method for de-enlisting piloted assets from a common mission, according to an embodiment.

In some embodiments, once a group, or "team," of piloted assets and their associated operators/pilots has been enlisted to a mission, the mission is carried out as defined by the requestor's originating mission request (optionally as modified by the administrator). A mission can include one or more tasks, and/or can be partitioned into stages. As real-time or substantially real-time data is generated and/or gathered by the enlisted piloted assets during the mission, signals encoding such data are sent from the piloted assets to the command center for potential forwarding to one or multiple requestors and/or one or multiple operator/pilots. In some cases, in response to receiving the real-time or substantially real-time data, the command center can one or more of: update a mission status, modify mission assignments, modify mission details (e.g., tasks, parameters, etc.), add or delete other missions, etc. Receiving the real-time or substantially real-time data can also trigger a de-enlistment process by the command center, an example of which is shown in FIG. 4. As shown in FIG. 4, as part of a de-enlistment process 400 and in response to receiving the real-time or substantially real-time data generated and/or gathered by the enlisted piloted assets during the mission, the command center can detect (e.g., based on a received signal) that one or more of the following has occurred: (1) a mission objective has been achieved (at 431), (2) one or more of the enlisted piloted assets and/or their associated operator/pilots is no longer qualified for the mission (at 433), or (3) one or more non-enlisted piloted assets and/or their associated operator/pilots is better positioned to accomplish the mission (or a task thereof) than one or more enlisted piloted assets and/or their associated operator/pilots (i.e., identification of an assignment optimization candidate, at 435). Achievement of a mission objective can be defined as the completion of a task (or portion thereof), a phase (or portion thereof), or the mission.

For scenarios in which the command center detects that the mission objective has been achieved (at 431), the command center can: (1) send a signal at 437 to the requestor, the signal encoding an update as to the mission status, (2) send a signal at 439 to an operator from the mission's team, the signal encoding an update as to the mission status, and (3) modify the mission at 441, for example by inviting another piloted asset not currently enlisted to the mission to join the team, redeploying an existing participant of the team, adding a task (or portion thereof) or a phase (or portion thereof) to the mission, or removing a task (or portion thereof) or a phase (or portion thereof) from the mission. After the mission is modified at 441, the de-enlistment process 400 ends its current iteration (potentially of multiple iterations) by continuing the ongoing mission.

For scenarios in which the command center detects that one or more qualifications associated with one or more of the enlisted piloted assets and/or their associated operator/pilots has changed (signifying that the operator is no longer qualified, at 433), the command center can: (1) optionally send a signal at 445 to the no-longer-qualifying operator to alert that operator that he/she will be de-enlisted or redeployed, (2) store, at 447, an indication that the no-longer-qualifying enlisted piloted asset(s) and/or their associated operator/pilot(s) has been de-enlisted or redeployed, (3) optionally modify mission details (at 449) for one or more other enlisted piloted asset(s) and/or their associated operator/pilot(s) in response to the de-enlisting of the no-longer-qualifying participant, (4) optionally invite, at 451, at least one further piloted asset for enlistment to the mission to replace the no-longer-qualifying operator. After the disqualification data is stored, at 447, and optionally the mission has been modified at 449, and optionally the new participants have been sent invitations at 451, the de-enlistment process 400 ends its current iteration (potentially of multiple iterations) by continuing the ongoing mission.

For scenarios in which the command center detects that one or more non-enlisted piloted assets and/or their associated operator/pilots is better positioned to accomplish the mission (or a task thereof) than one or more enlisted piloted assets and/or their associated operator/pilots (i.e., identification of an assignment optimization candidate, at 435), the command center can: (1) optionally invite the one or more better-positioned participants by sending a signal at 453 encoding an invitation, (2) upon receipt of an acceptance message (i.e., in response to the invitation(s)) from the one or more better-positioned participants, optionally send at 455 a termination message to the participant being removed, and (3) optionally send, at 457, mission data to the newly-enlisted participant. After detecting the assignment optimization candidate at 435, and optionally invitations have been sent to one or more participants at 453, and optionally the mission termination message has been sent at 455, and optionally the mission data has been sent to the newly-enlisted participant at 457, the de-enlistment process 400 ends its current iteration (potentially of multiple iterations) by continuing the ongoing mission. If no indication that a mission objective has been achieved is received at 431, and no indication of disqualification is received at 433, and no assignment optimization candidate is detected at 435, the de-enlistment process 400 ends its current iteration (potentially of multiple iterations) by continuing the ongoing mission.

FIG. 5 is an example table for multiplexing communications using a central command center, according to an embodiment. As shown in FIG. 5, a multiplexing coordination table can include multiple records each storing mission-related data. The mission-related data includes columns for Mission Identifier (ID), Mission Name, Requestor ID, Mission Geographic Region, Piloted Asset IDs #1-3, and Operator/Pilot IDs #1-3. By way of illustrative example, a central command center may receive a signal encoding live video data from a mobile device of operator/pilot HOHHX1, where the live video data is being collected by operator/pilot HOHHX1's piloted asset 72ABC, presently assigned to mission "Lost Dog A." The central command center may, upon cross-referencing the newly-received communication attributes (data type=live video data, sender=operator/pilot HOHHX1, assigned mission geographic region=40° N, 75° W), detect that mission "Lost Child B" is associated with a mission geographic region (40° N, 65° W) that is in close proximity of the mission geographic region associated with the newly-received communication from operator/pilot HOHHX1. Based upon this analysis, the command center may send a signal encoding the live video data received from the mobile device of operator/pilot HOHHX1 to a mobile device of requestor A100 (the requestor of the "Lost Dog A" mission) as well as to mobile devices of each of requestors A111, A112 and A113, each of which is a requestor associated with the "Lost Child B" mission. Such a scenario is an example of a many-to-one (i.e., many requestors and one operator/pilot) multiplexing event.

As another example, still referring to FIG. 5, the central command center may receive signals encoding image data from mobile devices of each of operator/pilot HOHHX1 and operator/pilot DODDX1, where the image data is being collected by operator/pilot HOHHX1's piloted asset 72ABC and operator/pilot DODDX1's piloted asset 54LMN, respectively, each presently assigned to mission "Lost Dog A." The central command center may, upon cross-referencing the newly-received communication attributes, detect that mission "Lost Child A" is associated with a mission geographic region (42° N, 73° W) that is in close proximity of the mission geographic region associated with the newly-received communication from operator/pilots HOHHX1 and DODDX1. Based upon this analysis, the command center may send a signal encoding the image data received from the mobile devices of operator/pilots HOHHX1 and DODDX1 to a mobile device of requestor A101 (the requestor of the "Lost Child A" mission), in addition to a mobile device of requestor A100 (the requestor of the "Lost Dog A" mission). Such a scenario is an example of a many-to-many (i.e., many requestors and many operator/pilots) multiplexing event.

As still another example, still referring to FIG. 5, the central command center may receive signals encoding video data from mobile devices of each of operator/pilots H5HHX5, H2HHX8, and L5LL7, where the video data is being collected by operator/pilot H5HHX5's piloted asset 11DEF, operator/pilot H2HHX8's piloted asset 99ABC, and operator/pilot L5LL7's piloted asset 55TRW, respectively, each presently assigned to mission "Land Survey A." The central command center may, upon cross-referencing the newly-received communication attributes, detect that mission "Lost Child B" is associated with a mission geographic region (40° N, 65° W), being in sufficient proximity of the mission geographic region (35° N, 45° W) associated with the newly-received communication from operator/pilots H5HHX5, H2HHX8, and L5LL7. Based upon this analysis, the command center may send a signal encoding the video data received from the mobile devices of operator/pilots H5HHX5, H2HHX8, and L5LL7 to mobile devices of each of requestors A107, A108, and A109, each of which is a requestor associated with the "Land Survey A" mission, as well as to mobile devices of one or more of requestors A111, A112 and A113, each of which is a requestor associated with the "Lost Child B" mission. Such a scenario is an example of a many-to-many multiplexing event.

As still another example, still referring to FIG. 5, the central command center may receive signals encoding video data from mobile devices of each of operator/pilots B1BBX9, E9EEX7, and Z1ZZX4, where the video data is being collected by operator/pilot B1BBX9's piloted asset 11BRT, operator/pilot E9EEX7's piloted asset 55QRS, and operator/pilot Z1ZZX4's piloted asset 61BLM, respectively, each presently assigned to mission "Disaster Relief B." The central command center may, upon cross-referencing the newly-received communication attributes, detect that no other pending mission is in sufficient proximity of the mission geographic region (18° N, 72° W) associated with the newly-received communication from operator/pilots B1BBX9, E9EEX7, and Z1ZZX4. Based upon this analysis, the command center may send a signal encoding the video data received from the mobile devices of operator/pilots B1BBX9, E9EEX7, and Z1ZZX4 to only the mobile device of requestor A110, the sole requestor associated with the "Disaster Relief B" mission. Such a scenario is an example of a one-to-many (i.e., one requestor and many operator/pilots) multiplexing event.

Although the foregoing examples (with reference to FIG. 5) have been directed to multiplexing communications to or from additional participants based on geographic proximity, other factors can alternatively or additionally influence the communications multiplexing. For example, the central command center may detect, in image or video data received from one of the mission participants, that a child is in (or enters) the frame. The central command center may then use the multiplexing table to determine whether any other currently-active missions specify, as an objective, the location of a child. If so, the central command center may send a signal encoding the relevant image or video data to mobile devices of requestors associated with the one or more identified currently-active missions specifying the location of a child as an objective (in addition to requestors to which the image or video data was originally associated).

In some embodiments, the coordination of multiplexed communications for a mission can be understood as having two "layers": a first layer associated with mission administration, and a second layer associated with mission dynamics. For example, a first, mission administration layer can include multiplexing communications related to managing invitations sent from the command center to operator/pilots, performing checks to ensure that a potential invitee piloted asset is not already fully subscribed to other missions, or already in communication with one or more other command centers (potentially causing a conflict in time, location, and/or mission objective). This mission administration layer can also include communication management functions to prevent accepting too many enrollment/enlistment requests (e.g., over-assigning a mission beyond what was authorized by a requestor and/or beyond what would be feasible to manage within the airspace without collision, etc.) or to prevent assigning too many missions to an individual operator/pilot and/or piloted asset (e.g., assigning more missions than is feasible for a given piloted asset). This mission administration layer can also manage permissions associated with missions and their associated data, media, deliverables, etc. For example, some requestors may specify that all video data collected during their mission be kept private. Based on such a constraint, the command center may set a rule such that the video data is not inadvertently shared with any other requestors or participants not directly associated with that mission.

An example second, mission dynamics layer can include situation-dependent communications that can dynamically change during the operation/execution of a mission, for example in response to unplanned events. Such situation-dependent communications can include, for example, alert messages sent to mobile devices of multiple enlisted operator/pilots in response to a detected change to the mission, FAA advisory, weather advisories, etc. Other examples of situation-dependent communications can include, but are not limited to: (1) the receipt of signals from mobile devices of one or more requestors encoding data representing a change to a mission criteria or status and relaying relevant portions of the changes received from the requestors to one or more mobile devices of relevant/affected participant operator/pilots, (2) the receipt of signals from mobile devices of one or more enlisted operator/pilots encoding data representing mission-related data and relaying relevant portions of the mission-related data changes to one or more mobile devices of one or more other enlisted operator/pilots, (i.e., facilitating pilot-to-pilot communications) (3) the receipt of signals from mobile devices of one or more operator/pilots encoding data representing a change to a mission criteria or status and relaying relevant portions of the changes received from the requestors to one or more mobile devices of relevant/affected participant operator/pilots, and (4) the receipt of signals from mobile devices of one or more operator/pilots encoding data including at least one of video, voice, chat, and text data, and relaying portions of the video, voice, chat, and/or text data to one or more mobile devices of one or more requestors, for example as shown and described with reference to FIGS. 6A and 6B.

Figure 6A:
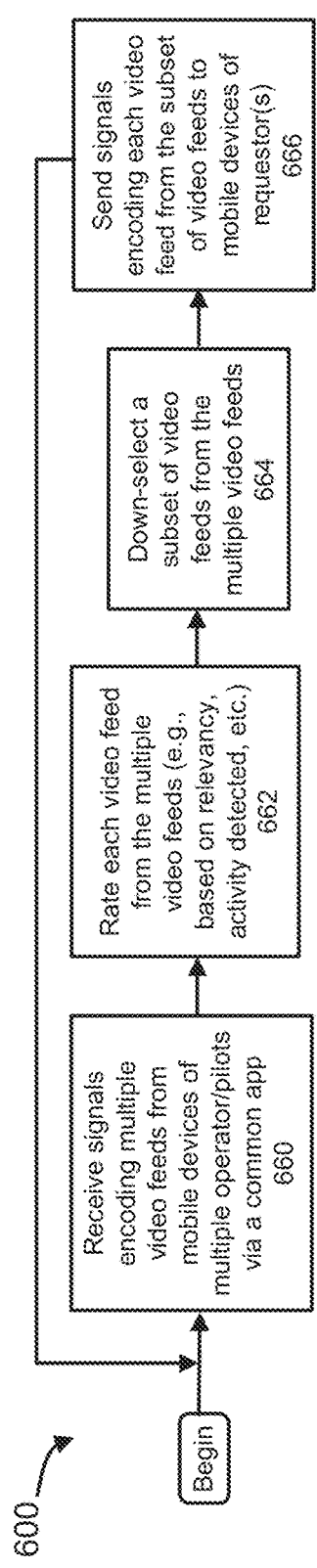
FIG. 6A is a flowchart that illustrates down-selection of multiple multiplexed communications, according to an embodiment.

FIG. 6A is a flowchart that illustrates a down-selection process for multiple multiplexed communications, according to an embodiment. As shown in FIG. 6A, a down-selection process 600 includes receiving (e.g., at a command center such as the command center compute device 100 of FIG. 1), during a mission and from multiple mobile devices of multiple operator/pilots via a common software application, at 660, multiple signals each encoding a video feed collected by one of the piloted assets associated with the multiple operator/pilots. At 662, the command center can analyze the multiple video feeds and assign ratings to each video feed from the multiple video feeds, based on one or more criteria such as relevancy to the mission associated with communication by which that video feed was received, an amount of movement or activity detected within a frame of the video feed, etc. The assigned ratings may be stored, by the command center, in a memory. Based on the ratings, the command center down-selects, at 664, a subset of the video feeds from the multiple video feeds, and sends signals, at 666, encoding each video feed from the subset of video feeds to mobile devices of one or more relevant requestors (e.g., requestors associated directly with the mission associated with communication by which those video feeds were received and, optionally, any additional requestors that may benefit from the video feeds (examples of which are discussed with reference to FIG. 5) and have permission to access them), and/or to mobile devices of one or more operator/pilots of the multiple operator/pilots. After step 666, the down-selection process 600 can iterate one or more additional times by looping back to step 660. Although shown and described, with reference to FIG. 6A, to pertain to a "down-selection process," the process 600 can, alternatively or in addition, be used for an up-selection, or a reversal of a previous down-selection event. In other words, step 664 can refer, more generically, to any change to the ratio of video feeds from the multiple received video feeds that are sent to requestors and/or operator/pilots. For example, with regard to the example discussed above for FIGS. 6A-6B, after a first iteration of the process 600, a second iteration can include a different set of ratings, for the same set of multiple video feeds as was previously received and rated, or for a different set of multiple video feeds than was previously received and rated, such that the number of video feeds in the subset of video feeds defined at 664 during the second iteration of process 600 can be increased or decreased (or remain the same), and/or the video feeds included in the subset of the second iteration can differ from the video feeds included in the subset of the first iteration. If, for example, the command center, in analyzing the video feed data from the first iteration of the process 600 and/or in response to a signal received from a mission participant, determines that the dog identified in the subset of video feeds of the first iteration was not the lost dog being sought, the most relevant video feeds from the multiple received video feeds could change.

Figure 6B:
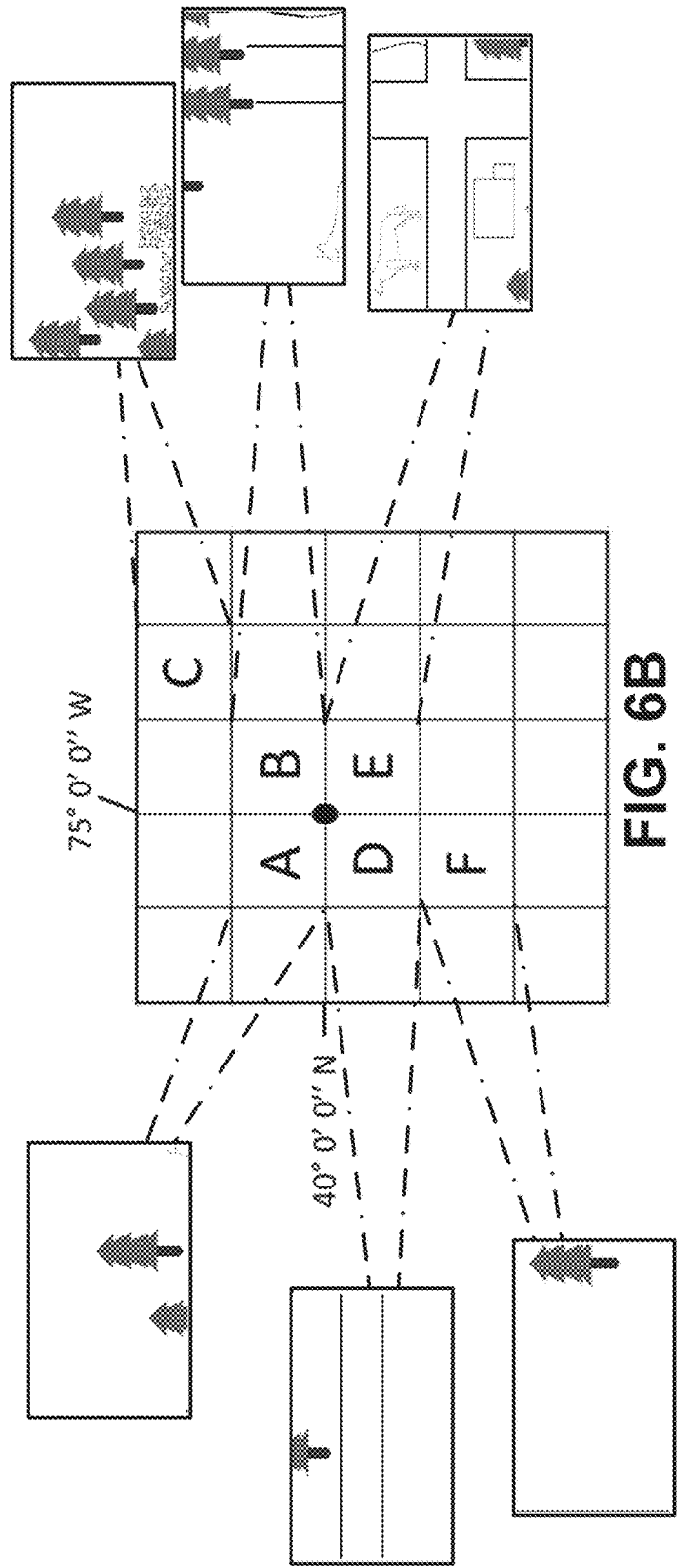
FIG. 6B is a diagram showing a grid map and mission-related regions thereof associated with the video feeds of FIG. 6A.

FIG. 6B is a diagram showing a grid map and mission-related regions thereof associated with the video feeds of FIG. 6A. FIG. 6B may correspond to a geographic region for a mission similar to the "Lost Dog A" mission (Mission #1) of FIG. 5, and thus is centered around the mission geographic region 40° 0' 0" N, 75° 0' 0" W. As shown in FIG. 6B, there are 6 regions (which may be distinct or at least partially overlapping) that are being monitored, each by one of 6 piloted assets. Example snapshots of video feeds collected by each of the 6 piloted assets are shown in FIG. 6B. When in receipt of all 6 video feeds (i.e., received at the command center via signals encoding the video feeds from mobile devices of each of 6 operator/pilots associated with the 6 piloted assets), the command center can perform the down-selection process of FIG. 6A. The rating of each video feed (step 662 in FIG. 6A) can be based on a percentage match (e.g., based on image recognition) between frames of the video feeds and a target image (e.g., an image of the specific dog being searched for, or a generic "reference" image of a dog). For example, the command center may detect (either automatically, for example via image recognition, or manually via an administrator of the command center) that a dog is visible in the video feeds collected for geographic regions E, B and A, in order of percentage match. Based on this analysis, the command center can decide to define a down-selected subset of the video feeds as including the video feeds for geographic regions E, B and A and send only those video feeds to the relevant one or more requestors. By employing such down-selection techniques, communication traffic can be reduced, with associated improvements to speed and efficiency of mission-related communications. Moreover, requestors are shown only the most relevant data, in real-time or substantially real-time, making it possible for the requestors to efficiently monitor mission progress and, in some instances, collaborate with the operator/pilot(s) assigned to their mission, also in real-time or substantially real-time (e.g., to supplement automated methods of detecting the lost dog) to improve mission outcomes. Although shown and described, with reference to FIGS. 6A and 6B, to relate to video feeds, the down-selection process 600 can, alternatively or in addition, be used to multiplex voice, image, chat and/or text data.

Figure 7:
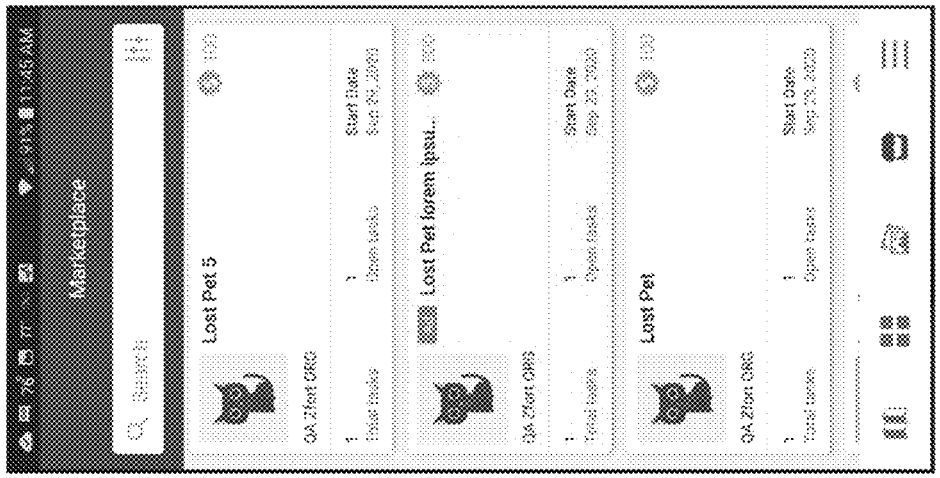
FIG. 7 is a mobile device screenshot of a marketplace, viewable via an operator view of a software application, according to an embodiment.
Figure 12:
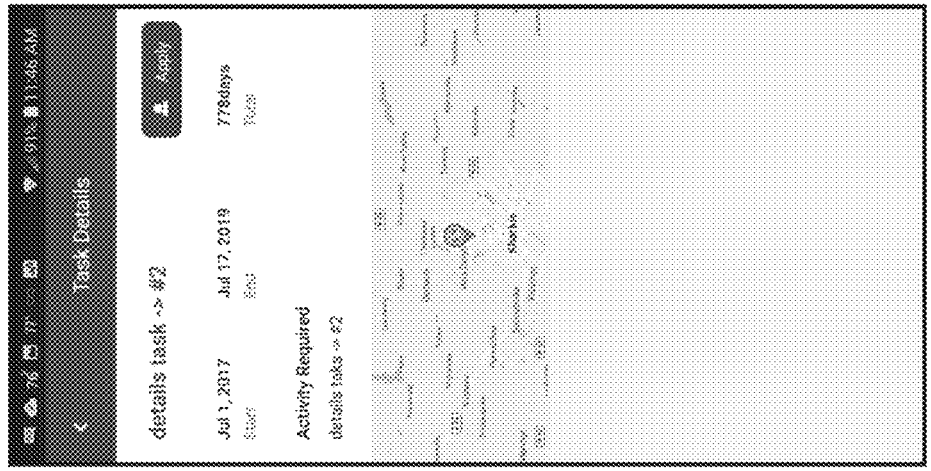
FIG. 12 is a mobile device screenshot showing mission task details, viewable via an operator view of a software application, according to an embodiment.
Figure 13:
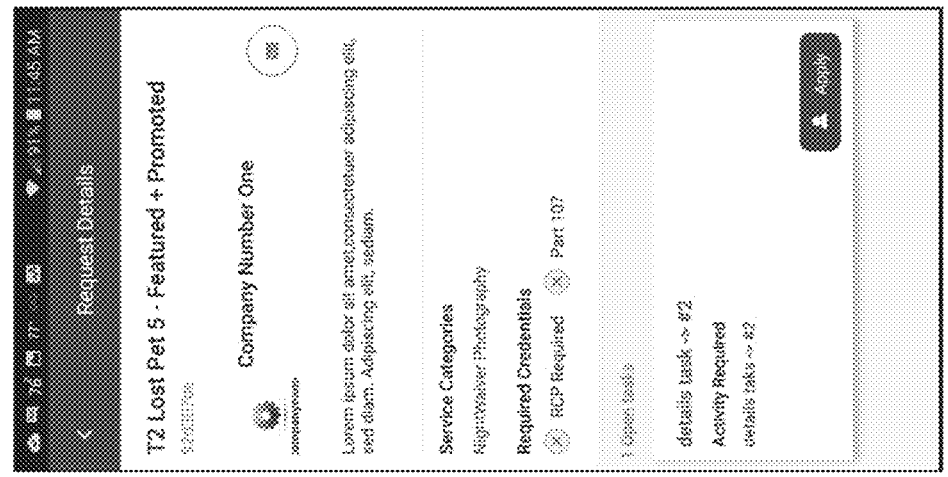
FIG. 13 is a mobile device screenshot showing mission request details, viewable via an operator view of a software application, according to an embodiment.

FIGS. 7-28 are mobile device screenshots of various functionality of the common software application, viewable via an operator view of a software application, according to some embodiments. For example, FIG. 7 shows an example listing of available missions (or "marketplace requests") to which an operator may want to enlist or request enlistment. A marketplace request can have an associated "request type." Example request types include, but are not limited to: open, private, and invite only. Each mission listing includes a title (e.g., "Lost Pet"), a number of tasks associated with the mission (e.g., 1 or more), a start date, and an amount of money to be paid for the mission (e.g., $100). Relatedly, FIG. 13 shows a detail view of a specific mission, which may be rendered upon selection of the specific mission via the operator view of the software application. As shown in FIG. 13, the request details for the "T2 Lost Pet" mission include a service category of "NightWaiver Photography," an associated requestor name (in this case a company, "Company Number One"), and required pilot credentials of "RCP required" and "Part 107" certification. Also included in the request details window are an email link and a button for applying to the mission.

Figure 9:
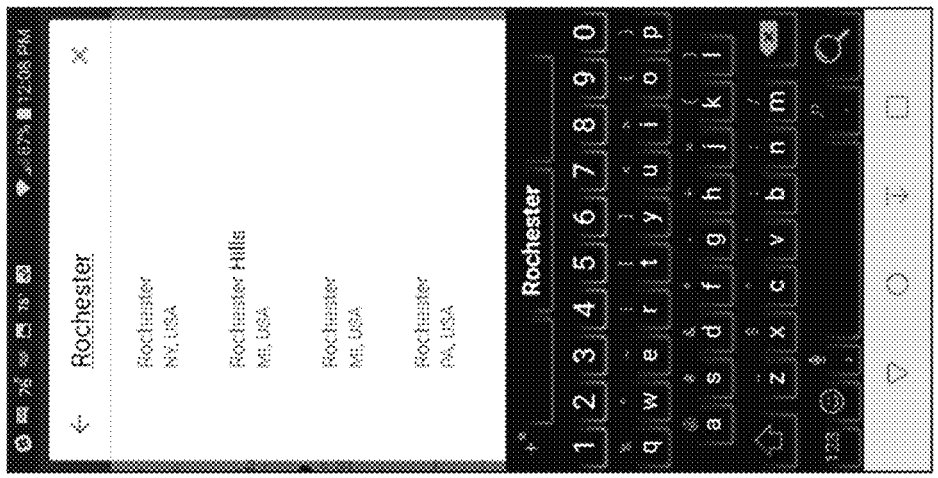
FIG. 9 is a mobile device screenshot showing operator location details, viewable via an operator view of a software application, according to an embodiment.
Figure 8:
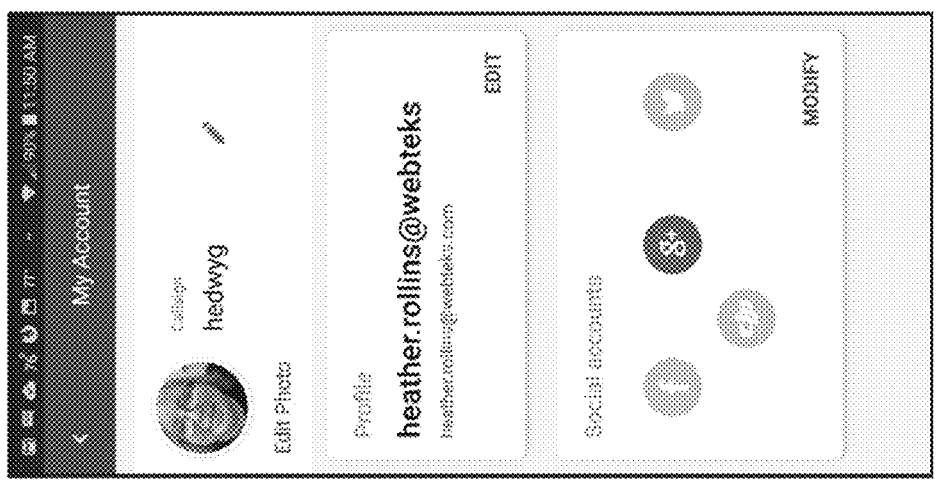
FIG. 8 is a mobile device screenshot showing operator account details, viewable via an operator view of a software application, according to an embodiment.
Figure 11:
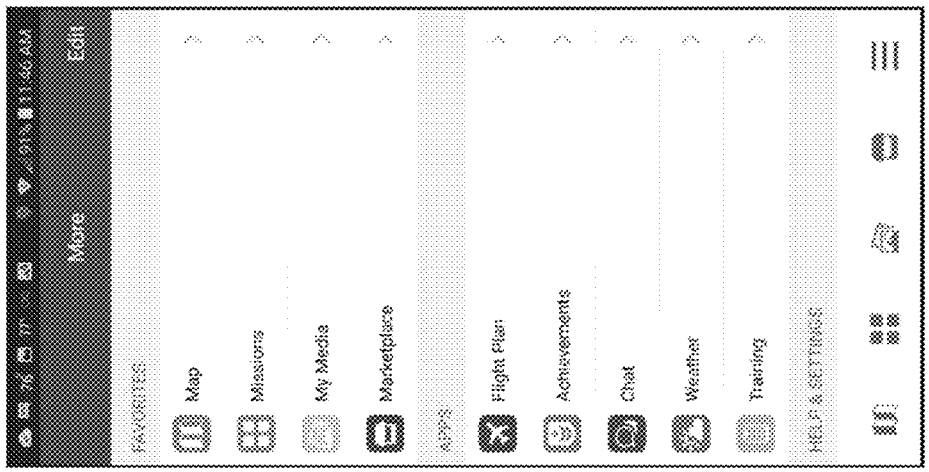
FIG. 11 is a mobile device screenshot showing a menu of the software application, viewable via an operator view of a software application, according to an embodiment.
Figure 10:
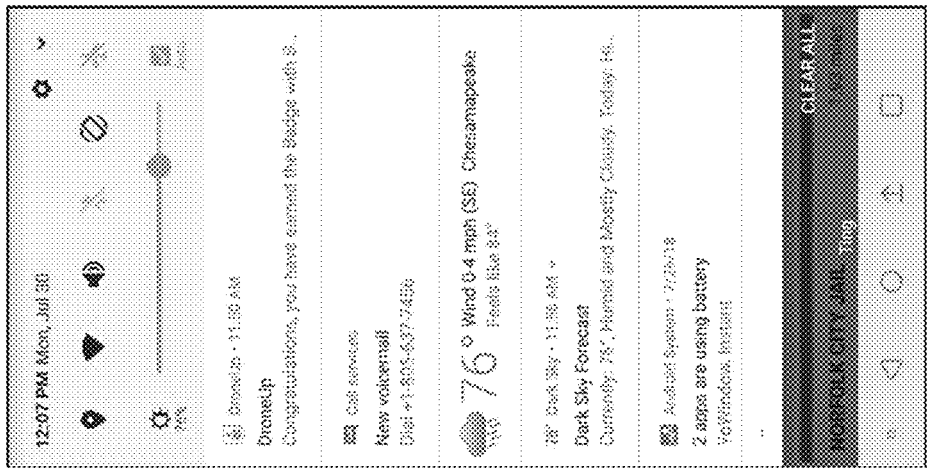
FIG. 10 is a mobile device screenshot showing a badge notification and a weather forecast, viewable via an operator view of a software application, according to an embodiment.

FIG. 8 is a mobile device screenshot showing operator account details, viewable via an operator view of a software application, according to an embodiment. FIG. 9 is a mobile device screenshot showing operator location details, viewable via an operator view of a software application, according to an embodiment. FIG. 10 is a mobile device screenshot showing a badge notification and a weather forecast, viewable via an operator view of a software application, according to an embodiment. FIG. 11 is a mobile device screenshot showing a menu of the software application, viewable via an operator view of a software application, according to an embodiment. FIG. 12 is a mobile device screenshot showing mission task details, viewable via an operator view of a software application, according to an embodiment.

Figure 15:
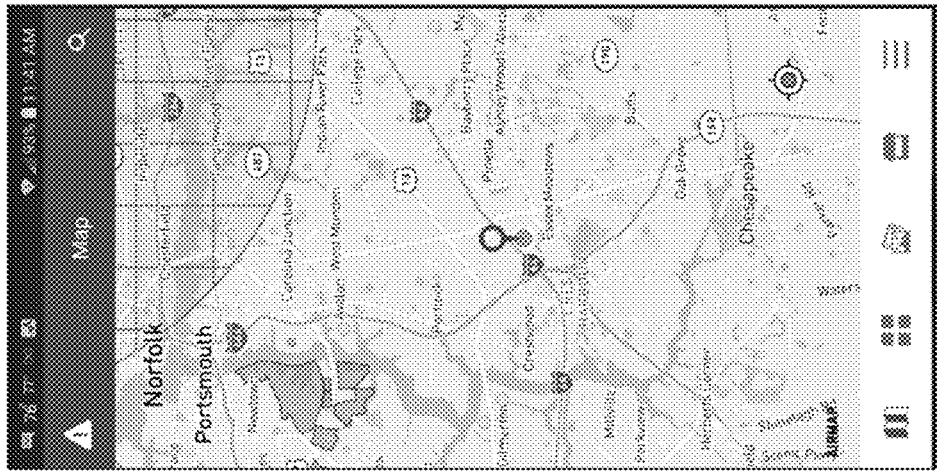
FIG. 15 is a mobile device screenshot of a map, viewable via an operator view of a software application, according to an embodiment.
Figure 14:
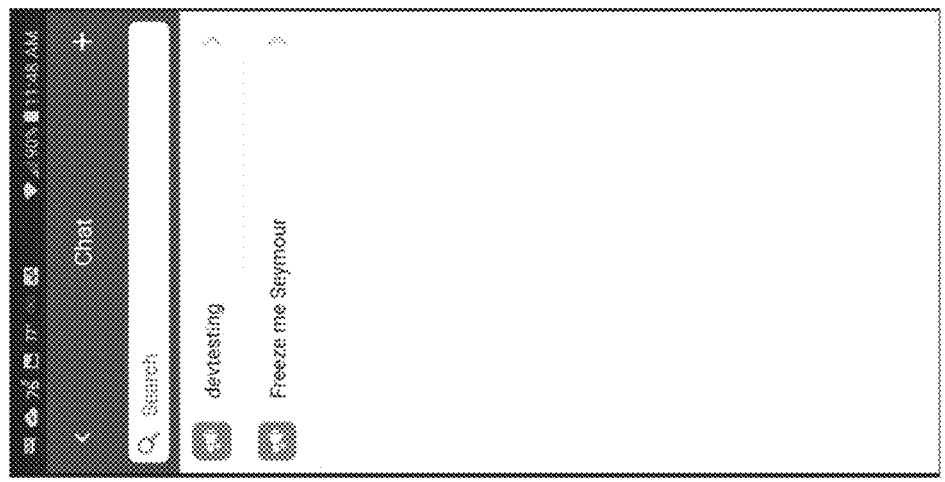
FIG. 14 is a mobile device screenshot showing a chat feature, viewable via an operator view of a software application, according to an embodiment.
Figure 18:
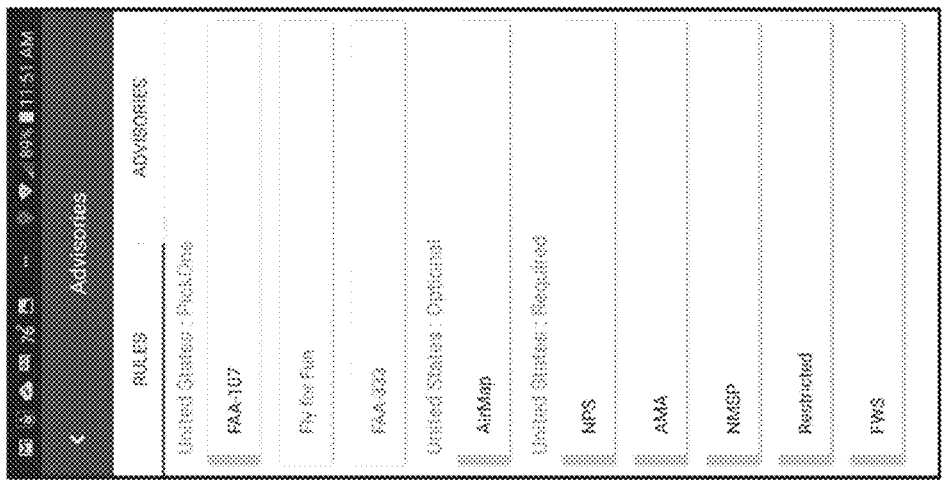
FIG. 18 is a mobile device screenshot showing advisory categories, viewable via an operator view of a software application, according to an embodiment.
Figure 17:
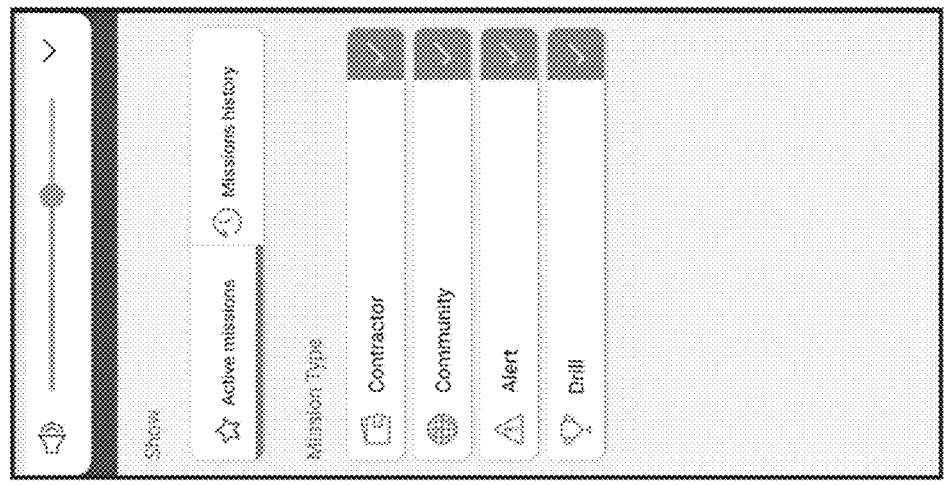
FIG. 17 is a mobile device screenshot showing active mission types, viewable via an operator view of a software application, according to an embodiment.
Figure 16:
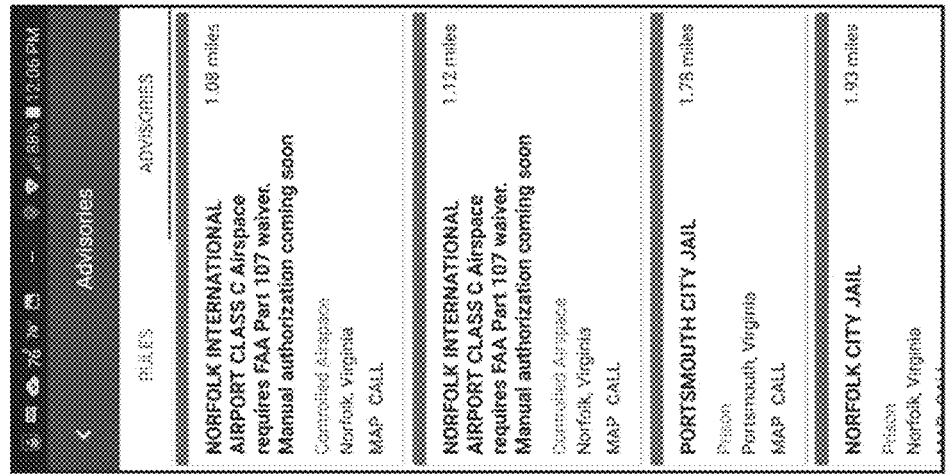
FIG. 16 is a mobile device screenshot showing mission-relevant advisories, viewable via an operator view of a software application, according to an embodiment.
Figure 21:
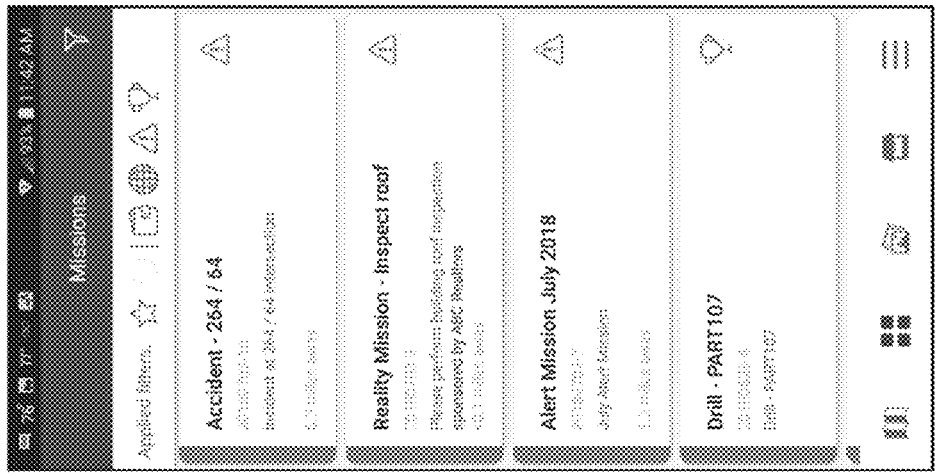
FIG. 21 is a mobile device screenshot showing a listing of missions, viewable via an operator view of a software application, according to an embodiment.
Figure 20:
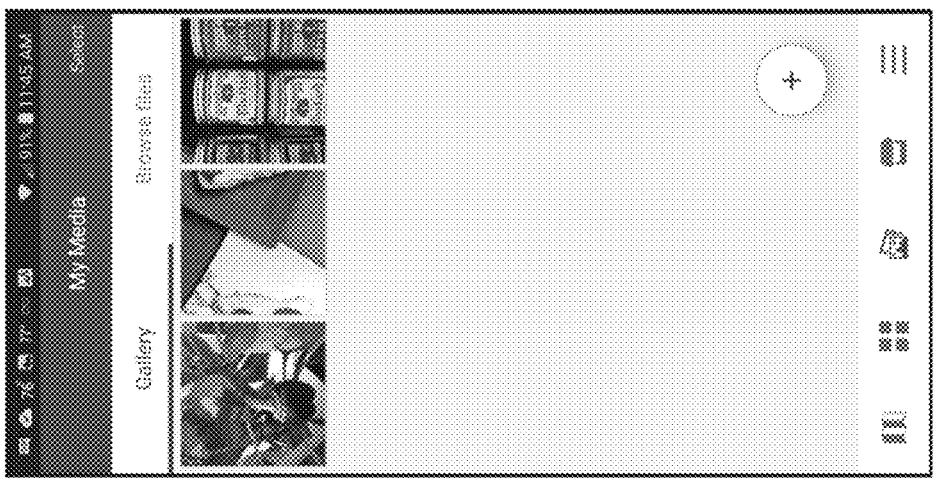
FIG. 20 is a mobile device screenshot showing stored media, viewable via an operator view of a software application, according to an embodiment.
Figure 19:
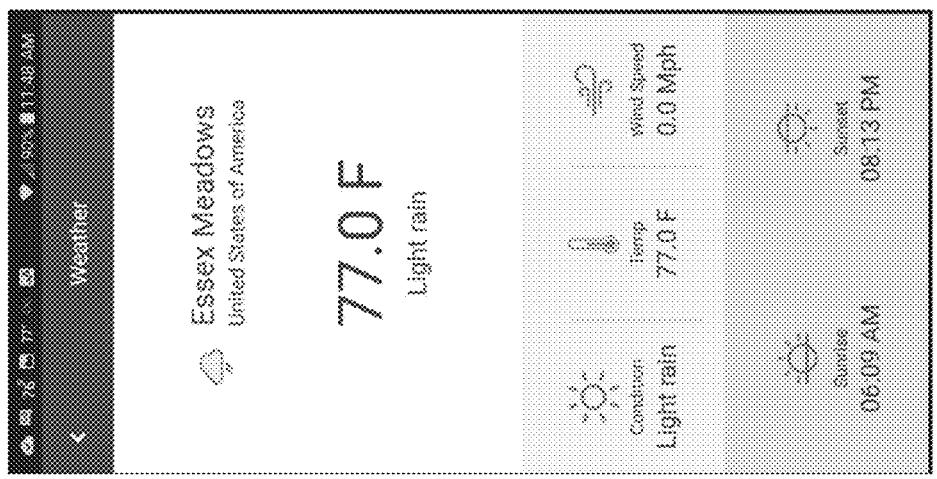
FIG. 19 is a mobile device screenshot showing weather forecast details, viewable via an operator view of a software application, according to an embodiment.
Figure 24:
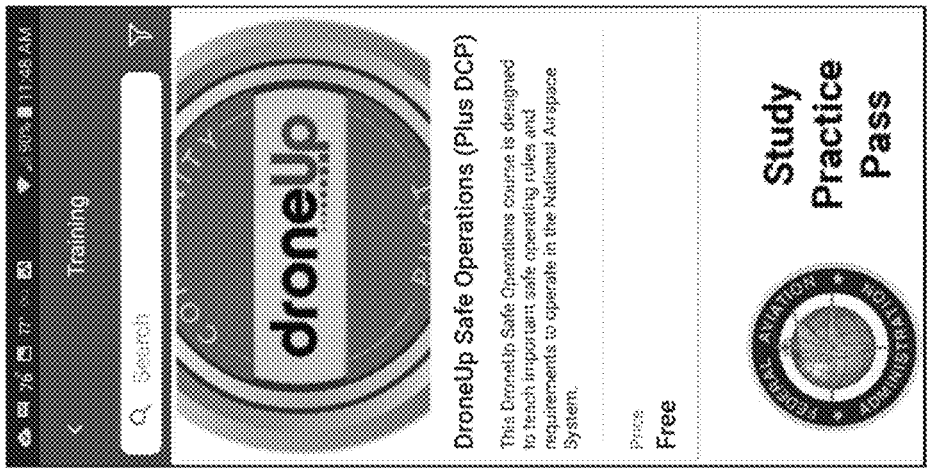
FIG. 24 is a mobile device screenshot showing an available training course, viewable via an operator view of a software application, according to an embodiment.
Figure 23:
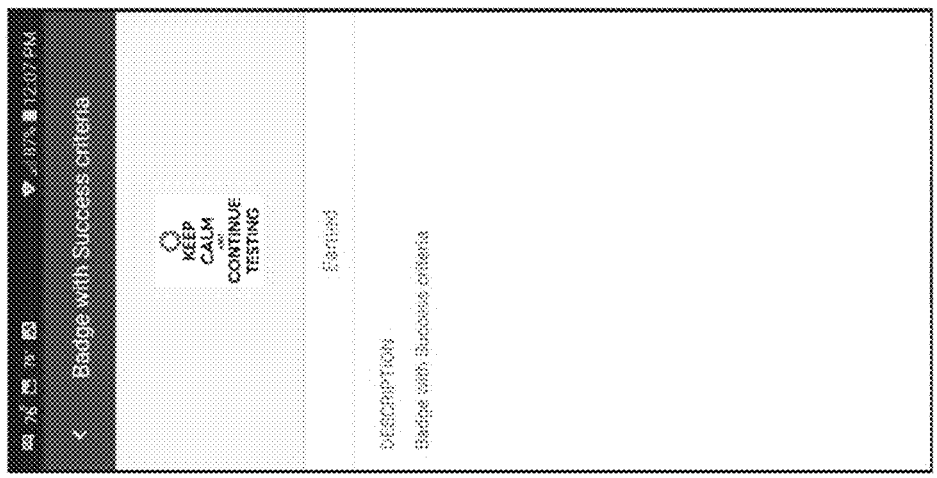
FIG. 23 is a mobile device screenshot showing an earned badge, viewable via an operator view of a software application, according to an embodiment.
Figure 22:
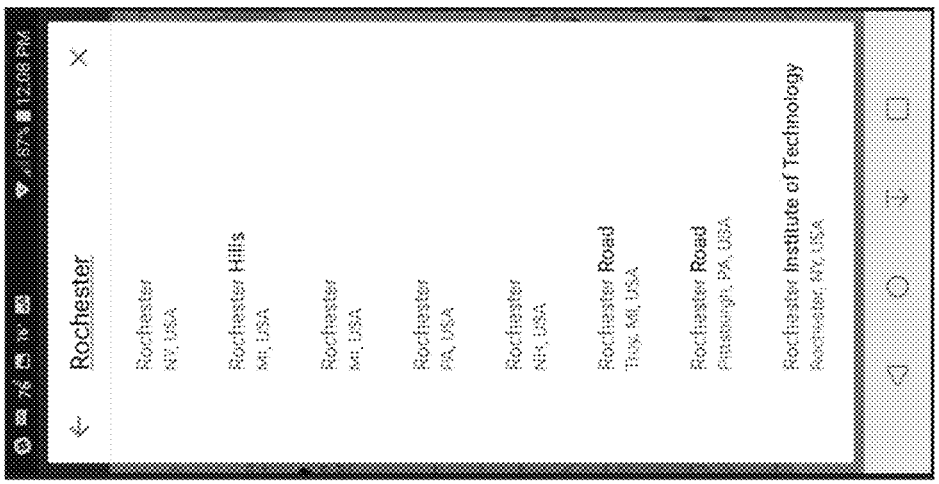
FIG. 22 is a mobile device screenshot showing location selection options, viewable via an operator view of a software application, according to an embodiment.
Figure 25:
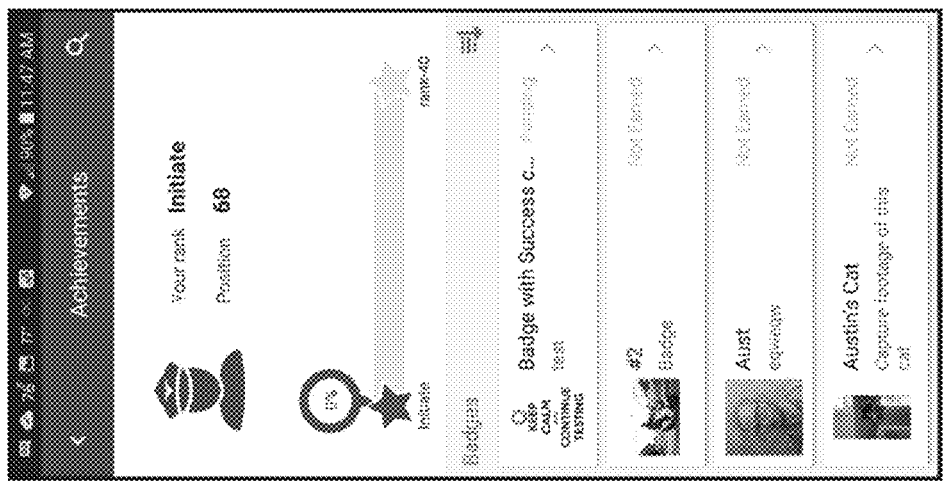
FIG. 25 is a mobile device screenshot showing achievements, viewable via an operator view of a software application, according to an embodiment.

FIG. 14 is a mobile device screenshot showing a chat feature, viewable via an operator view of a software application, according to an embodiment. FIG. 15 is a mobile device screenshot of a map, viewable via an operator view of a software application, according to an embodiment. FIG. 16 is a mobile device screenshot showing mission-relevant advisories, viewable via an operator view of a software application, according to an embodiment. FIG. 17 is a mobile device screenshot showing active mission types, viewable via an operator view of a software application, according to an embodiment. FIG. 18 is a mobile device screenshot showing advisory categories, viewable via an operator view of a software application, according to an embodiment. FIG. 19 is a mobile device screenshot showing weather forecast details, viewable via an operator view of a software application, according to an embodiment. FIG. 20 is a mobile device screenshot showing stored media, viewable via an operator view of a software application, according to an embodiment. FIG. 21 is a mobile device screenshot showing a listing of missions, viewable via an operator view of a software application, according to an embodiment. FIG. 22 is a mobile device screenshot showing location selection options, viewable via an operator view of a software application, according to an embodiment. FIG. 23 is a mobile device screenshot showing an earned badge, viewable via an operator view of a software application, according to an embodiment. FIG. 24 is a mobile device screenshot showing an available training course, viewable via an operator view of a software application, according to an embodiment. FIG. 25 is a mobile device screenshot showing achievements, viewable via an operator view of a software application, according to an embodiment.

Figure 27:
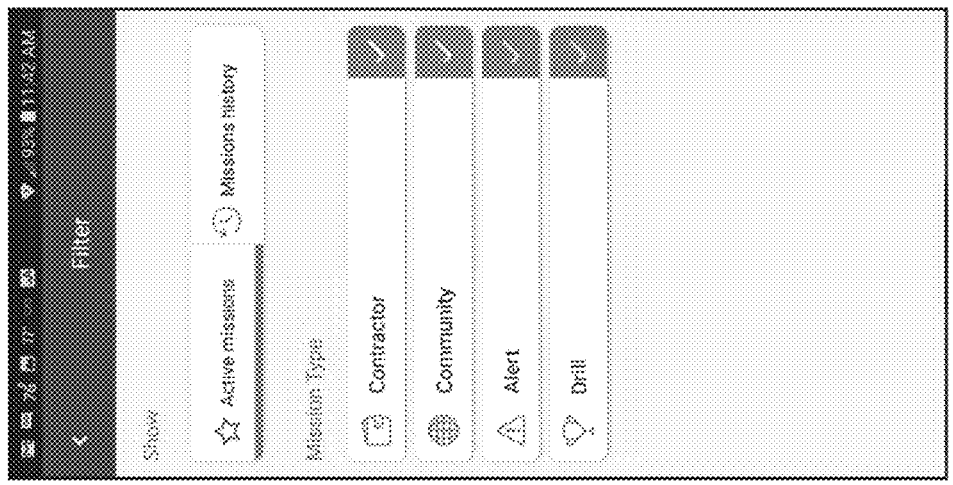
FIG. 27 is a mobile device screenshot showing filter options, viewable via an operator view of a software application, according to an embodiment.
Figure 26:
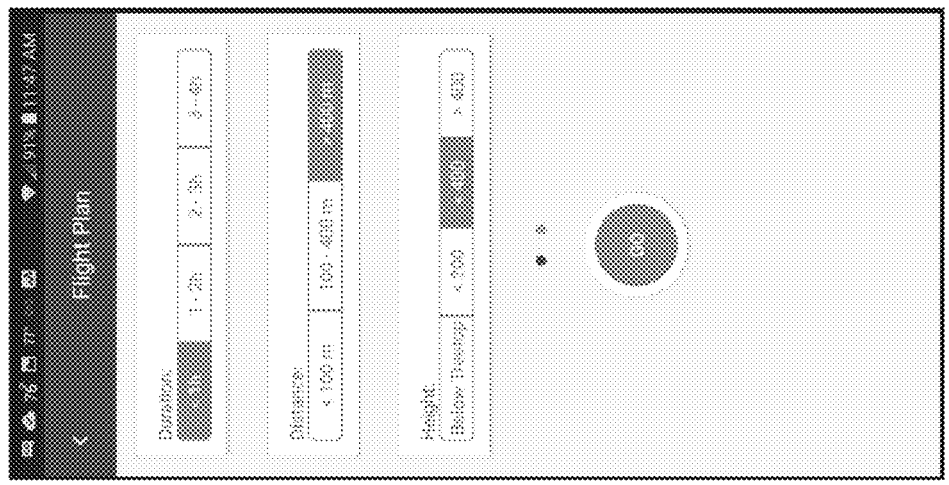
FIG. 26 is a mobile device screenshot showing piloted asset flight plan details, viewable via an operator view of a software application, according to an embodiment.
Figure 28:
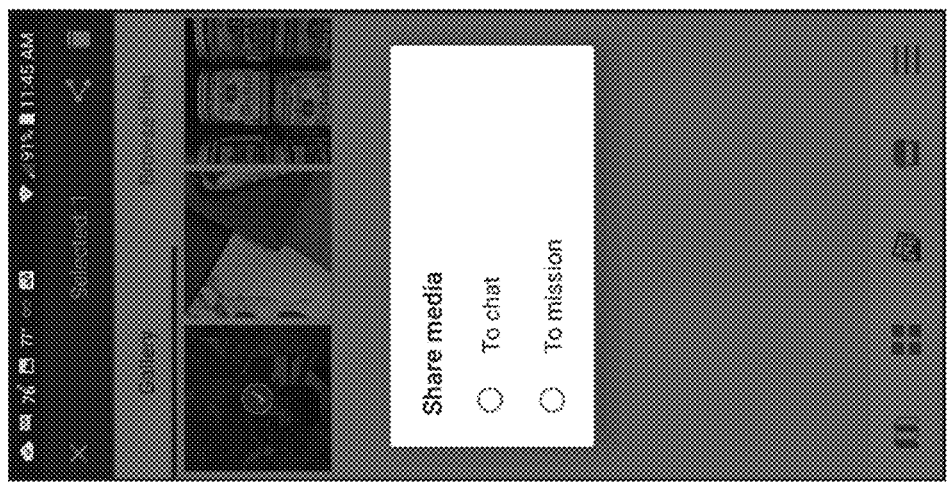
FIG. 28 is a mobile device screenshot showing a "share media" feature, viewable via an operator view of a software application, according to an embodiment.

FIG. 26 shows an example flight plan for an operator participating in a mission. As shown, the flight plan details can include a duration, a travel distance, and a mission "height" (or altitude). When an operator has been enlisted to multiple missions, the operator can view active mission details and/or mission history information, optionally with filtering applied. For example, as shown in FIG. 27, active or past missions can be sorted by Mission Type (e.g., Contractor, Community, Alert, and Drill). FIG. 28 is a mobile device screenshot showing a "share media" feature, viewable via an operator view of a software application, according to an embodiment. Although shown and described in FIGS. 7-28 to be rendered on a mobile device, in other implementations, the interfaces can instead be rendered in a desktop format.

Figure 29:
FIG. 29 is a web interface screenshot showing a login pop-up window, viewable via an administrator view of a software application, according to an embodiment.
Figure 30:
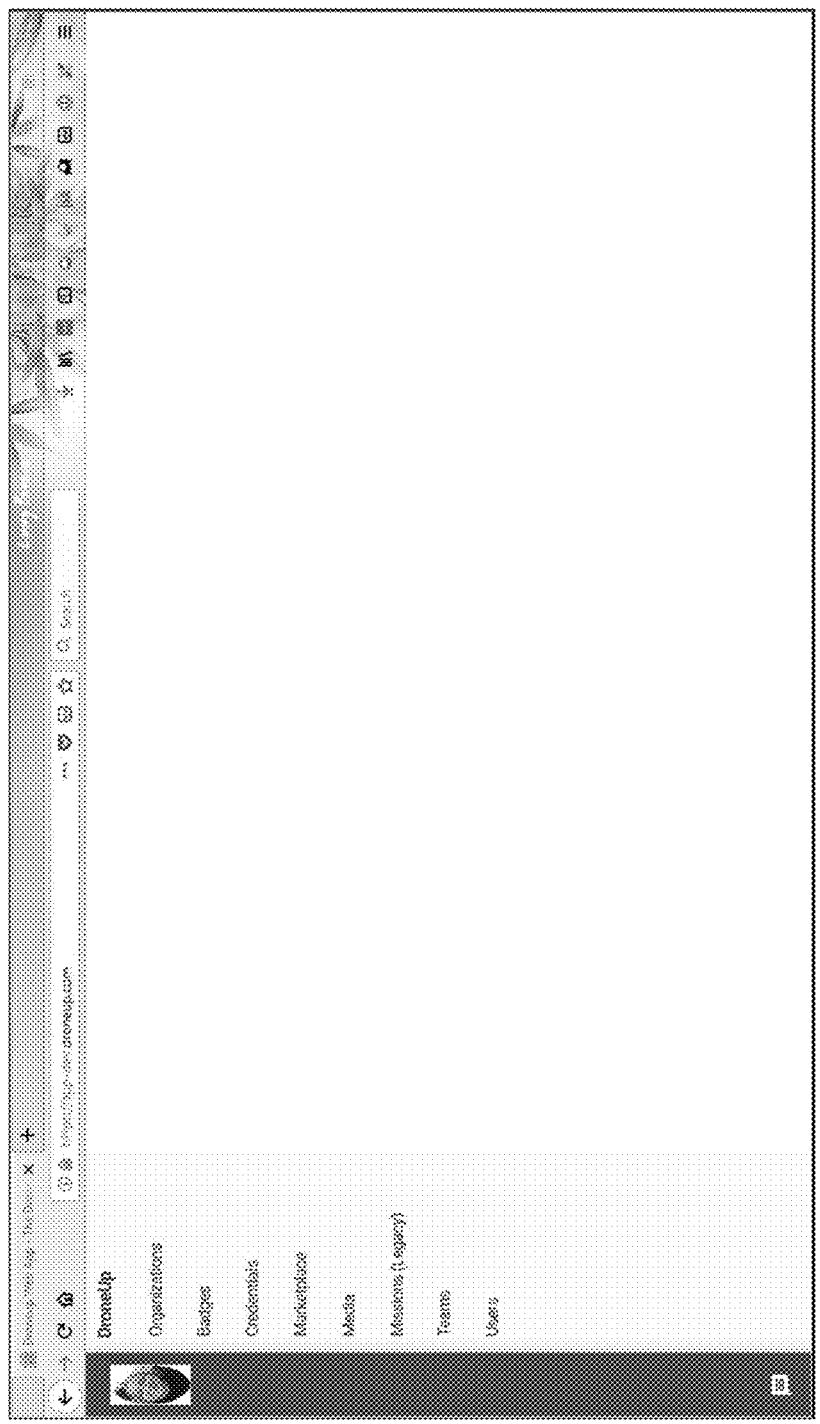
FIG. 30 is a web interface screenshot showing a main web administrator page, viewable via an administrator view of a software application, according to an embodiment.
Figure 31:
FIG. 31 is a web interface screenshot showing organization statuses, viewable via an administrator view of a software application, according to an embodiment.
Figure 33:
FIG. 33 is a web interface screenshot showing a screen for adding organizations, viewable via an administrator view of a software application, according to an embodiment.
Figure 34:
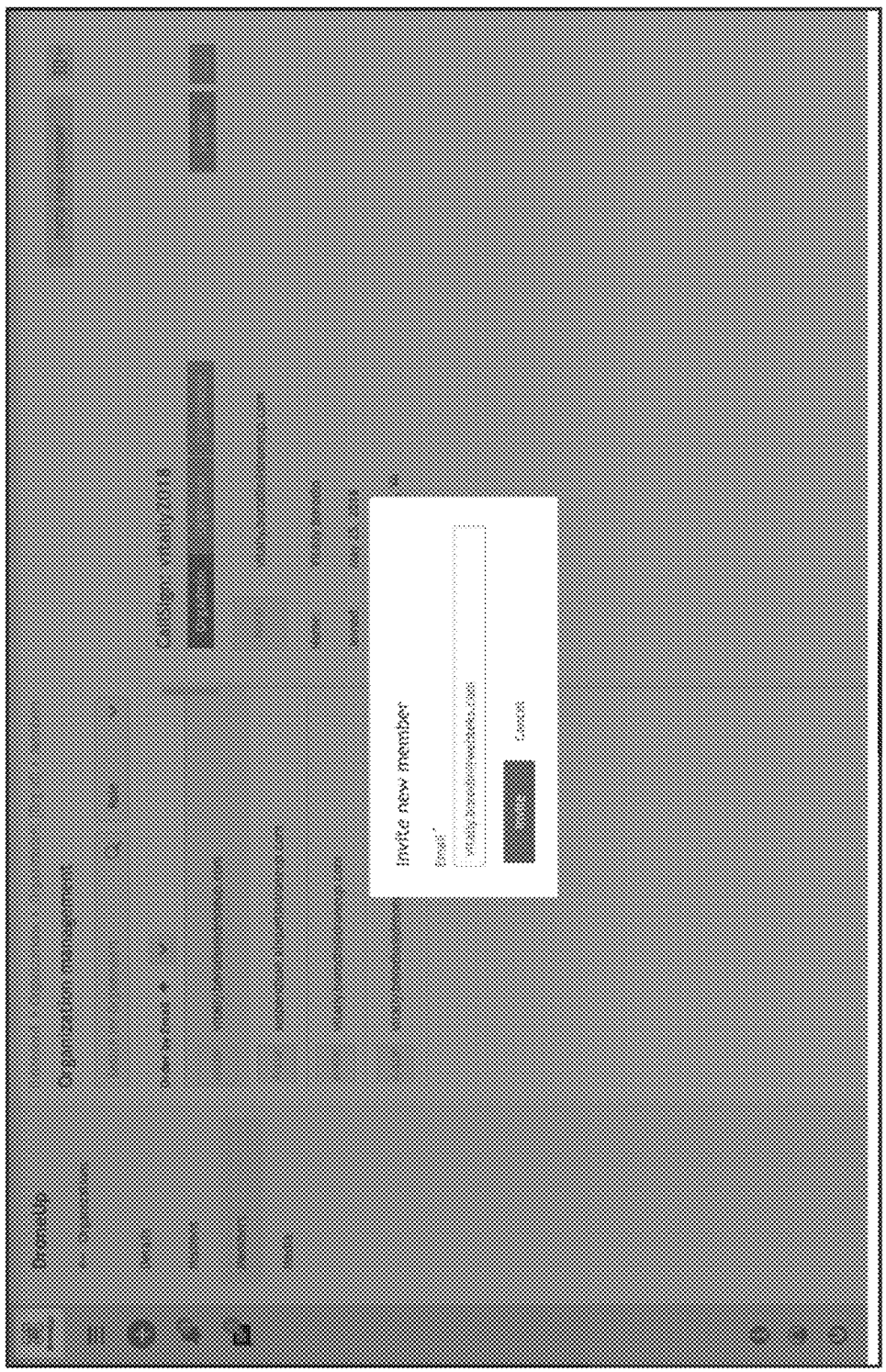
FIG. 34 is a web interface screenshot showing an "invite new organizational member" function, viewable via an administrator view of a software application, according to an embodiment.
Figure 35:
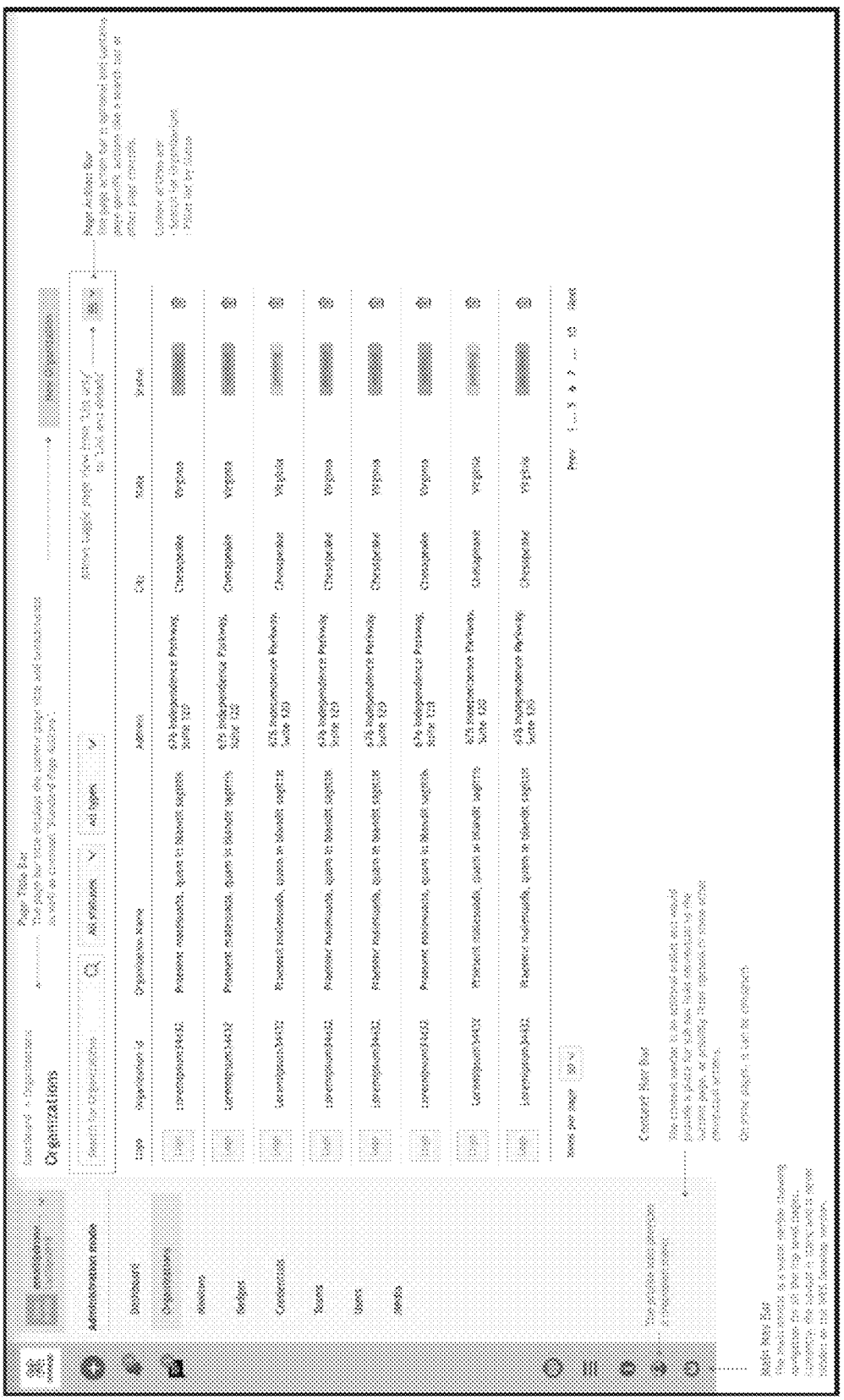
FIG. 35 is a web interface screenshot showing an administrative mode listing of organizations, viewable via an administrator view of a software application, according to an embodiment.
Figure 36:
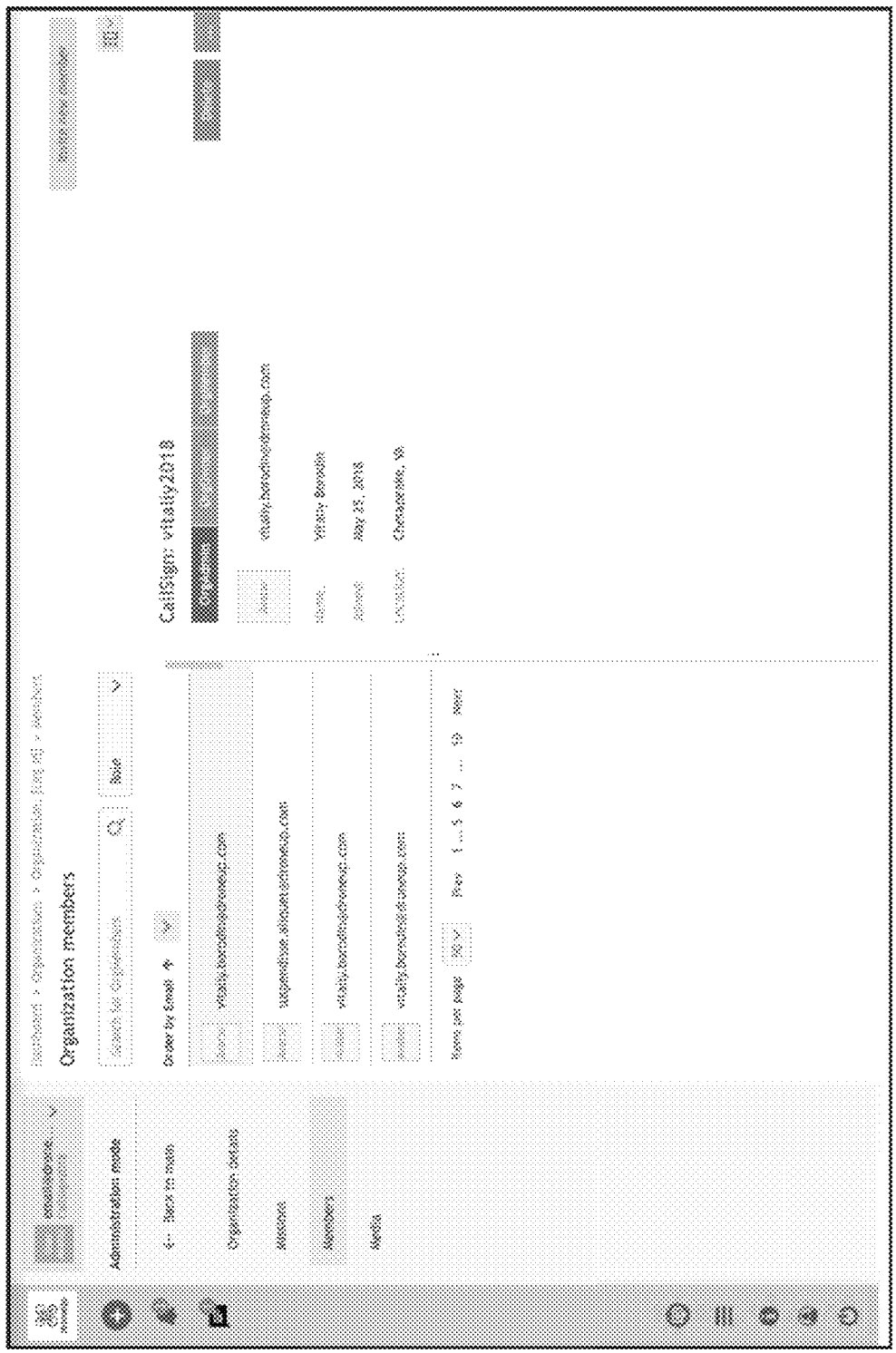
FIG. 36 is a web interface screenshot showing an administrative mode listing of organization members, viewable via an administrator view of a software application, according to an embodiment.

FIGS. 29-67 are web interface screenshots of various functionality of the common software application, viewable via an administrator view of a software application, according to some embodiments. For example, FIG. 29 shows a login screen via which an administrator can login, either directly (by entering a credential such as an email address) or using an existing Twitter, Facebook, or Google account. Upon logging in, the administrator can be presented with a main interface, as shown in FIG. 30, the main interface including navigation options such as Organizations, Badges, Credentials, Marketplace, Media, Missions, Teams, and Users pages. Example listings of Organizations within the web interface are shown in FIGS. 31-32, and an Organization details page is shown in FIG. 33. FIG. 34 shows an example pop-up window for input of an email address by which an "invitation to join" can be sent to an organization. FIG. 35 is a web interface screenshot showing an administrative mode listing of organizations, viewable via an administrator view of a software application, according to an embodiment. FIG. 36 is a web interface screenshot showing an administrative mode listing of organization members, viewable via an administrator view of a software application, according to an embodiment.

Figure 37:
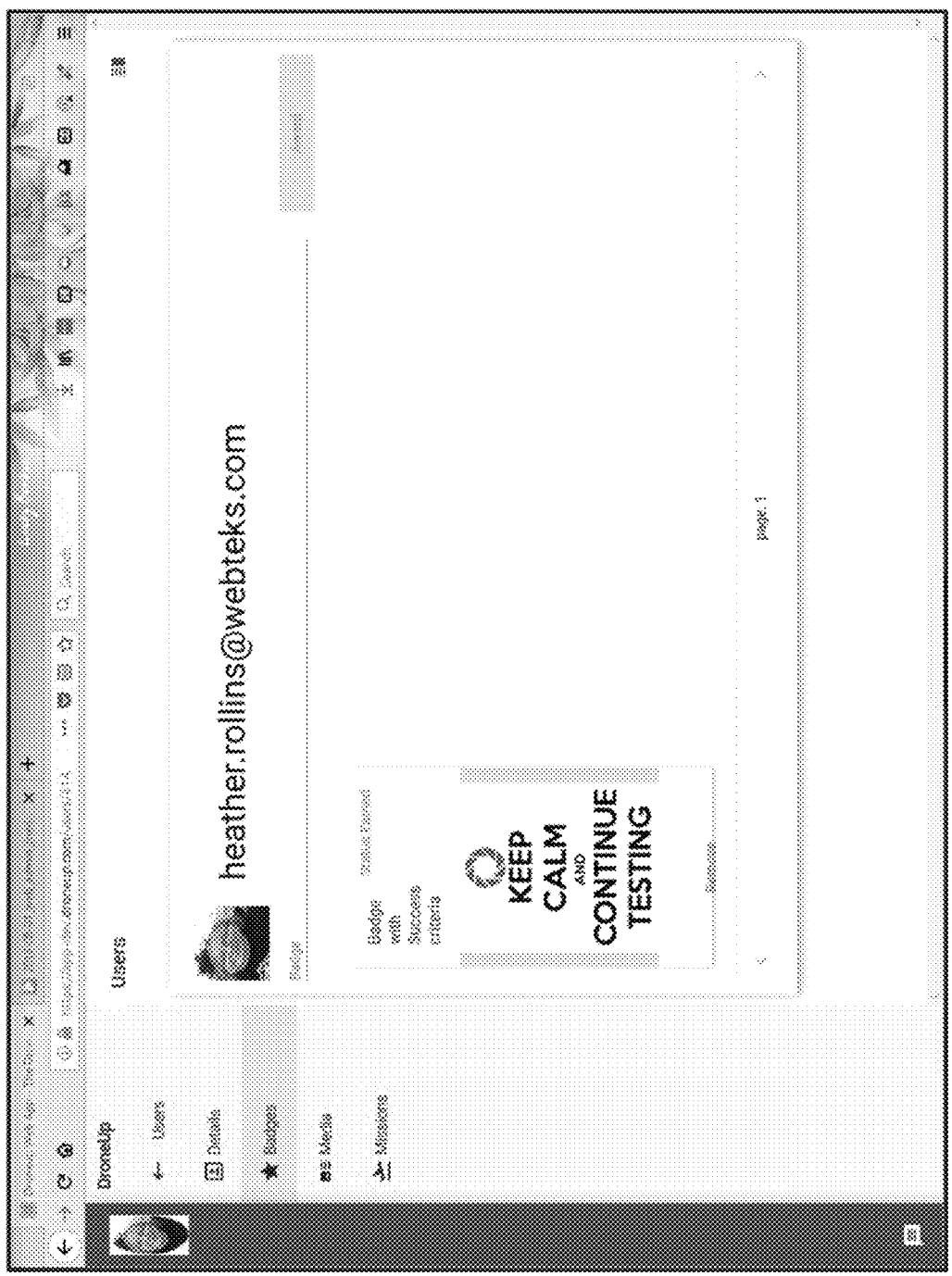
FIG. 37 is a web interface screenshot showing a user badge, viewable via an administrator view of a software application, according to an embodiment.
Figure 38:
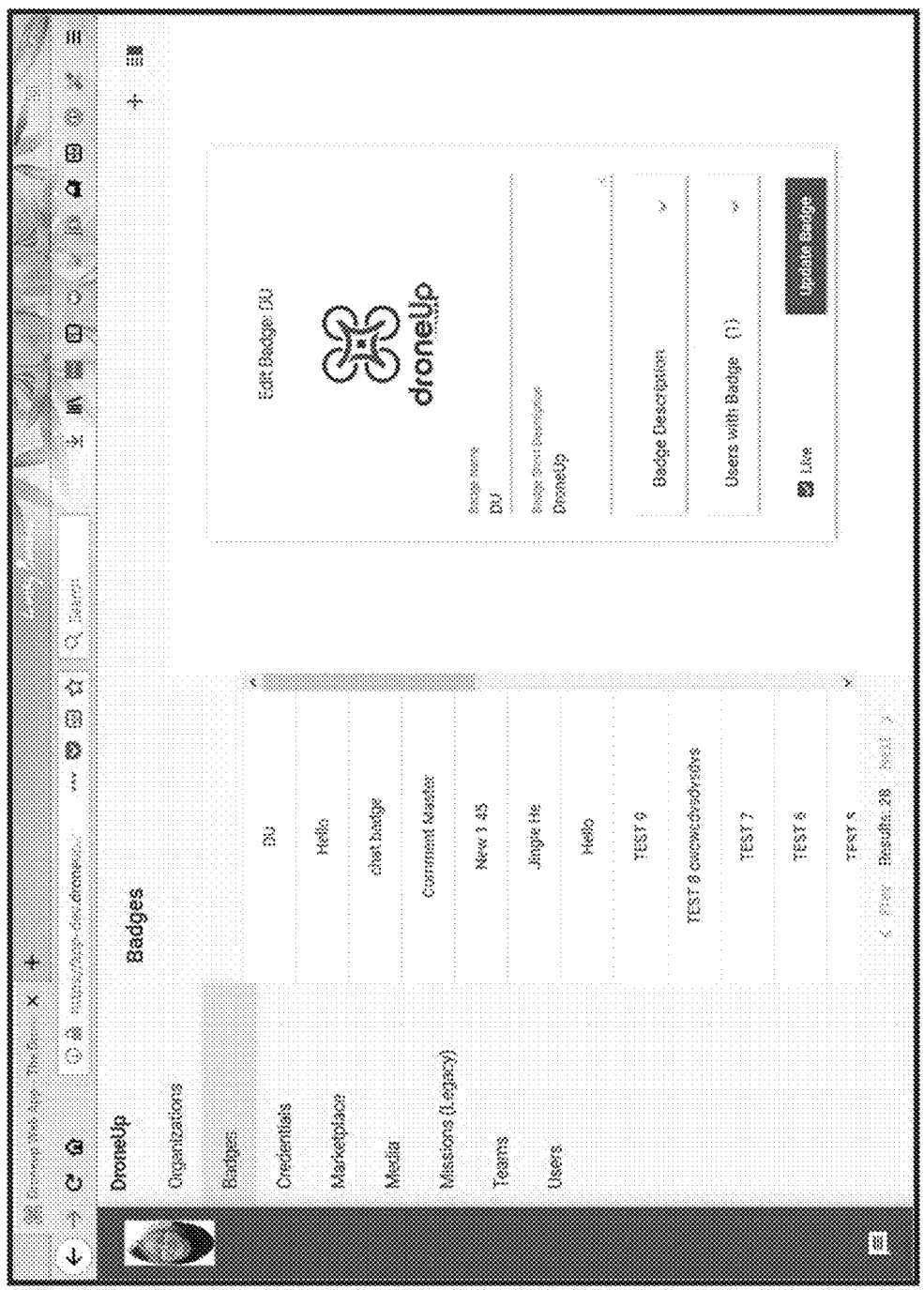
FIG. 38 is a web interface screenshot showing a badge editing window, viewable via an administrator view of a software application, according to an embodiment.
Figure 39:
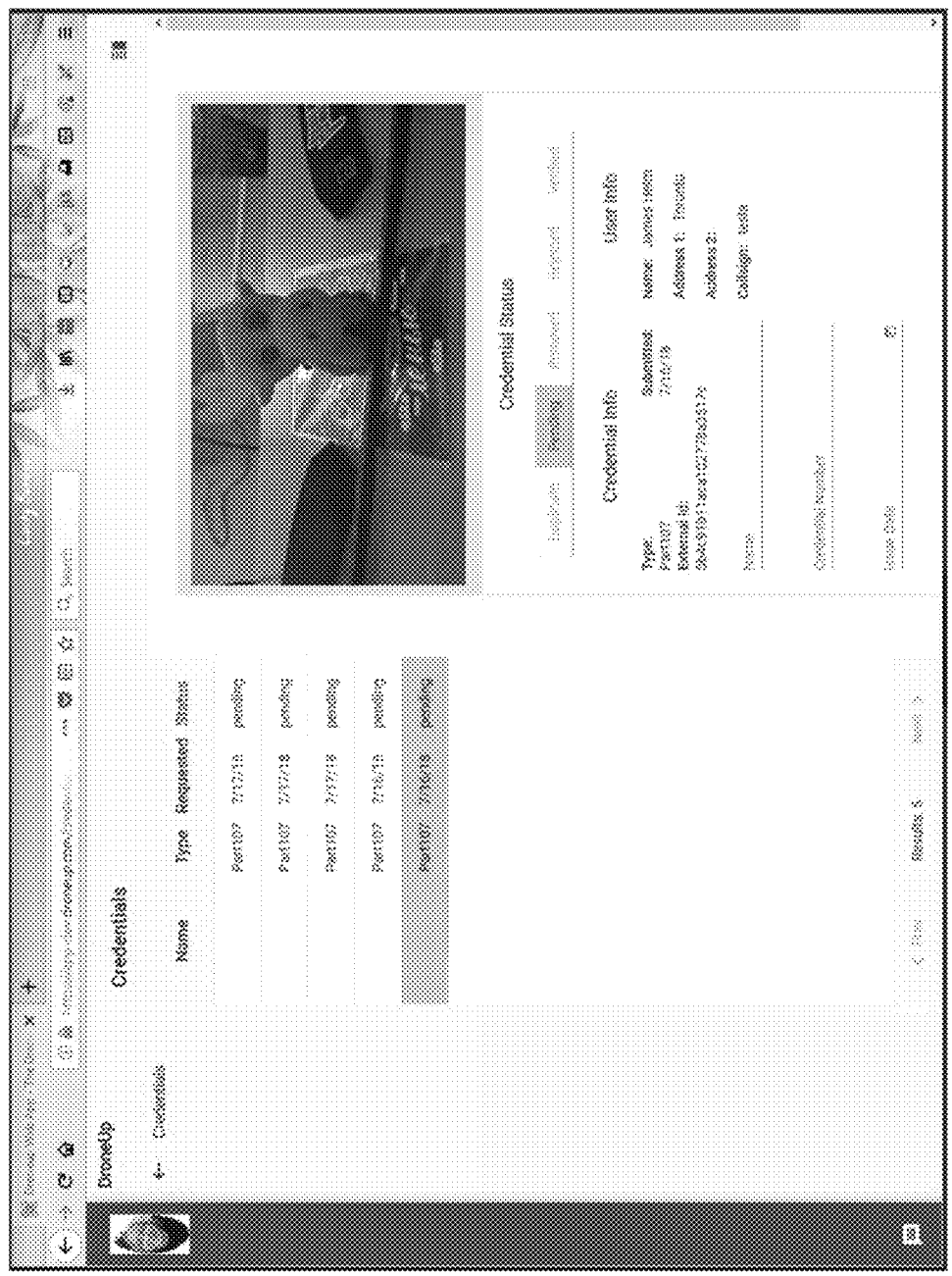
FIG. 39 is a web interface screenshot showing user credential statuses, viewable via an administrator view of a software application, according to an embodiment.
Figure 40:
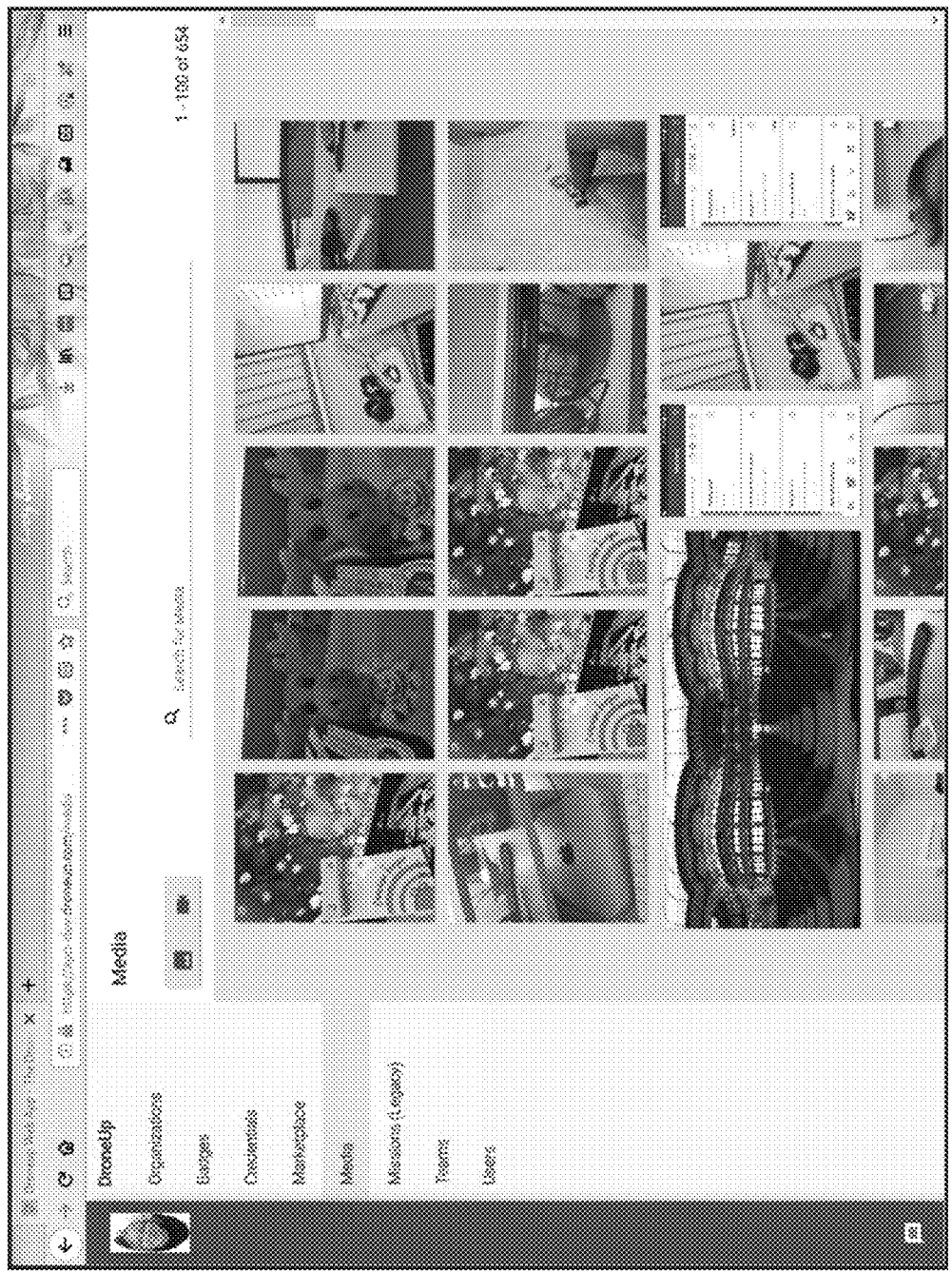
FIG. 40 is a web interface screenshot showing stored media, viewable via an administrator view of a software application, according to an embodiment.
Figure 41:
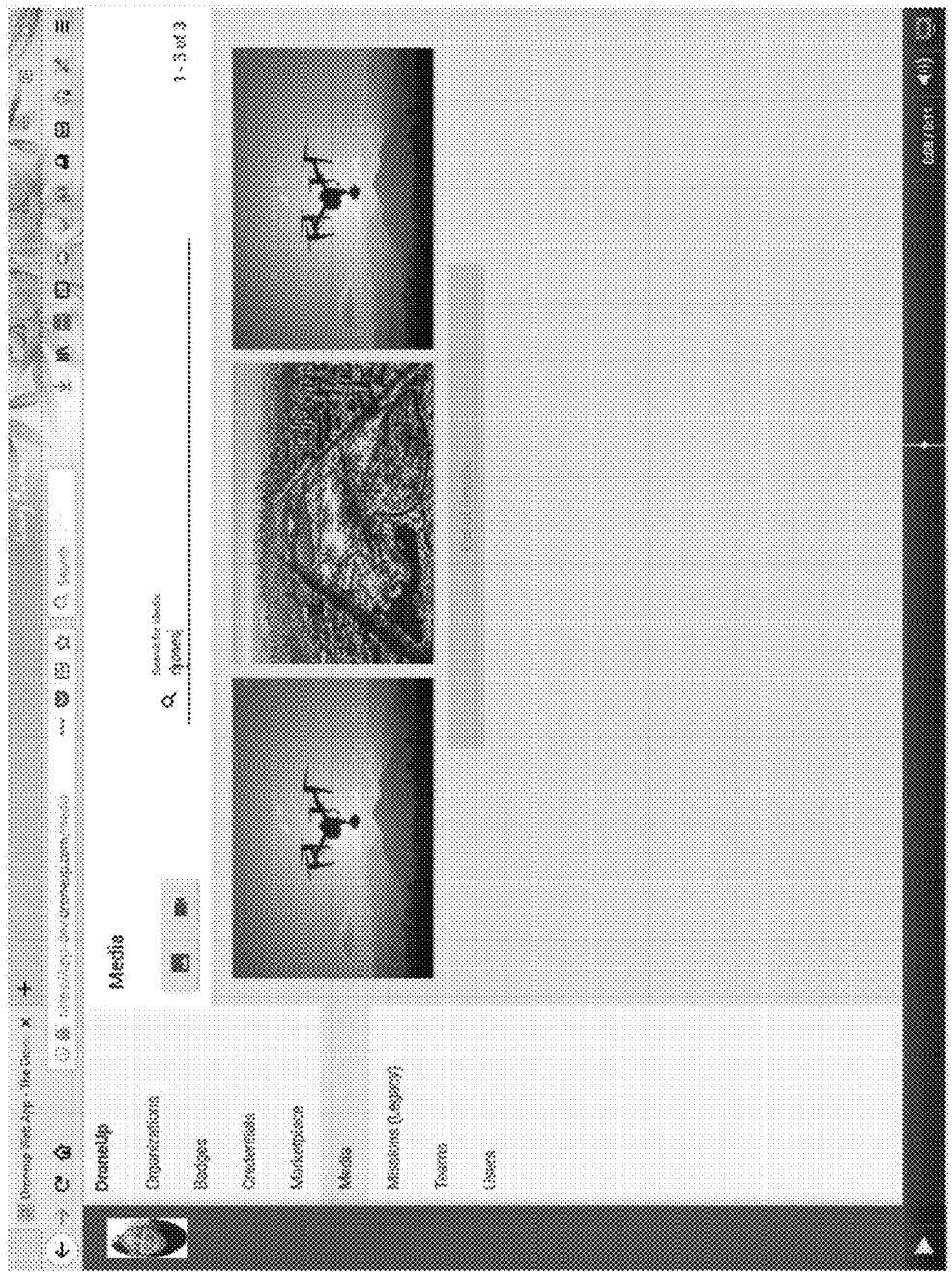
FIG. 41 is a web interface screenshot showing a media search screen, viewable via an administrator view of a software application, according to an embodiment.
Figure 42:
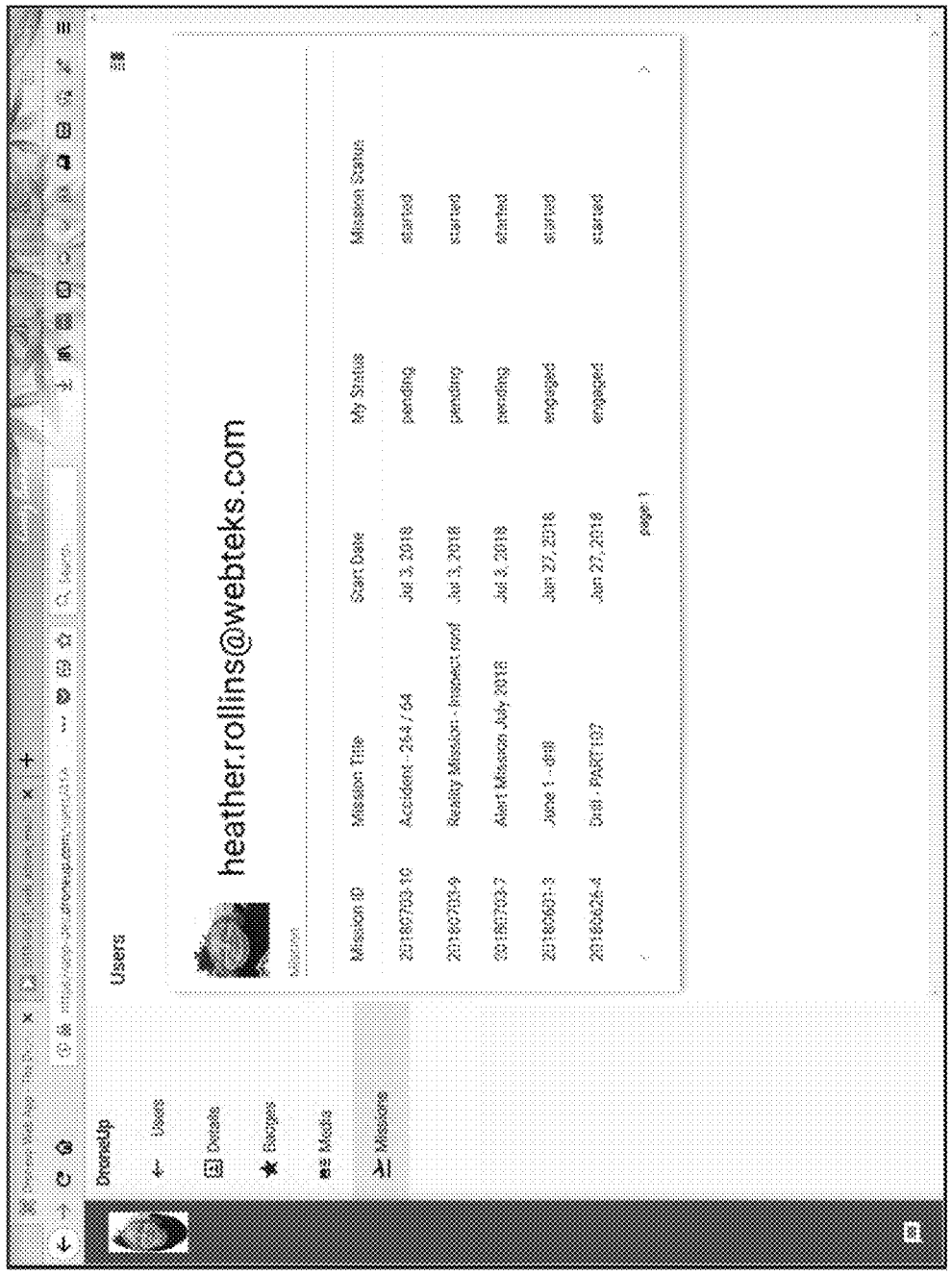
FIG. 42 is a web interface screenshot showing a user's mission listing, viewable via an administrator view of a software application, according to an embodiment.
Figure 43:
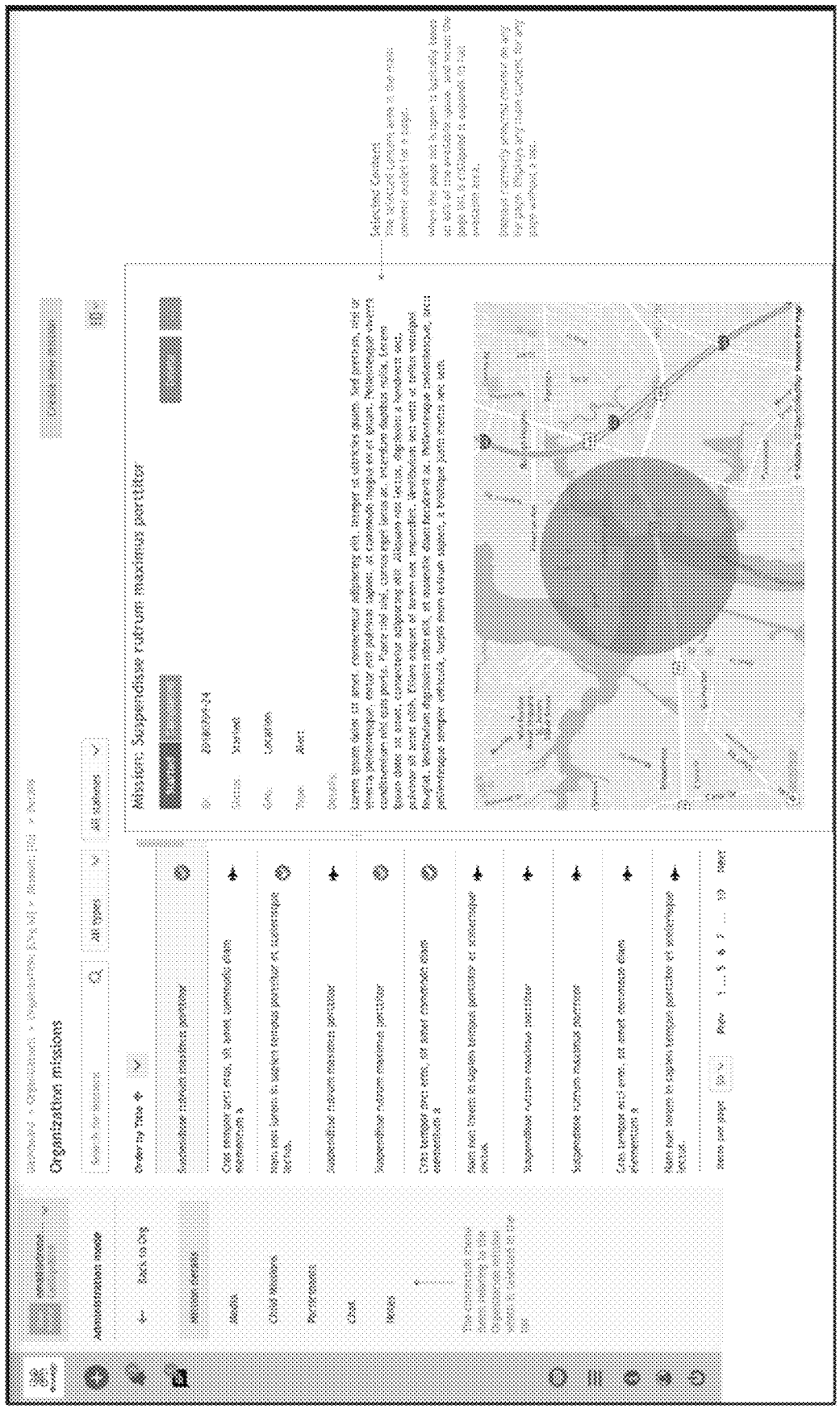
FIG. 43 is a web interface screenshot showing an administration mode, detail view listing of organization missions, viewable via an administrator view of a software application, according to an embodiment.
Figure 44:
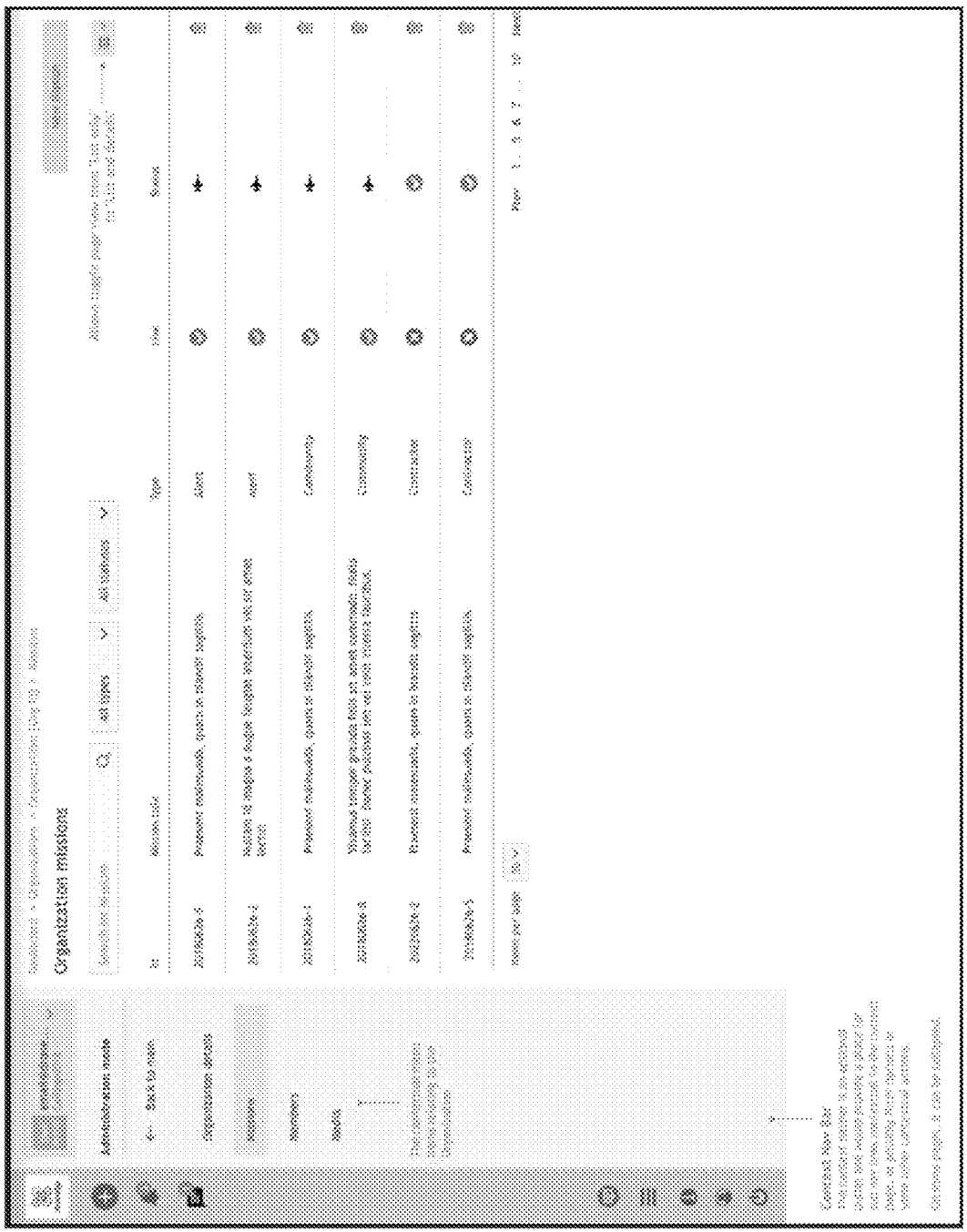
FIG. 44 is a web interface screenshot showing an administration mode listing of organization missions, viewable via an administrator view of a software application, according to an embodiment.

FIG. 37 is a web interface screenshot showing a user badge, viewable via an administrator view of a software application, according to an embodiment. FIG. 38 is a web interface screenshot showing a badge editing window, viewable via an administrator view of a software application, according to an embodiment. FIG. 39 is a web interface screenshot showing user credential statuses, viewable via an administrator view of a software application, according to an embodiment. FIG. 40 is a web interface screenshot showing stored media, viewable via an administrator view of a software application, according to an embodiment. FIG. 41 is a web interface screenshot showing a media search screen, viewable via an administrator view of a software application, according to an embodiment. FIG. 42 is a web interface screenshot showing a user's mission listing, viewable via an administrator view of a software application, according to an embodiment. FIG. 43 is a web interface screenshot showing an administration mode, detail view listing of organization missions, viewable via an administrator view of a software application, according to an embodiment. FIG. 44 is a web interface screenshot showing an administration mode listing of organization missions, viewable via an administrator view of a software application, according to an embodiment.

Figure 45:
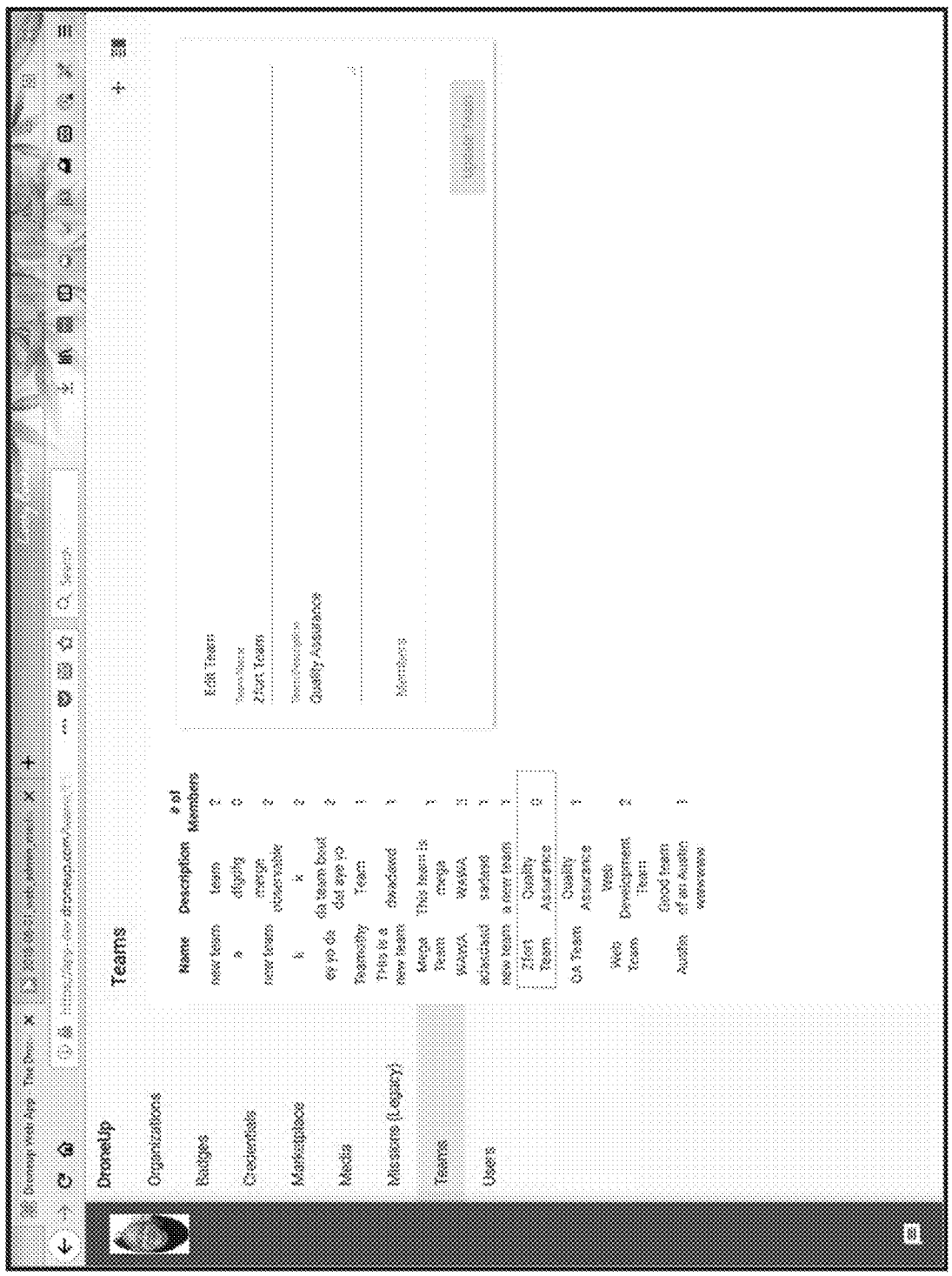
FIG. 45 is a web interface screenshot showing mission teams, viewable via an administrator view of a software application, according to an embodiment.
Figure 46:
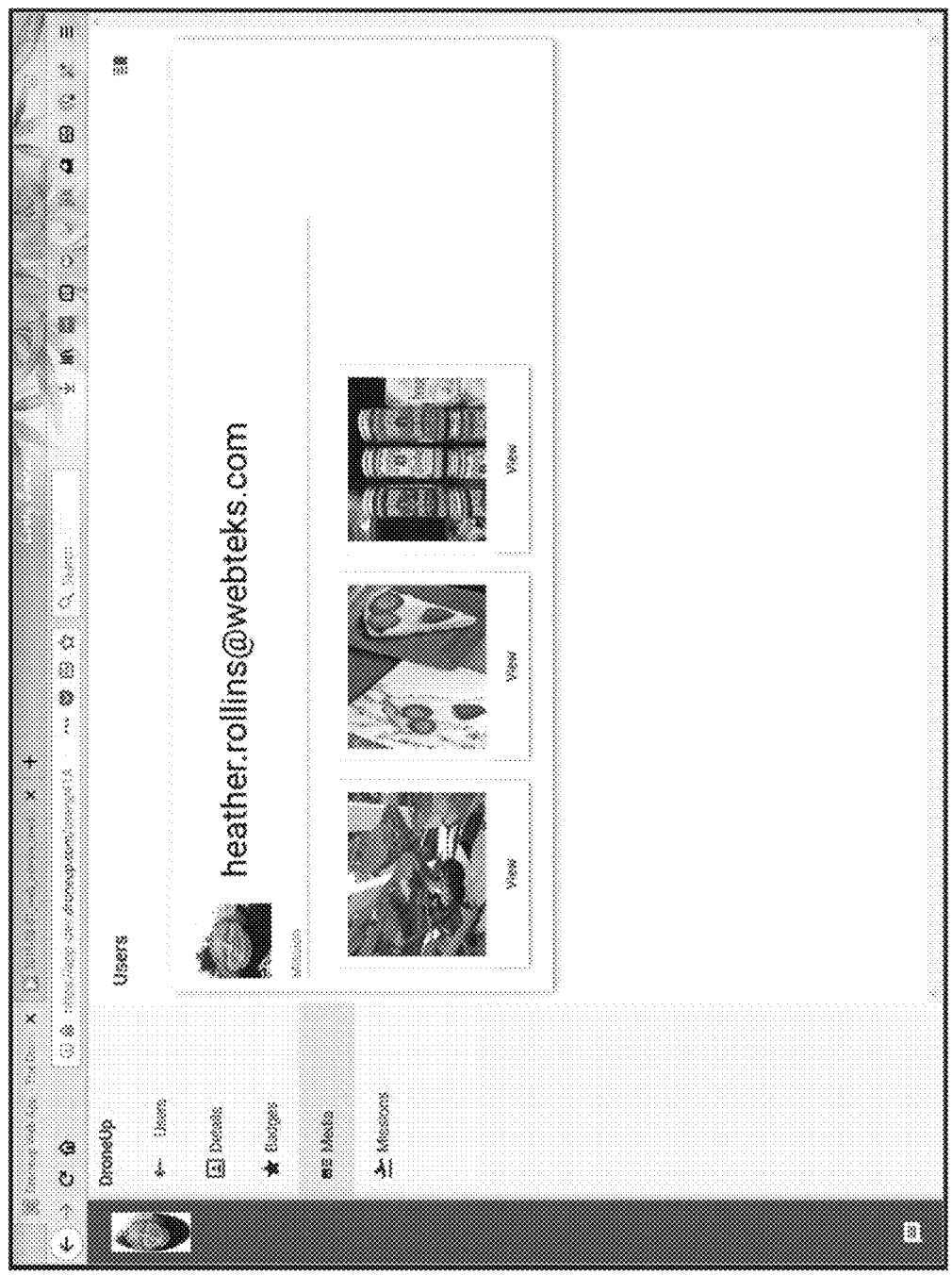
FIG. 46 is a web interface screenshot showing stored media, viewable via an administrator view of a software application, according to an embodiment.
Figure 47:
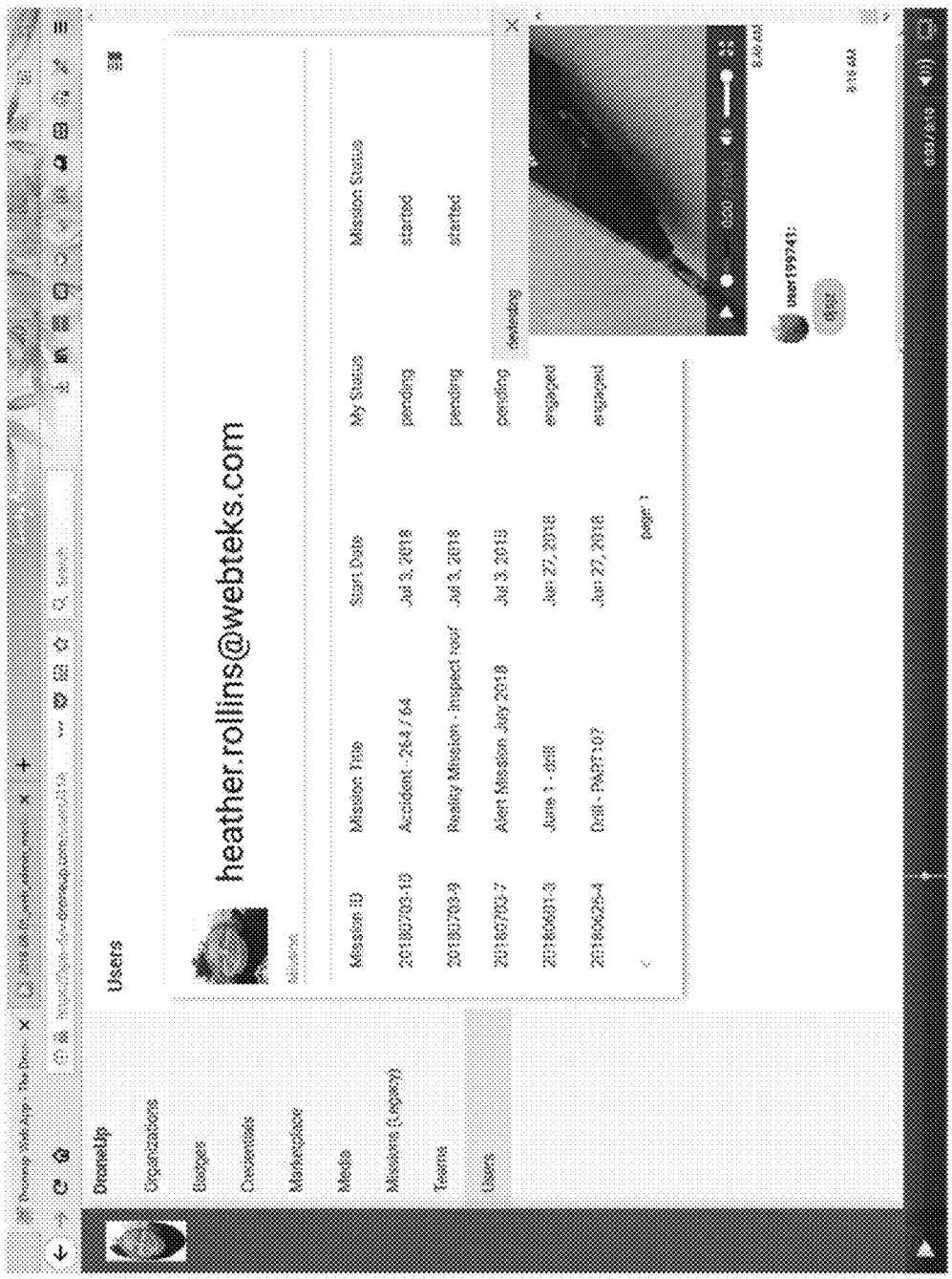
FIGS. 47-48 are web interface screenshots showing a user's mission listing and a chat interface, viewable via an administrator view of a software application, according to an embodiment.
Figure 48:
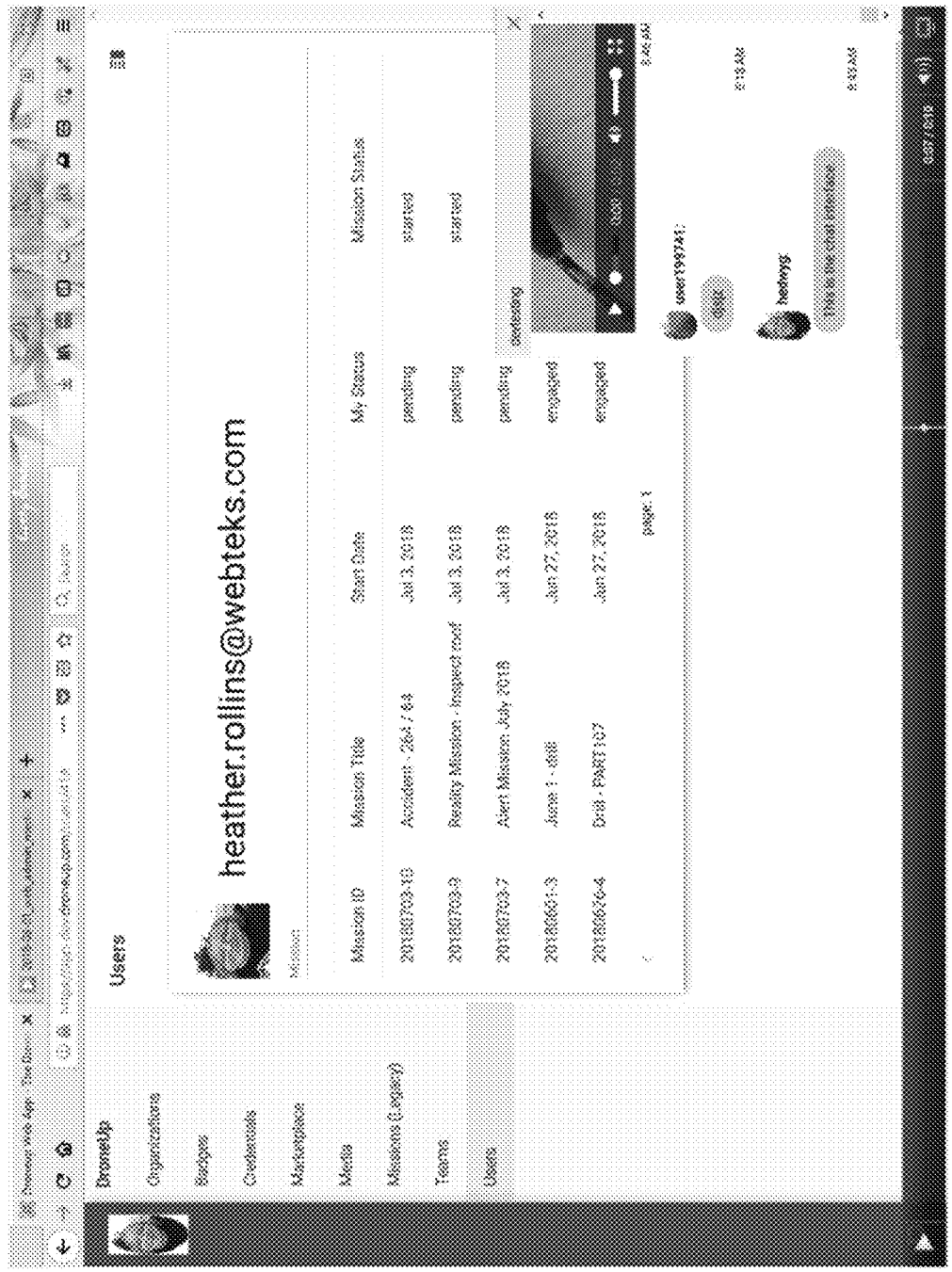
Figure 49:
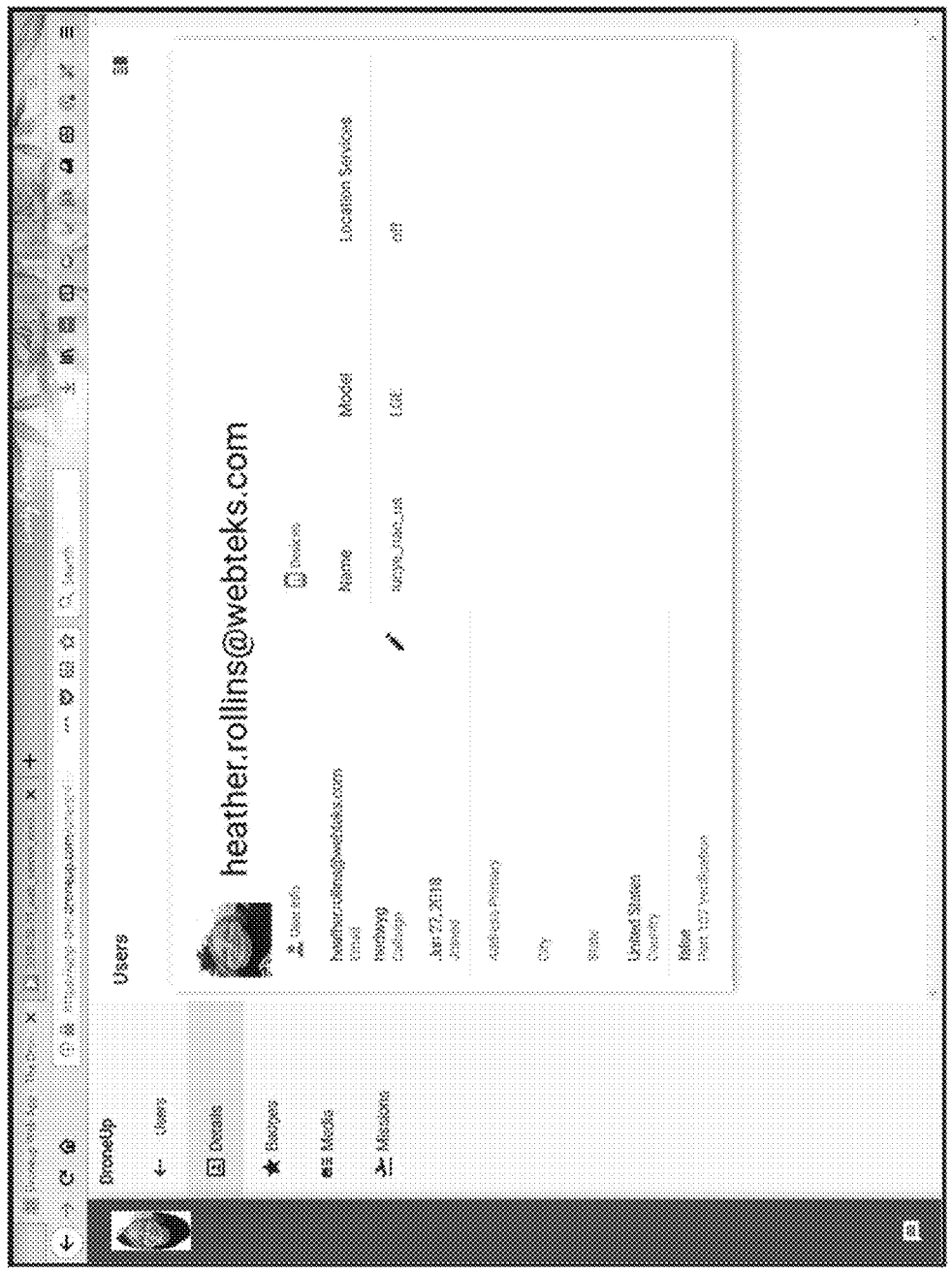
FIG. 49 is a web interface screenshot showing asset pilot user details, viewable via an administrator view of a software application, according to an embodiment.
Figure 50:
FIG. 50 is a web interface screenshot showing an example Marketplace entry including details of a mission, viewable via an administrator view of a software application, according to an embodiment.

FIG. 45 is a web interface screenshot showing mission teams, viewable via an administrator view of a software application, according to an embodiment. FIG. 46 is a web interface screenshot showing stored media, viewable via an administrator view of a software application, according to an embodiment. FIGS. 47-48 are web interface screenshots showing a user's mission listing and a chat interface, viewable via an administrator view of a software application, according to an embodiment. FIG. 49 is a web interface screenshot showing asset pilot user details, viewable via an administrator view of a software application, according to an embodiment. FIG. 50 is a web interface screenshot showing an example Marketplace entry including details of a mission, viewable via an administrator view of a software application, according to an embodiment.

Figure 51:
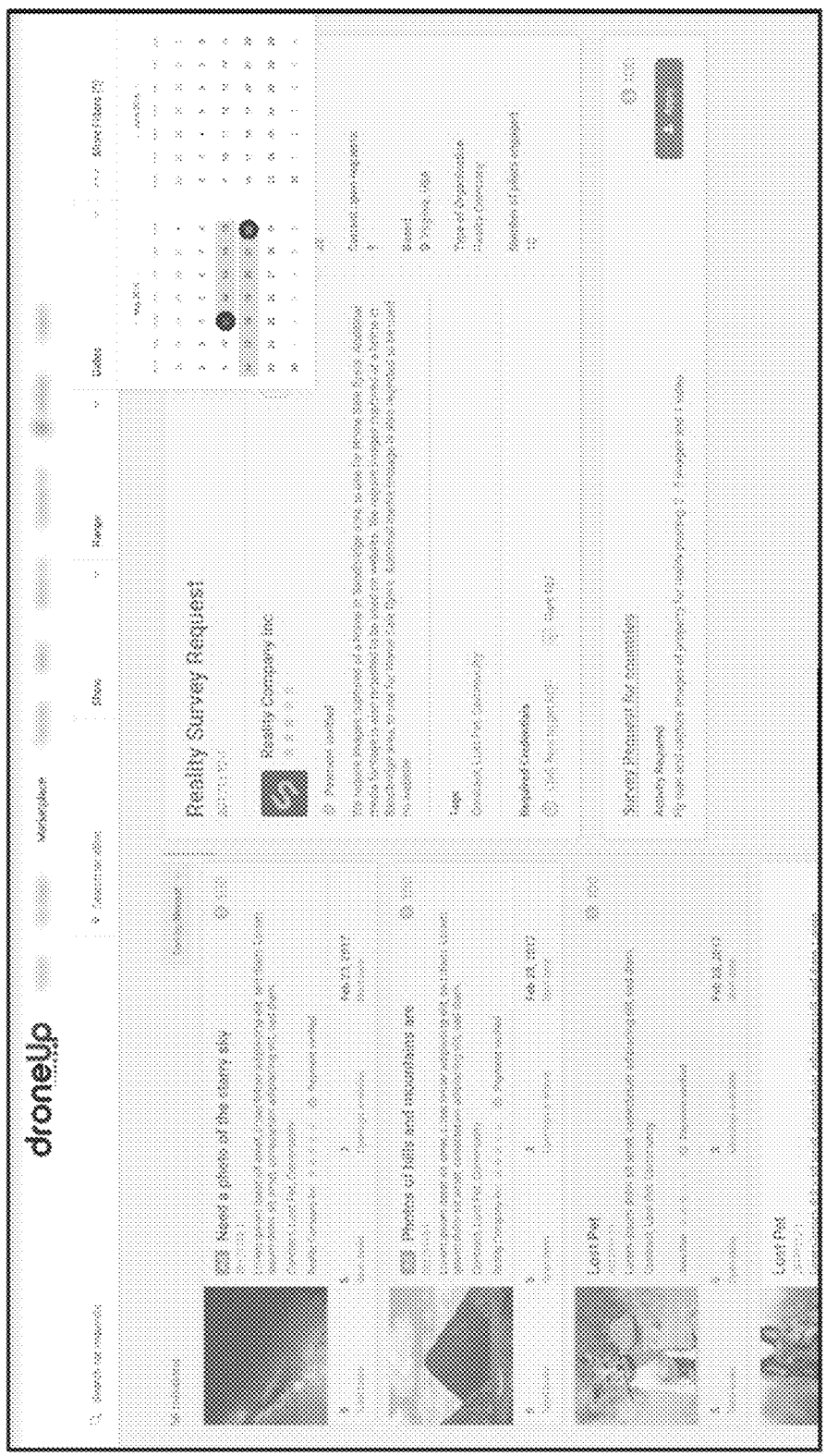
FIG. 51 is a web interface screenshot showing a date filtering feature of the Marketplace, viewable via an administrator view of a software application, according to an embodiment.
Figure 52:
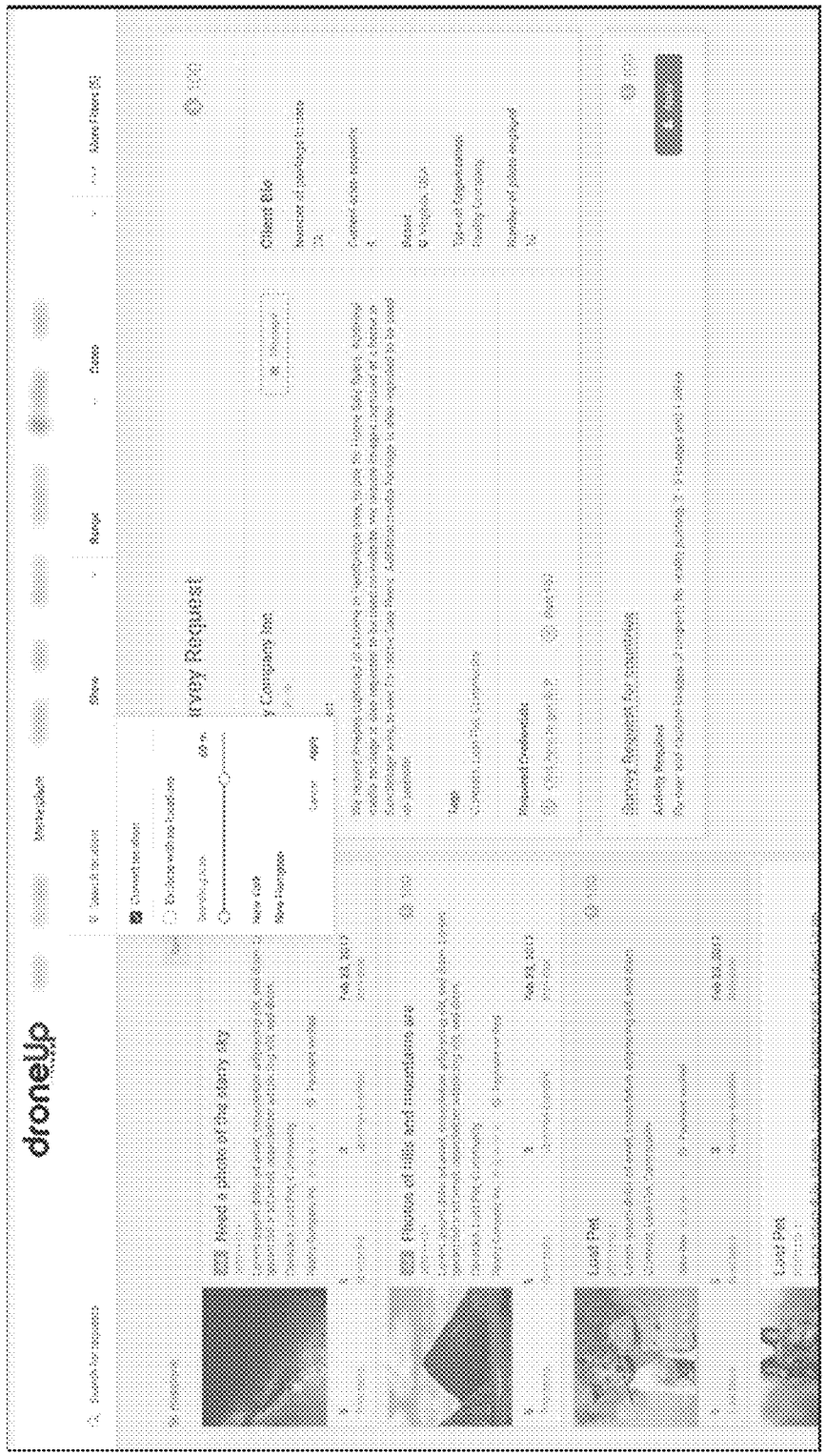
FIG. 52 is a web interface screenshot showing a location filtering feature of the Marketplace, viewable via an administrator view of a software application, according to an embodiment.
Figure 53:
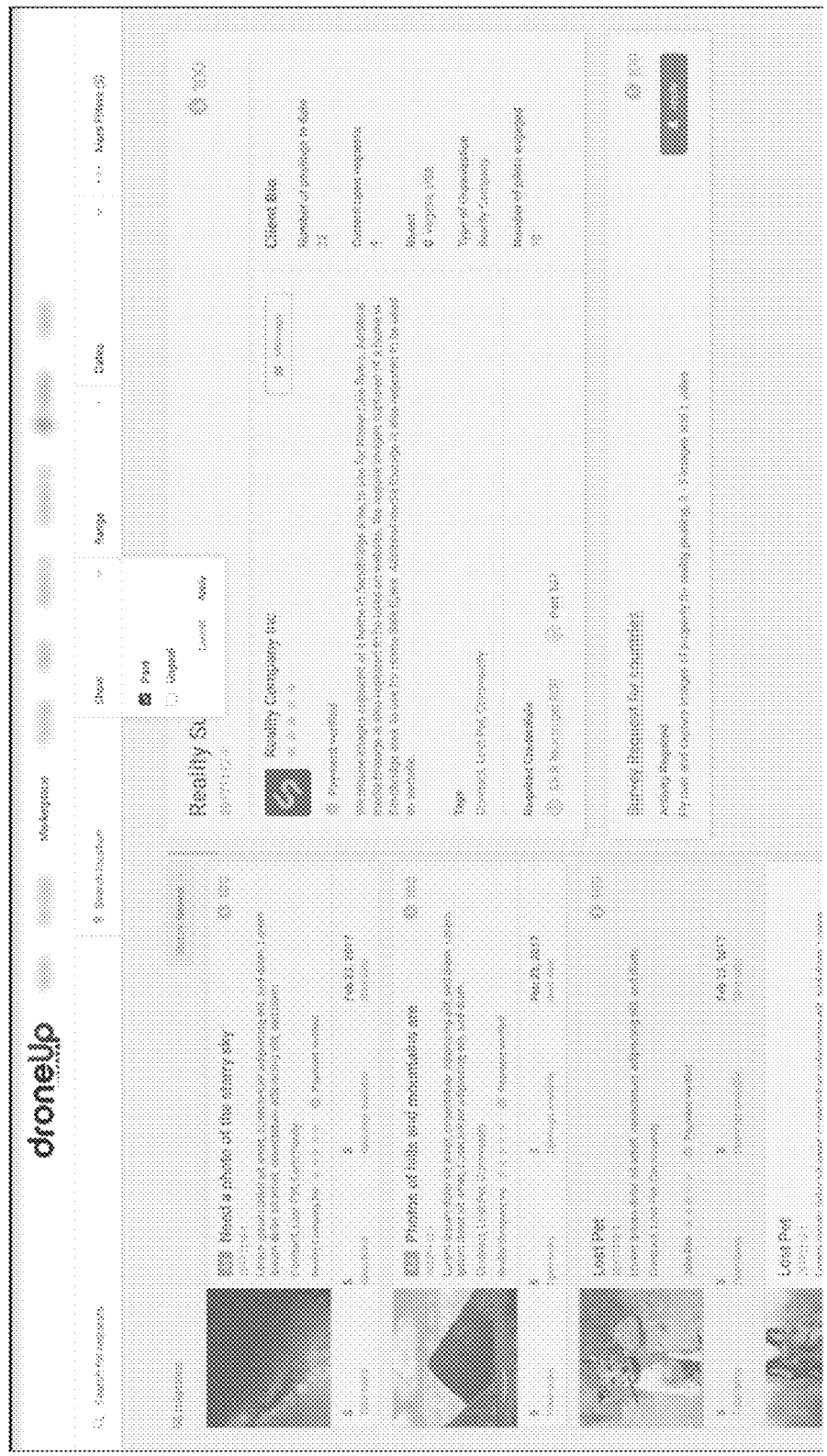
FIG. 53 is a web interface screenshot showing a payment status filtering feature of the Marketplace, viewable via an administrator view of a software application, according to an embodiment.

FIG. 51 is a web interface screenshot showing a date filtering feature of the Marketplace, viewable via an administrator view of a software application, according to an embodiment. FIG. 52 is a web interface screenshot showing a location filtering feature of the Marketplace, viewable via an administrator view of a software application, according to an embodiment. FIG. 53 is a web interface screenshot showing a payment status filtering feature of the Marketplace, viewable via an administrator view of a software application, according to an embodiment.

Figure 54:
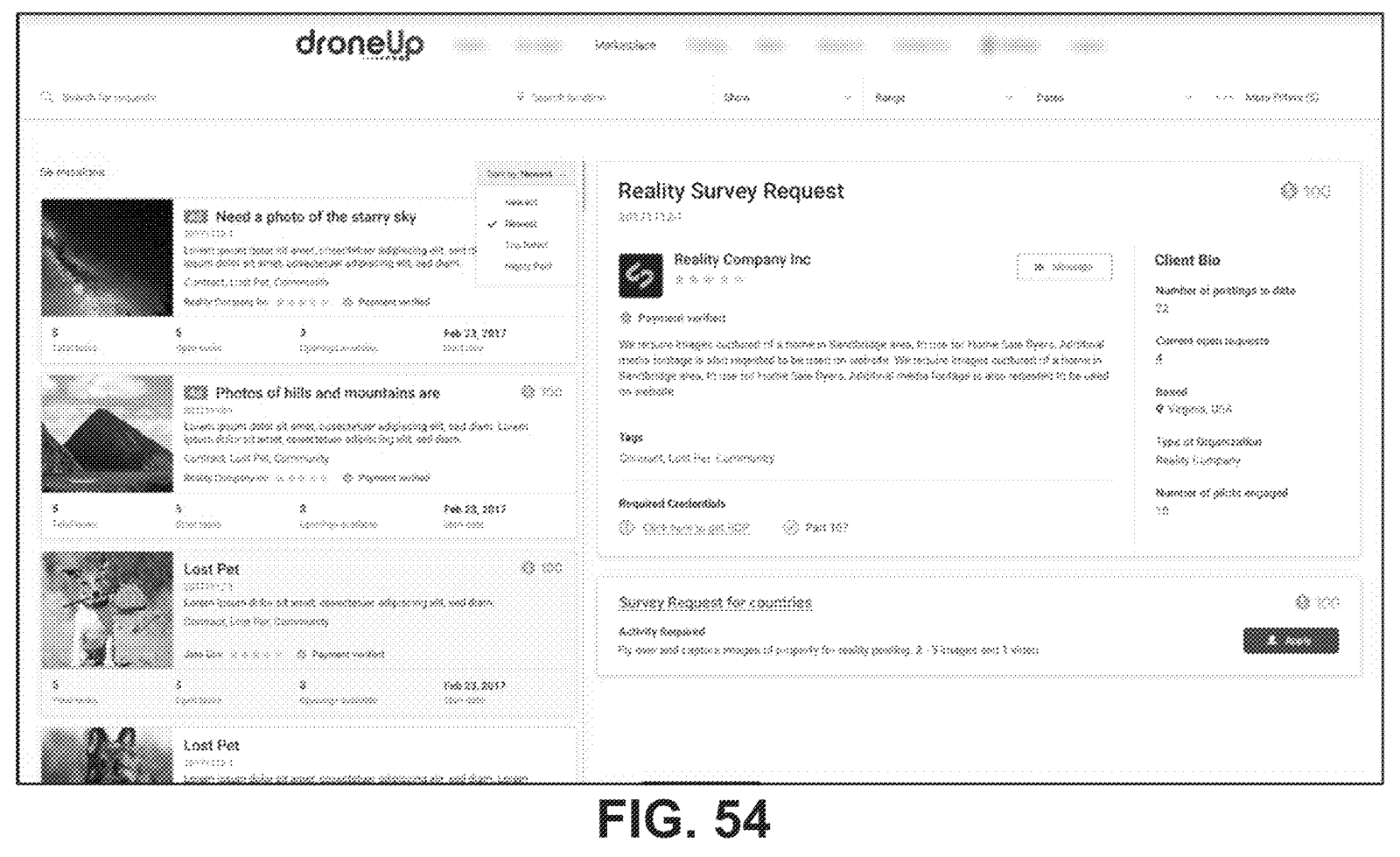
Figure 55:
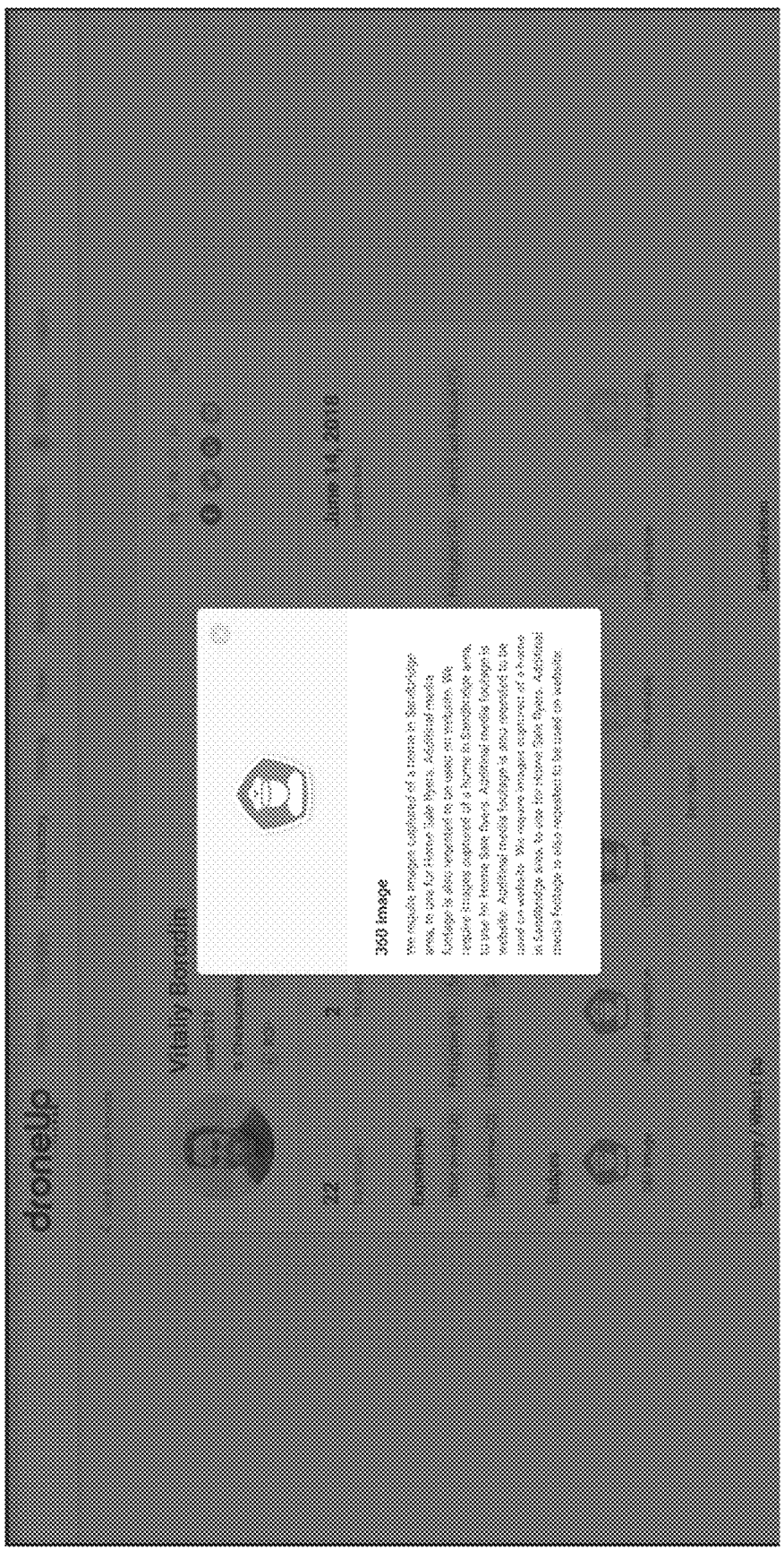
FIG. 55 is a web interface screenshot showing a Marketplace asset pilot badge, viewable via an administrator view of a software application, according to an embodiment.
Figure 56:
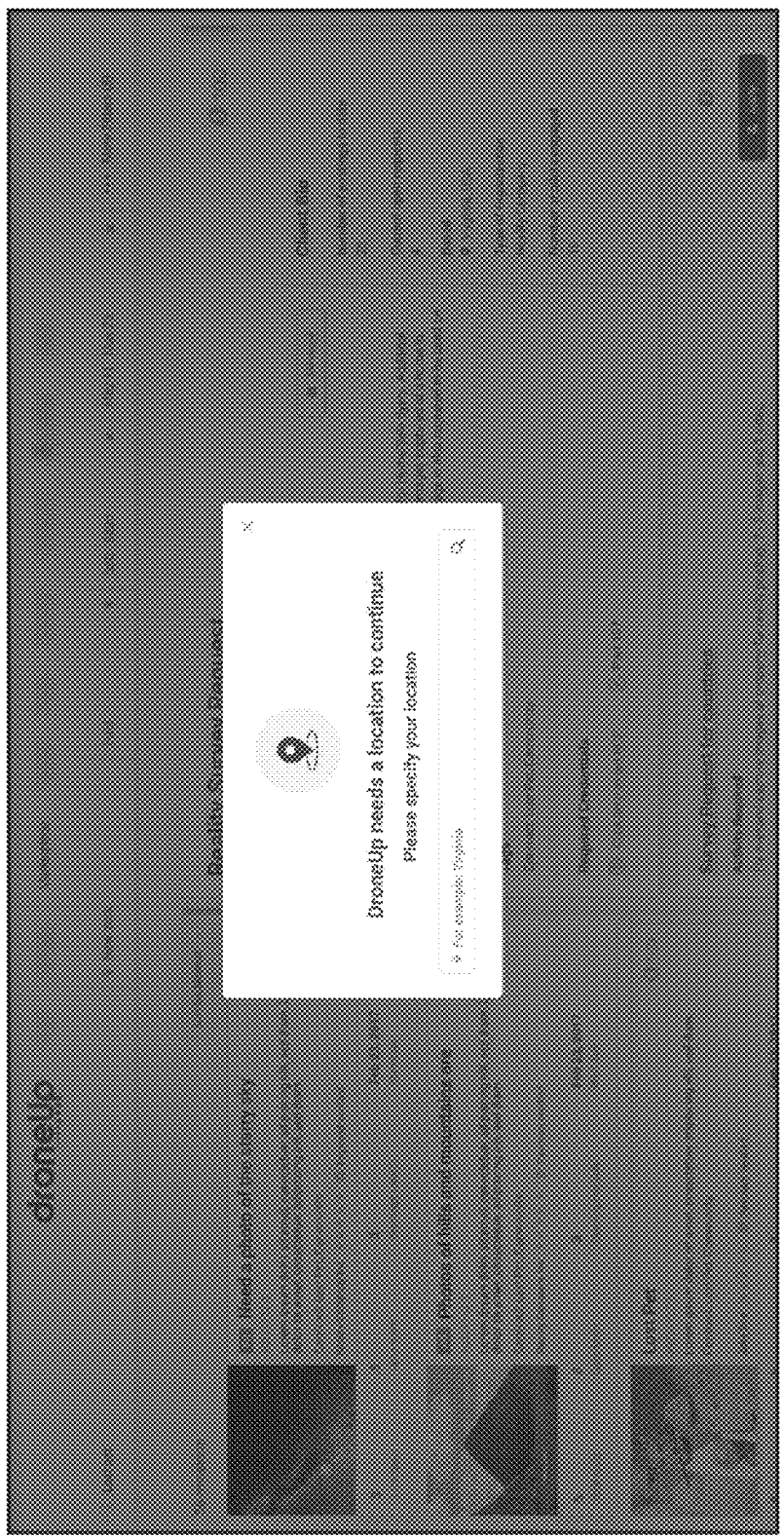
FIG. 56 is a web interface screenshot showing a Marketplace location pop-up window, viewable via an administrator view of a software application, according to an embodiment.
Figure 57:
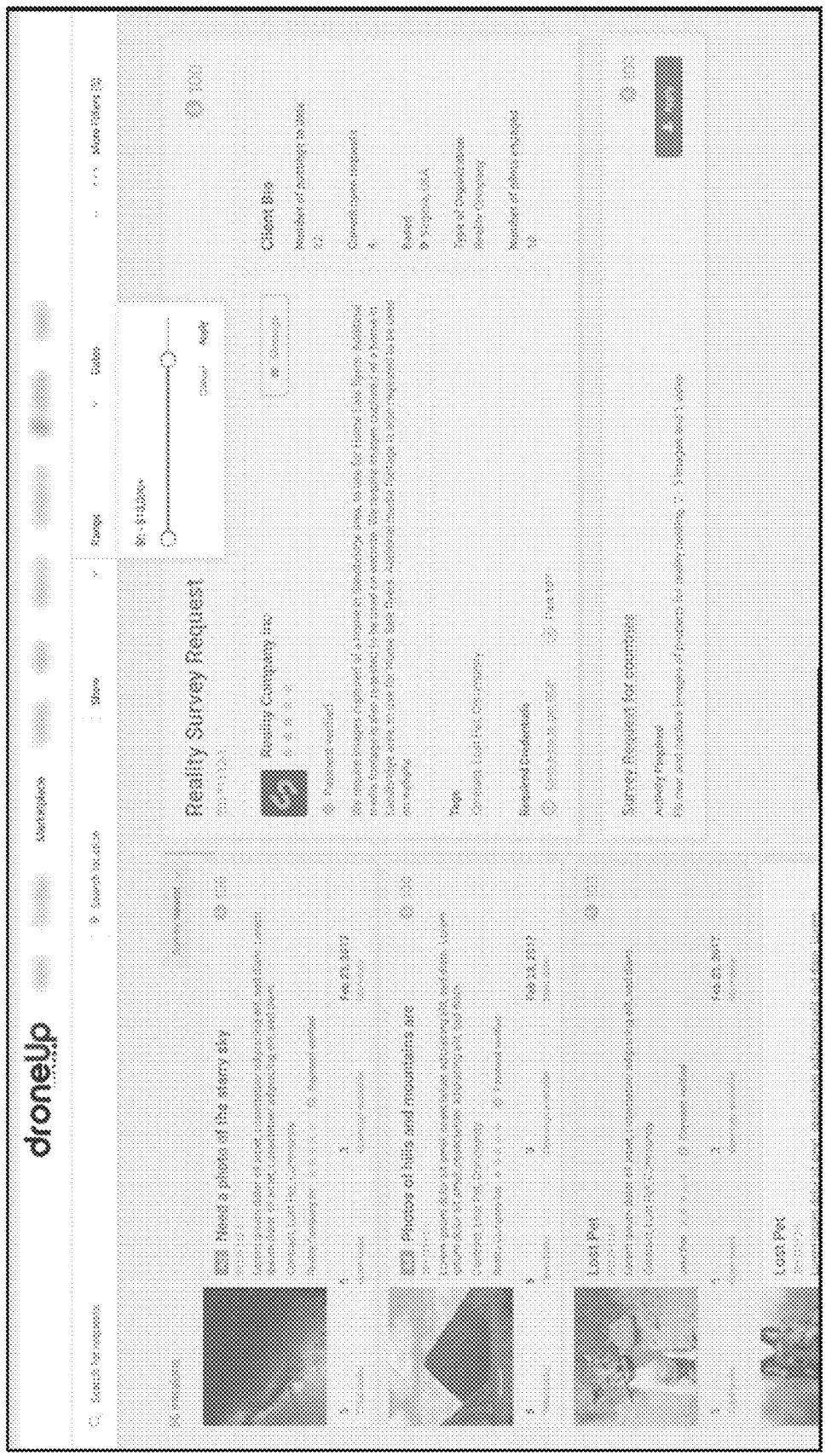
FIG. 57 is a web interface screenshot showing a price range filtering feature of the Marketplace, viewable via an administrator view of a software application, according to an embodiment.
Figure 58:
FIG. 58 is a web interface screenshot showing a Marketplace browse screen, viewable via an administrator view of a software application, according to an embodiment.
Figure 59:
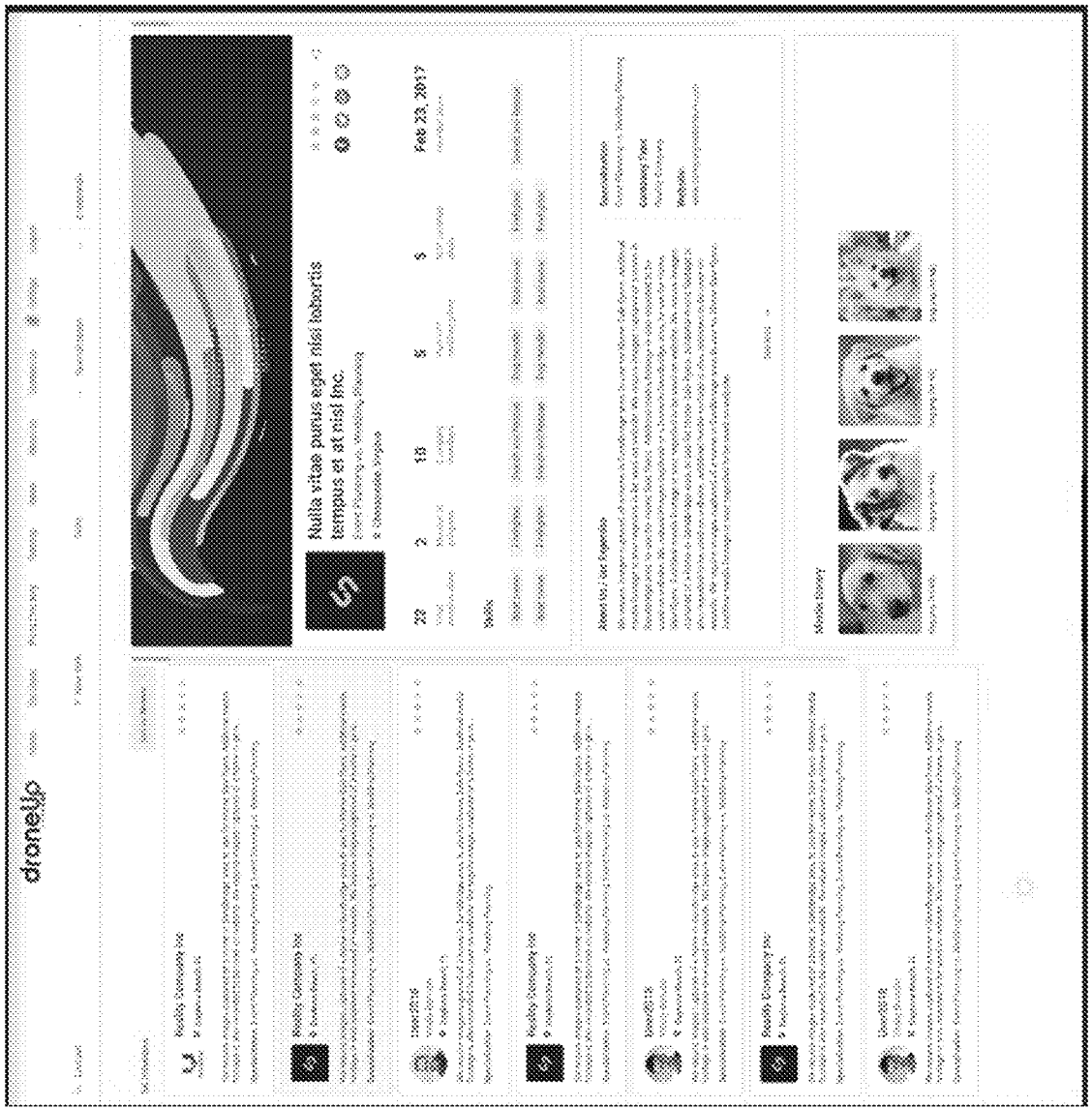
FIG. 59 is a web interface screenshot showing a Marketplace organization details screen, viewable via an administrator view of a software application, according to an embodiment.

FIG. 54 is a web interface screenshot showing a Marketplace entry sort feature, viewable via an administrator view of a software application, according to an embodiment. FIG. 55 is a web interface screenshot showing a Marketplace asset pilot badge, viewable via an administrator view of a software application, according to an embodiment. FIG. 56 is a web interface screenshot showing a Marketplace location pop-up window, viewable via an administrator view of a software application, according to an embodiment. FIG. 57 is a web interface screenshot showing a price range filtering feature of the Marketplace, viewable via an administrator view of a software application, according to an embodiment. FIG. 58 is a web interface screenshot showing a Marketplace browse screen, viewable via an administrator view of a software application, according to an embodiment. FIG. 59 is a web interface screenshot showing a Marketplace organization details screen, viewable via an administrator view of a software application, according to an embodiment.

Figure 60:
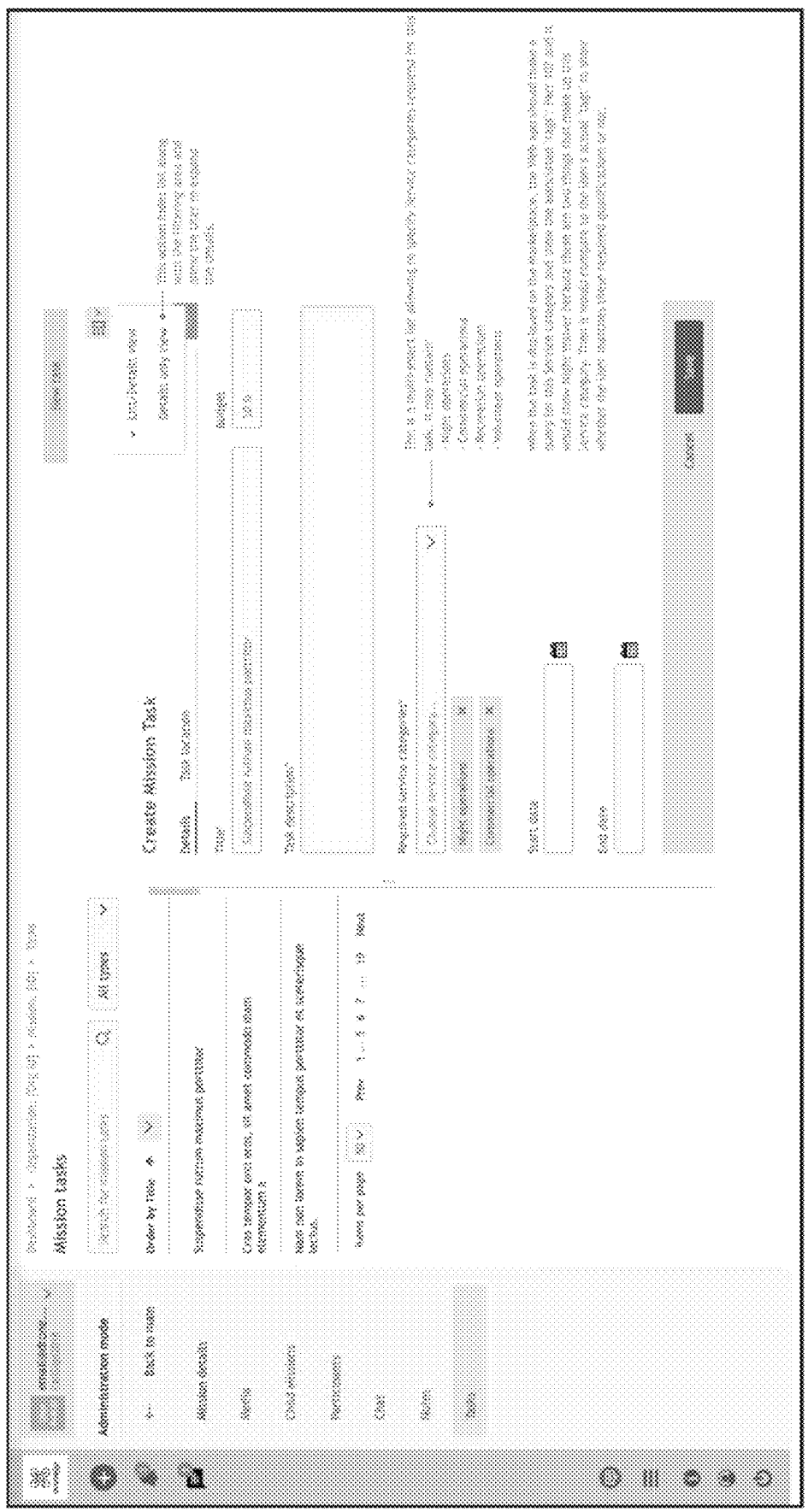
FIG. 60 is a web interface screenshot of a mission creation window showing view type selection option, viewable via an administrator view of a software application, according to an embodiment.
Figure 61:
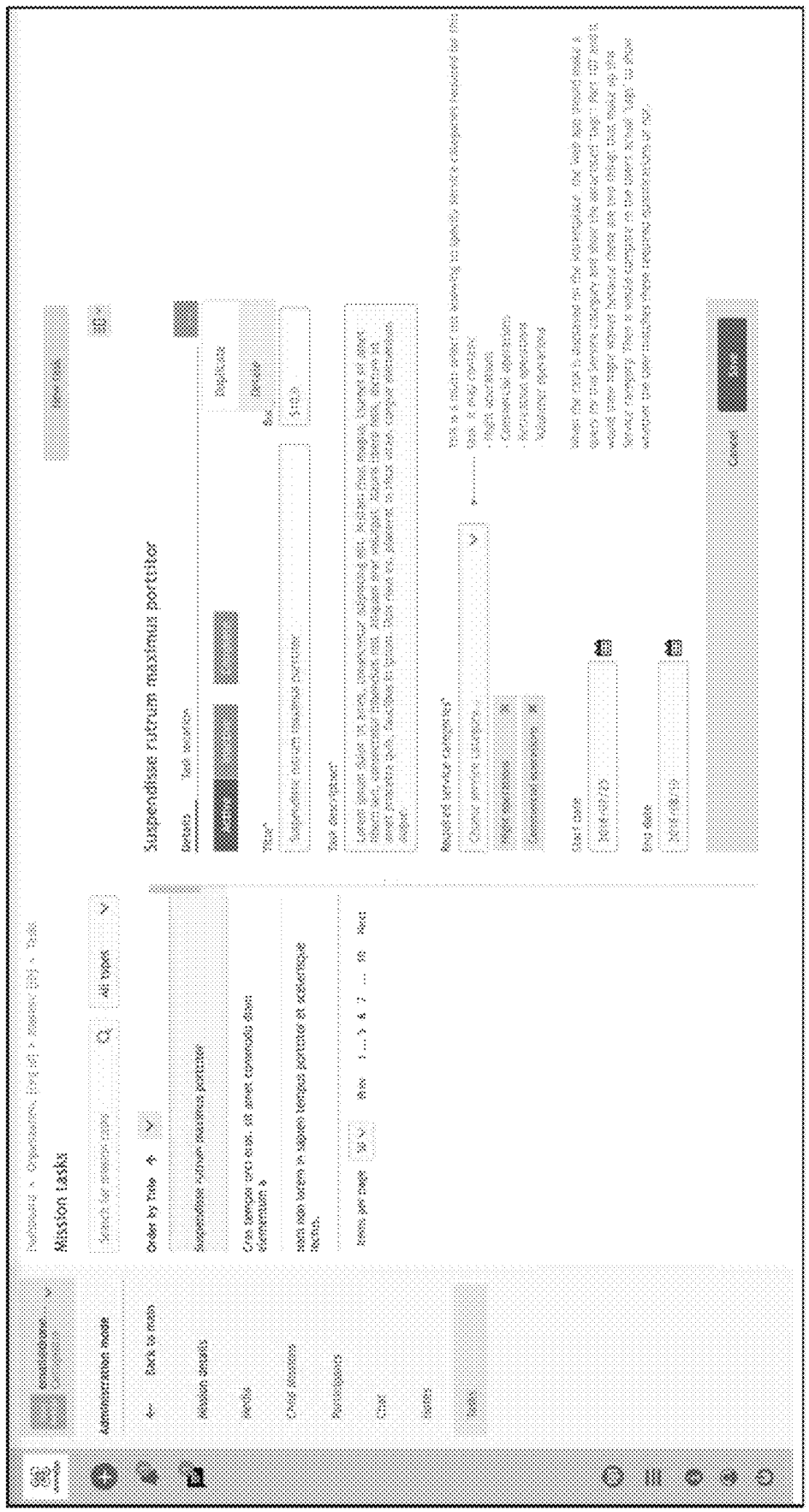
FIG. 61 is a web interface screenshot of a mission creation window showing duplicate and delete options, viewable via an administrator view of a software application, according to an embodiment.
Figure 62:
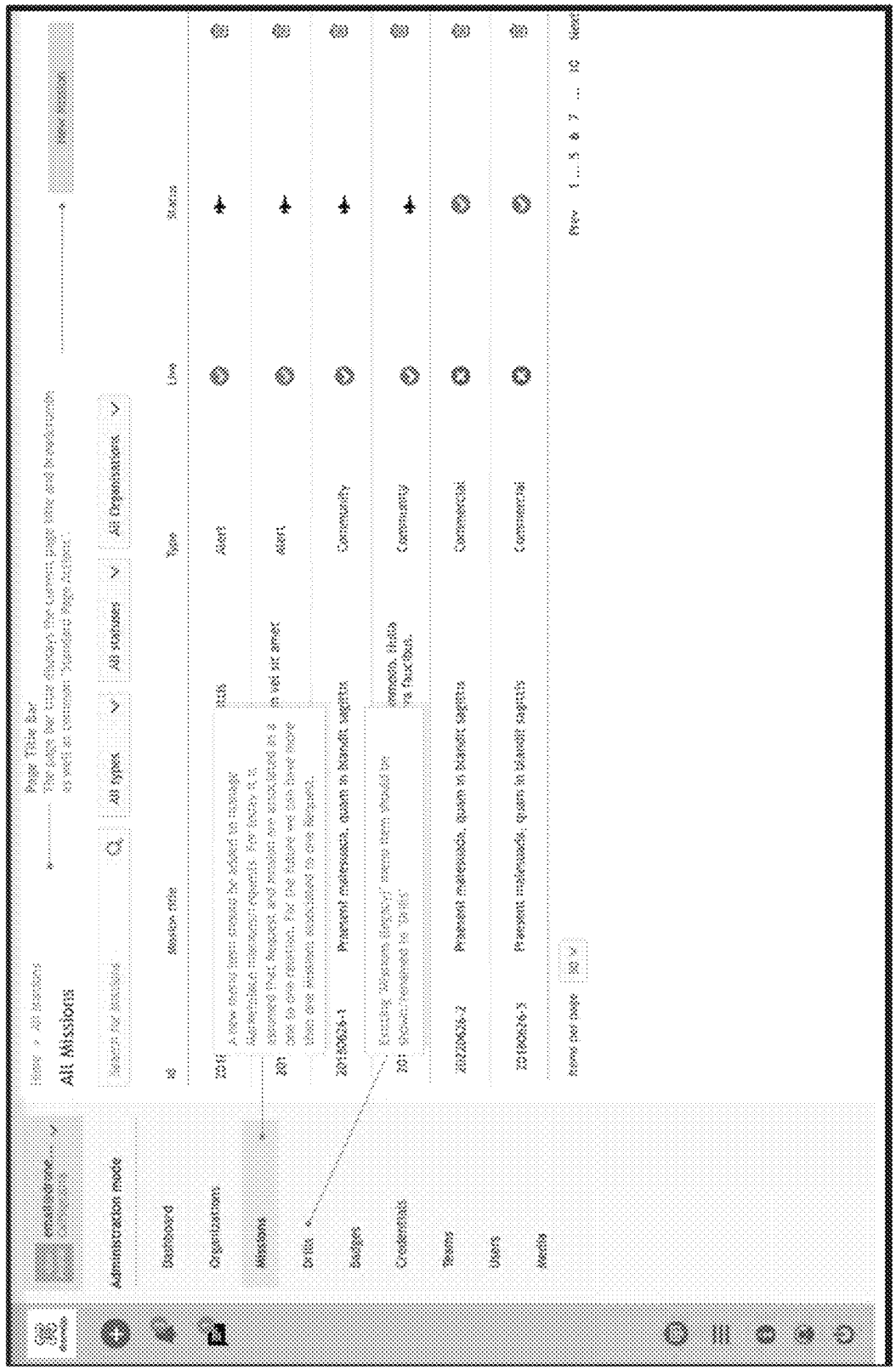
FIG. 62 is a web interface screenshot showing mission requests, viewable via an administrator view of a software application, according to an embodiment.
Figure 63:
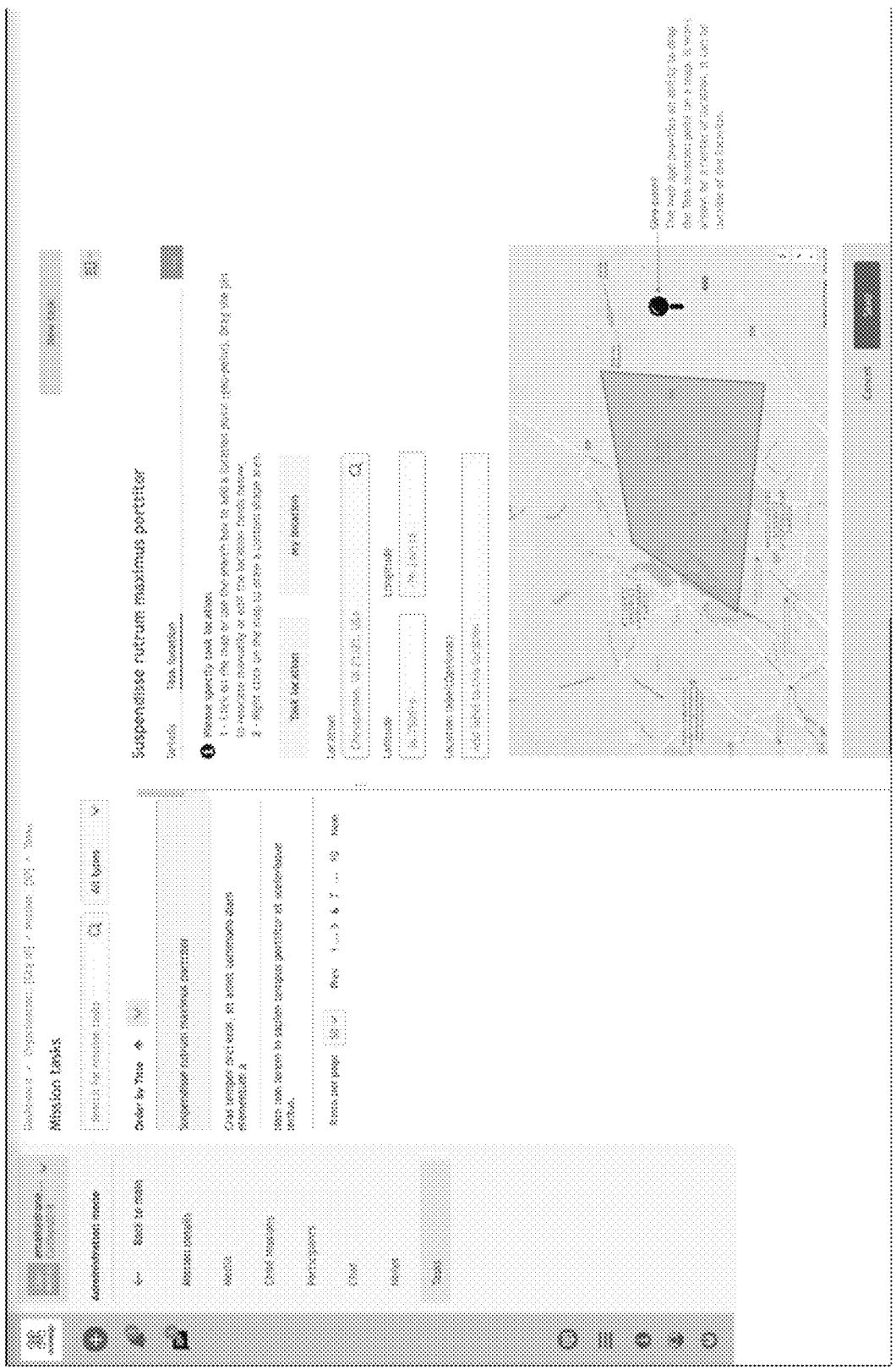
FIG. 63 is a web interface screenshot showing mission task location data, viewable via an administrator view of a software application, according to an embodiment.
Figure 64:
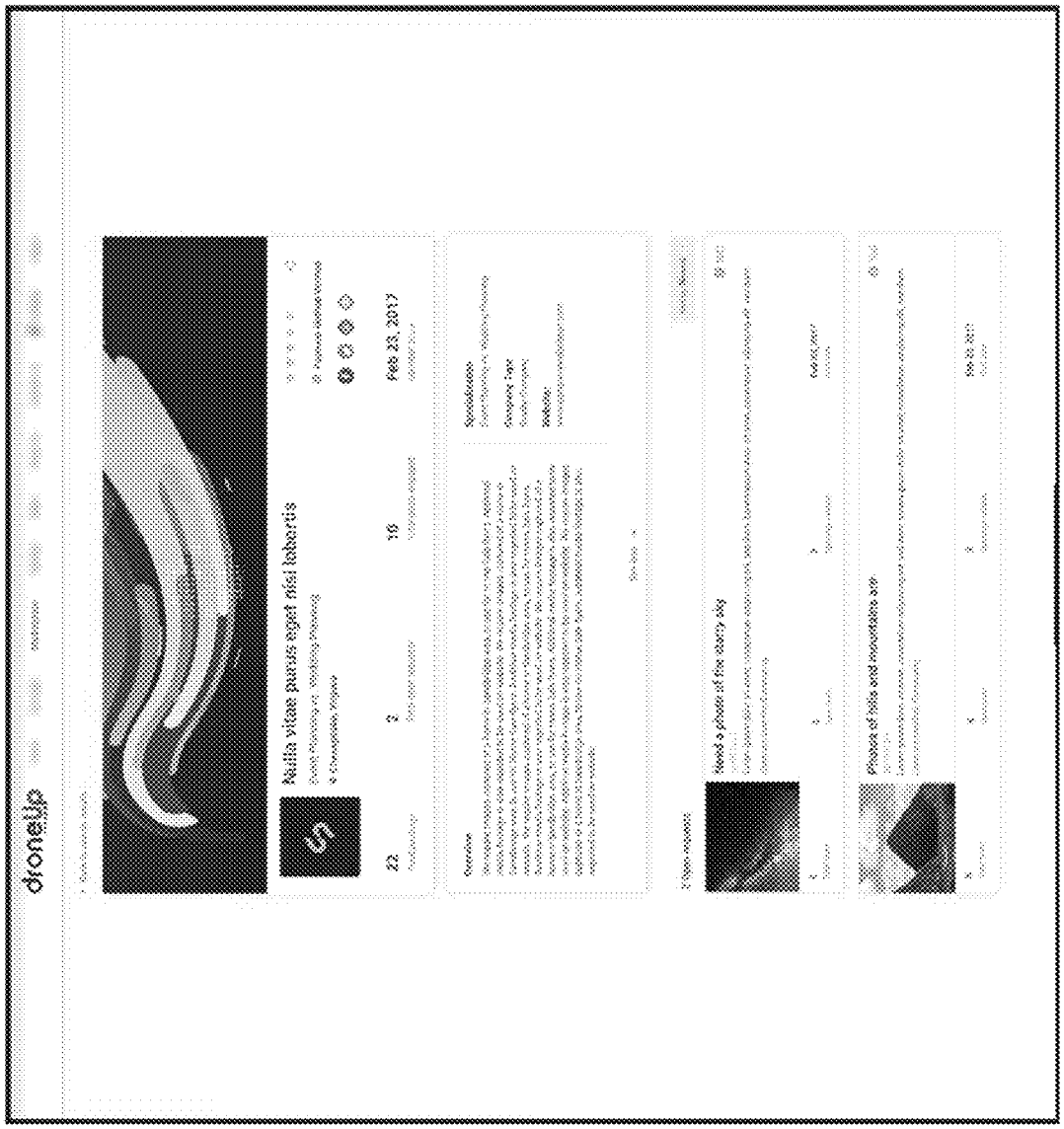
FIG. 64 is a web interface screenshot showing a company profile, viewable via an administrator view of a software application, according to an embodiment.

FIG. 60 is a web interface screenshot of a mission creation window showing view type selection option, viewable via an administrator view of a software application, according to an embodiment. FIG. 61 is a web interface screenshot of a mission creation window showing duplicate and delete options, viewable via an administrator view of a software application, according to an embodiment. FIG. 62 is a web interface screenshot showing mission requests, viewable via an administrator view of a software application, according to an embodiment. FIG. 63 is a web interface screenshot showing mission task location data, viewable via an administrator view of a software application, according to an embodiment. FIG. 64 is a web interface screenshot showing a company profile, viewable via an administrator view of a software application, according to an embodiment.

Figure 65:
FIG. 65 is a web interface screenshot showing a Marketplace search window, viewable via an administrator view of a software application, according to an embodiment.
Figure 67:
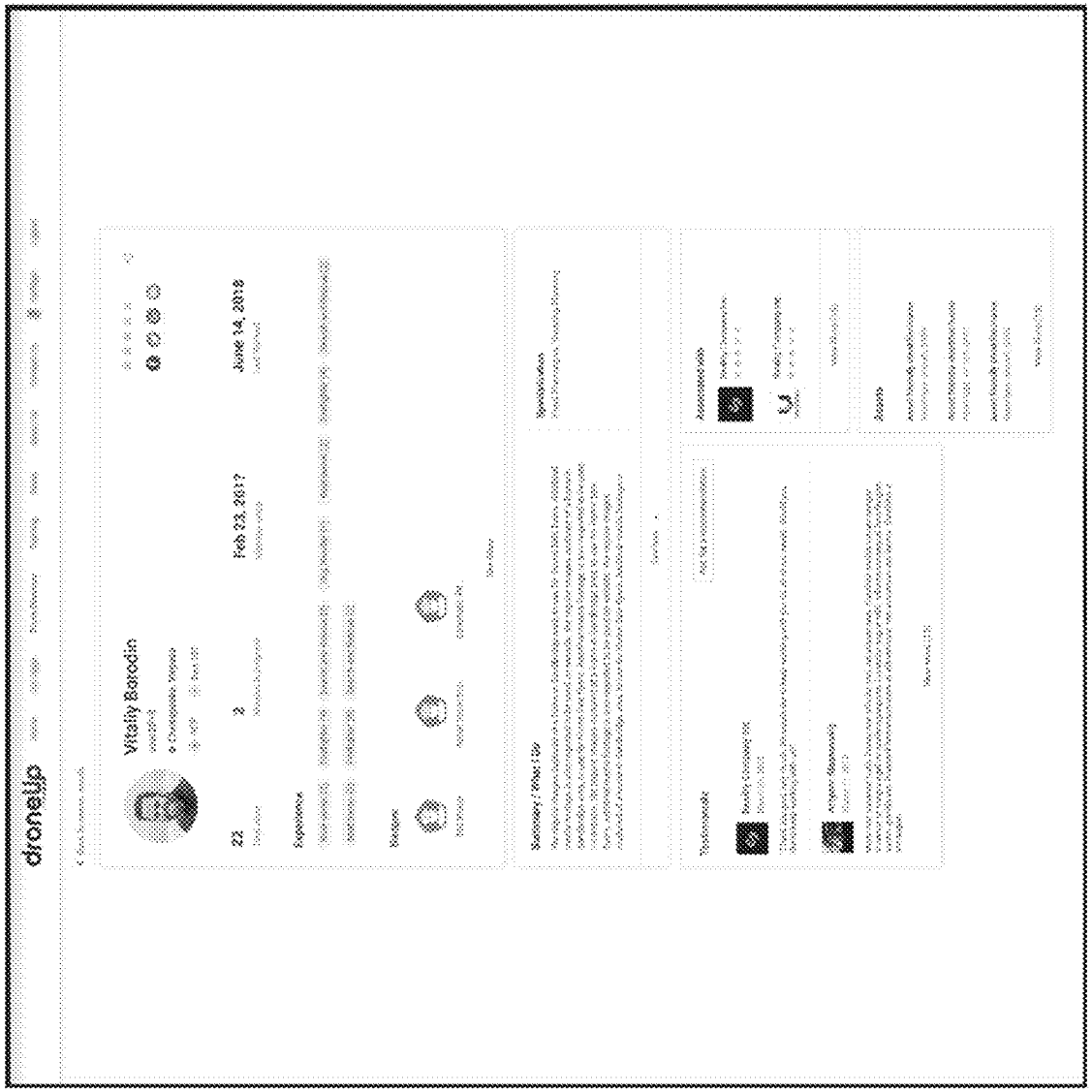
FIG. 67 is a web interface screenshot showing an asset pilot profile, viewable via an administrator view of a software application, according to an embodiment.

FIG. 65 is a web interface screenshot showing a Marketplace search window, viewable via an administrator view of a software application, according to an embodiment. FIG. 66 is a web interface screenshot showing a Marketplace request, viewable via an administrator view of a software application, according to an embodiment. FIG. 67 is a web interface screenshot showing an asset pilot profile, viewable via an administrator view of a software application, according to an embodiment. Although shown and described in FIGS. 29-67 to be rendered in a desktop format, in other implementations, the interfaces can instead be rendered on a mobile device.

Figure 68:
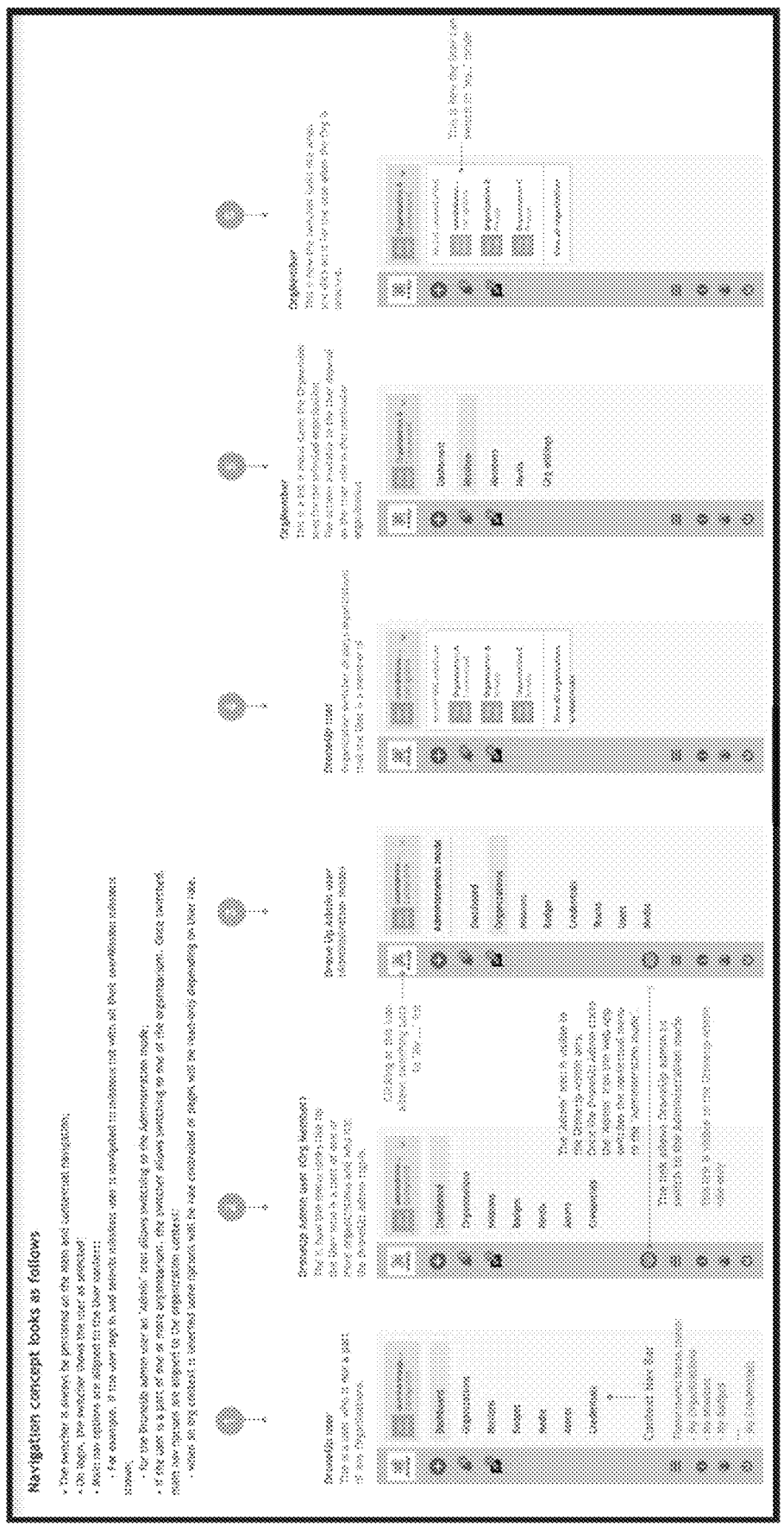
FIG. 68 is a diagram of various navigation options presented to different user types, including users (e.g., requestors), organization members (e.g., operators), and administrative members (i.e., administrators), viewable via an administrator view of a software application, according to an embodiment.

FIG. 68 is a diagram of various navigation options presented to different user types, including users (e.g., requestors), organization members (e.g., operators), and administrative members (i.e., administrators), viewable via an administrator view of a software application, according to an embodiment.

Figure 69:
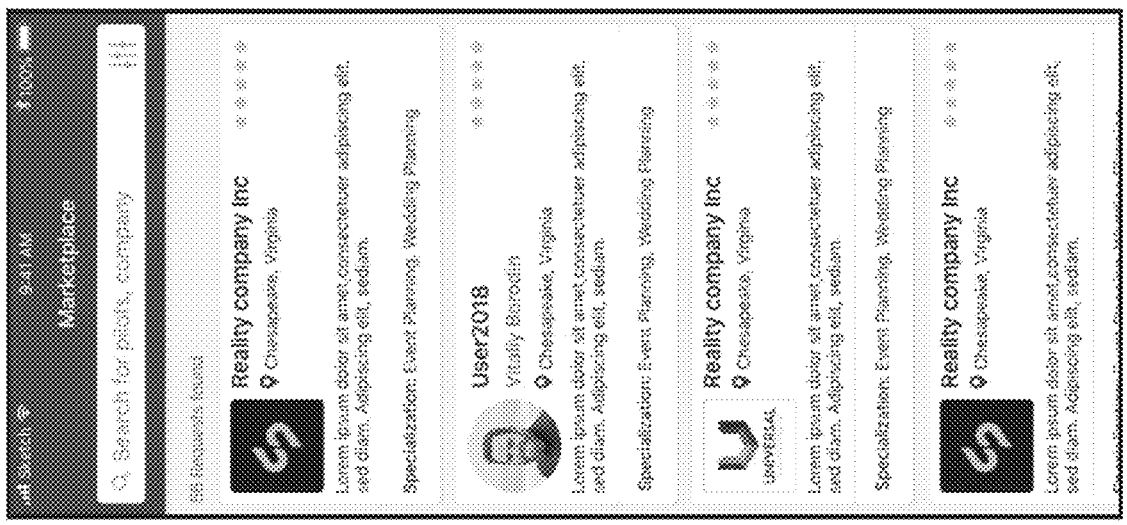
FIG. 69 is a mobile screenshot showing a marketplace, viewable via a requestor view of a software application, according to an embodiment.

FIG. 69 is a mobile screenshot showing a marketplace, viewable via a requestor view of a software application, according to an embodiment.

Figure 70:
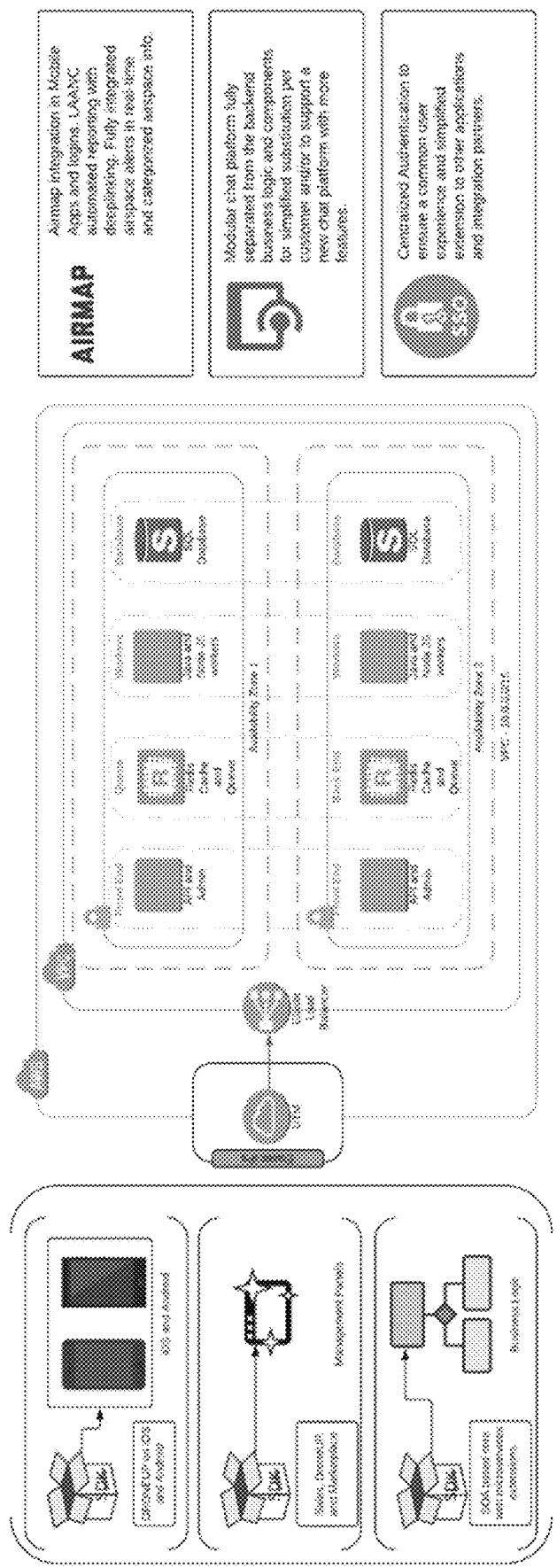
FIG. 70 is a diagram of a system architecture for implementing piloted aerial asset mission coordination, according to an embodiment.

FIG. 70 is a diagram of a system architecture for implementing piloted aerial asset mission coordination, according to an embodiment. As shown in FIG. 70, the left column represents the mobile app, the web app and the backend (similar to those described above with respect to FIG. 3). The center column represent various components of the infrastructure such as a virtual private cloud (VPC) that can be hosted, for example, by a third-party system such as Amazon Web Services (AWS), and served by an elastic load balancer, which can respond to demand in real time (or near real time). The availability zones show redundant resources, residing in different server farms within the datacenter of the third-party system. These redundant resources provide for greater reliability and prevent loss of availability if a loss of power or connectivity to one zone within the datacenter. The right column represent three examples of external services with which the infrastructure can interact.

In some embodiments, a system for coordinating multiplexed communications between a plurality of piloted assets and a plurality of mission participants using a command center (as a hub) and a common software application (or "platform") provides a detailed picture of operational UAV assets and locations in real-time or substantially in real-time. Using a unified operational environment (e.g., a common software application for all participants), UAV airspace management can be streamlined via cross-unit communication and control. System capabilities can include, but are not limited to, facilitation and verification of Federal Aviation Administration (FAA) drone certifications, drone flight management, first responder task assignment, dynamic geospatial visualization, public safety missions, and resource and volunteer management.

Depending upon the application/implementation, a system for coordinating multiplexed communications between a plurality of piloted assets and a plurality of mission participants can include one or more of:

A digital asset storage and delivery capability to facilitate the storage, distribution, transformation, and delivery of image, video and/or file content, for example to ensure that mission deliverables can be stored and delivered to a requestor;

A chat and voice communication capability to provide an encrypted chat and voice communications platform for interactions between web and mobile device users;

Administrative and user-level web management portals for mission provisioning, mission scheduling, participant location, participant communication, asset review, operator/pilot qualification, data generation, data configuration, and/or operator tool access;

Business logic/workflow processing

An event-driven queue and workflow system for managing geolocation services, mission/task provisioning, mission/task status tracking, alerting, interdependent and metadata-dependent task evaluation, and mission/task scheduling;

A database/cache persistence layer of both permanent data and transient data;

An application programming interface (API) to ensure communications capability between a database and a web services integration layer;

A streaming distribution capability for live streaming of channel-streamed media content;

A telemetry system for gathering of telemetry data for attribution, storage, and analysis;

An interactive training system for delivery of content as a task within the software application;

A single sign-on (SSO) capability for single source identity verification;

A geolocation monitoring capability for the periodic capture of location data, for use in mission/task assignments;

Multiple mobile devices as a primary means for user interaction and data collection;

Telemeters or other devices configured to produce telemetry data that can be connected to, or disconnected from, the mobile devices;

A channeled streaming capability for channelizing and provisioning video streaming services delivered, allocated, for example, by user and/or per task.

Figure 71:
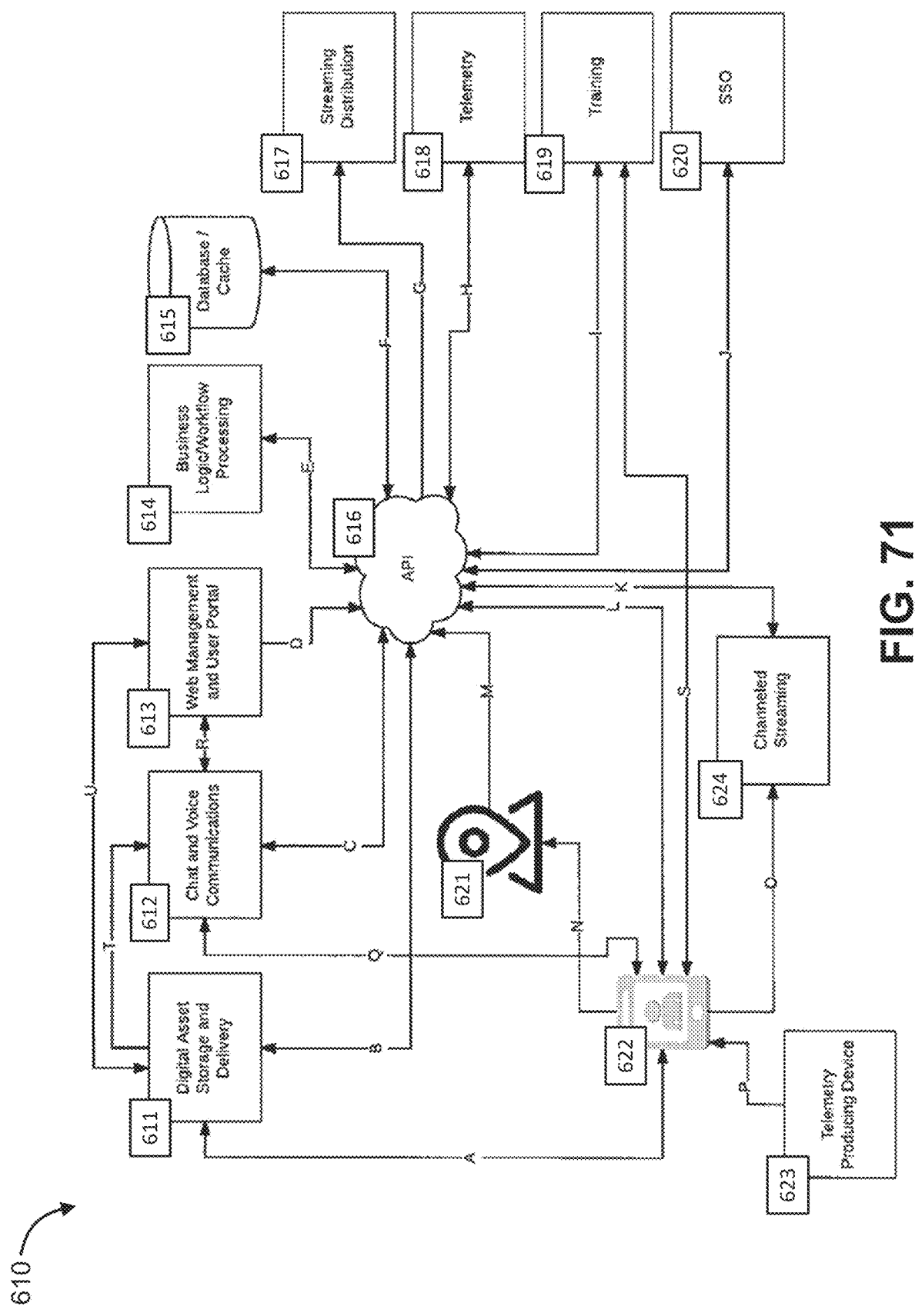
FIG. 71 is a block diagram of a system for piloted aerial asset mission coordination, according to an embodiment.

FIG. 71 is a block diagram of a system for piloted aerial asset mission coordination, according to an embodiment. As shown in FIG. 71, the system 610 includes a variety of disparate software components, each of which may reside within one or more of multiple different hardware components (e.g., geographically disperse from one another) that can communicate amongst themselves via a centralized API component 616. More specifically, the system 610 includes one or more digital asset storage and delivery components 611, one or more chat and voice communication components 612, a web management and user portal 613, business logic/workflow processing components 614, database 615, a streaming distribution components 617, telemetry components 618, a training module 619, SSO 620, a mobile device 622 and geolocation monitor 621, each able to communicate with one another via the centralized API component 616. The mobile device 622 is communicably coupled to the geolocation monitor 621, a telemetry producing device 623, the digital asset storage and delivery component 611, the chat and voice communication component 612, a channeled streaming component 624, and the training module 619. The digital asset storage and delivery component 611 is also communicably coupled directly to the chat and voice communication components 612 and the web management and user portal 613.

The various communication pathways available to the various components of system 610 are labelled with letters in FIG. 71. The mobile device 622 collects/generates digital assets, can render them via a GUI thereof, and sends signals encoding the digital asset files to the digital asset storage and delivery component 611 via communication pathway "A" between mobile device 622 and the digital asset storage and delivery component 611. The digital asset storage and delivery component 611, using communication pathway "B" between the digital asset storage and delivery component 611 and the centralized API component 616, coordinates the inventory, processing, sharing, setting of permissions for, and discovery of new digital assets. The provisioning, management, and permission setting for chat and voice communications is coordinated via communications between the centralized API component 616 and the chat and voice communication components 612, via communication pathway "C." The web management and user portal 613, in communication with the centralized API component 616 via communication pathway "D," can tie a web presentation layer to the API for configuration and user interaction. Communication pathway "E," between the business logic/workflow processing components 614 and the centralized API component 616, enables all of the business logic and workflow specifications to be available for use by the API, e.g., for service events within the system. Using communication pathway "F," the centralized API component 616 can access/retrieve both transient and long-term information from database 615, for use by the centralized API component 616. Communication pathway "G," between the centralized API component 616 and the streaming distribution component 617, allows for the provisioning of streaming distribution channels for delivering real time video. Communication pathway "H," between the centralized API component 616 and telemetry components 618, allows for the retrieval, by the mobile device 622, of web based telemetry data. Communication pathway "I," between the centralized API component 616 and the training module 619 facilitates communications pertaining to the enrollment, status, and delivery of training content. Communication pathway "J," between the centralized API component 616 and the SSO 620, facilitates communications pertaining to identity management, aggregation, and access management. Communication pathway "K," between the centralized API component 616 and the channeled streaming component 624, facilitates communications pertaining to requests for, and provisioning of, streaming channels for use by the streaming distribution component 617. Communication pathway "L," between the mobile device 622 and the mobile device 622, facilitates communications pertaining to task assignment, location evaluation, metadata evaluation, and status management. Communication pathway "M," between the geolocation monitor 621 and the centralized API component 616, facilitates communications pertaining to geolocation tracking and reporting for use by task and workflow. Communication pathway "N," between the mobile device 622 and the geolocation monitor 621, facilitates communications pertaining to geolocation reporting for comparison against the API for assignment of tasks. Communication pathway "O," between the mobile device 622 and the channeled streaming component 624, facilitates communications pertaining to the distribution of real time video into API created and defined channels. Communication pathway "P," between the telemetry producing device 623 and the mobile device 622, facilitates communications pertaining to the acceptance, processing, and delivery of telemetry data. Communication pathway "Q," between the mobile device 622 and the chat and voice communication component 612, and communication pathway "R," between the chat and voice communication component 612 and the web management and user portal 613, facilitate communications pertaining to instant messaging and voice communications between the mobile device 622 and web users or other mobile devices, respectively. Communication pathway "S," between the mobile device 622 and the training module 619, facilitates retrieval, by the mobile device 622, of training content from a training platform, and reporting of training progress for sending to the API 616. Communication pathway "T," between the digital asset storage and delivery component 611 and the chat and voice communication component 612, facilitates the delivery of shared assets to a chat platform for download, rendering and/or streaming. Communication pathway "U," between the digital asset storage and delivery component 611 and the user portal 613, facilitates communications pertaining to the upload, download, and management of digital assets including both standalone, task, and/or user generated digital assets.

In some embodiments, a system for the coordination of multiplexed communications among multiple piloted assets (including mission-enlisted piloted assets) and multiple mission participants is configured to track location information for each piloted asset from the multiple piloted assets and/or qualification information for operator/pilots associated with the multiple piloted assets. The system is also configured to provide mission and/or task assignments to the operator/pilots associated with the multiple piloted assets. Mission-related tasks can be "geo-centric" (i.e., associated with a defined geographic location or region), and the system can monitor both overlapping and non-overlapping assignment areas with full visibility. Since the operator/pilots associated with the multiple piloted assets can be assigned missions based on overlapping geographies, they can also opt in or out of participation. Once enlisted to a mission, the operator/pilots associated with the multiple piloted assets can collaborate with other mission participants by communicating mission-related information in real-time or substantially in real-time within an assigned airspace.

In some implementations, when an operator/pilot launches one or more associated piloted assets, the operator/pilot notifies other operator/pilots (whether enlisted to the same or a different mission/task) within a predetermined range of their flight plan and/or planned flight area, for example to ensure communication (e.g., via a common software application on associated mobile devices) within overlapping geographic coverage regions such that participant operator/pilots maintain awareness of each other's operations, avoid collisions, etc. When tasks are completed, deliverables can be provided to a centralized command center directly, via the common software application, and/or by uploading them to a web-based user portal. When all tasks of a mission have completed, deliverables can be packaged up, and a notice can be sent to the requester (e.g., using the common software application, via the centralized command center), thereby completing a mission cycle.

In some embodiments, an operator/pilot provides location updates (e.g., continually, intermittently, or according to a predefined schedule) to a centralized command center, so that the centralized command center can notify the operator/pilot of missions or tasks within their geographic area that the operator/pilot can be assigned to and, optionally, for which the operator/pilot is qualified (or "task eligible"). Task eligibility determinations can be made at the command center based on one or more of the operator/pilot's profile, metadata associated with the operator/pilot, in-system achievements, certifications, training history, provable flight history, and prior mission completion. An achievements module of the command center can automatically monitor and/or calculate task-eligibility statuses for operator/pilots, and provide updates (e.g., relating to task-eligibility changes or achievement thereof) to the operator/pilots. In some implementations, automated or manual telemetry data is used to determine experience and/or safe flight practices, each of which can influence task eligibility. Operator/pilots can be assigned "roles" within tasks, and the roles can be determined based on certification, experience, and/or assignment of the operator/pilots. The centralized command center can send notifications to the operator/pilots, for example to provide them with real-time instructions and/or task updates.

In some embodiments, a system for the coordination of multiplexed communications among multiple piloted assets and multiple mission participants automatically tracks location data (e.g., continuously) for the piloted assets and/or associated operator/pilots, assigns the piloted assets and/or associated operator/pilots to missions, monitors availability and/or qualification of piloted assets to perform a mission within a defined geographic area, and/or coordinates flight paths of the piloted assets, for example for collision avoidance. The system can generate and use metadata associated with piloted assets and/or associated operator/pilots, and perform filtering of data (e.g., when matching the piloted assets and/or associated operator/pilots to missions) based on the metadata. A command center of the system can be configured to define or generate geographical grids ("geo-grids"), corresponding to longitudinal and latitudinal subdivisions of a geographic region. The geo-grids can be used to determine grid locations of piloted assets and/or associated operator/pilots, and/or adjacency of piloted assets and/or associated operator/pilots. Real-time or substantially real-time notifications, generated based on the geo-grids, can be sent to mission participants. For example, a notification can include an indication that a piloted asset and/or associated operator/pilot has launched, has changed location, or has moved into a predefined geographic region (which may be associated with one or more missions). The combination of geo-grids and mission data can be used to provide a pre-planned and/or a real-time planned view of an airspace. In some implementations, the command center can generate predictions of operator/pilot behavior and refine projected flight areas by analyzing telemetry data received from mission participants, even in the absence of real-time telemetry feeds. Alternatively or in addition, predictions of operator/pilot behavior can be based on one or more of experience data, safe flight practices data, and training data associated with the operator/pilot under consideration. Such predictions can be used, for example, to improve collision avoidance. The system can also facilitate multiplexed communication, aggregation, and/or analysis, via the command center, of media files, for example via real-time or substantially real-time streaming. Real-time streaming makes it possible for the command center to maintain continuous situational awareness, and also facilitates remote viewing of the media being streamed. The media files can include high-resolution image assets or video assets. Using metadata associated with the media files and/or telemetry data received at the command center from the piloted assets, the command center can perform timeline-based analysis of missions.

In some embodiments, a system for the coordination of multiplexed communications among multiple piloted assets and multiple mission participants includes a centralized command center compute device that serves as a central hub, at which operators/pilots can be assigned to missions/tasks, for example based on their qualifications, qualifications of the piloted assets, and/or location data associated with the operator/pilots or their piloted assets, and from which the missions/tasks can be managed. Mission/task creation and assignments thereto can be performed at the command center via a web app interface of a common software application. Selection of operator/pilots for missions/tasks can be performed via the web app interface based on filtering for qualifications and/or activity history. In some instances, assigned missions/tasks can be completed based on operator/pilot interaction via operator interfaces of the common software application (e.g., via an operator view GUI interface of the common software application). Notifications of mission/task assignments can be sent to the relevant operator/pilots, for example in response to the mission/task being added, saved and/or updated at the command center. Such notifications can be sent in real-time or substantially in real-time. In some such implementations, in response to the assignment creation, a chat channel is automatically created, to provide a convenient interface for discussions between operator/pilots and, optionally, an administrator of the command center. Push notifications (e.g., from the command center to operator/pilot mobile devices) can also be sent via the chat channel. During a mission, mission data (e.g., deliverables, also referred to as "task assets") can be collected and uploaded to the command center via mobile device sharing across multiple channels, and/or via web app upload. The mission data can be tagged and stored in an assigned digital asset storage location, and upon completion of a mission or task, can be delivered to the requestor of the mission as a data package "deliverable" for their review. The deliverable can be delivered using one or multiple communication channels, for example as specified by a requestor, to ensure efficient delivery thereof. The common software application can be installed by operator/pilots on their associated mobile devices, and the common software application can be updated whenever the functionality thereof is modified or increased.

In some embodiments, operator/pilots are provided access, via the operator view of the common software application, to a map. The map can include indications of one or more of: known flying restrictions associated with the geographic area being displayed, known assignments in the geographic area, and information about other operator/pilots that have registered their flights, for example based on the proximity of the other operator/pilots to the location of the operator/pilot viewing the map.

In some embodiments, operator/pilots are provided access, via the operator view of the common software application, to an activities list, including one or more of:
all current assignments, including active assignments and assignments not yet accepted;
training materials, for example delivered via a custom content management system (CMS). New materials added to the CMS can be delivered to mobile devices of the operator/pilots via the common software application; and
drills, for example including a predefined set of actions to be performed and then analyzed to demonstrate the operator/pilot's ability to be assigned to a team and/or to mission/task assignments.

In some embodiments, an operator/pilot, when commencing a new mission, generates and sends a notification to the command center, which in turn can begin tracking the location of the piloted asset associated with the operator/pilot such that real-time or substantially real-time status updates of the piloted asset position and/or assignment status can be actively monitored. The location information can also be provided, via the command center, to other operator/pilots, for example based on a proximity setting of the flight status of the other operator/pilots, for examples to improve airspace/flight safety. During a mission, piloted asset assignments can be monitored, for example to ensure compliance with airspace regulations, or to ensure that the piloted asset and/or operator/pilot's qualifications are still a match to the mission/task. If an airspace advisory issues or changes during a mission, or if a connectivity issue (e.g., interruption or degradation) arises, a warning or alert can be sent from the command center to a participant operator/pilot's mobile device, to advise the operator/pilot of the advisory and/or to instruct suspension of the flight. Operator/pilot and/or piloted asset status updates (i.e., "participant status updates") can be sent from a mobile device of the operator/pilot, via the common software application, to a backend of the command center. Receipt of participant status updates at the command center can trigger, for example, one or more of: the generation of requests to update one or more mission-related assignments, the sending of notifications to mobile devices of other operator/pilots (e.g., other participant operator/pilots), and/or updating a status of the assignment.

An example entity relationship diagram is submitted herewith as Appendix B, setting forth example relationships between entities. Any of the relationships of Appendix B can be incorporated, in any combination thereof (including subsets), into a variety of embodiments. Additional example implementation details for the systems and methods of the present disclosure are set forth in Appendices C and D.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

In conclusion, among other things, an apparatus and method for synchronizing media signals using a compute device are described. While various embodiments have been described above, it should be understood that they have been presented by way of example only and various changes in form and details may be made. For example, processors and/or modules of a compute device can included on separate electronic boards in one or more housings, can have dedicated memory (RAM etc.).

The invention claimed is:

1. A method, comprising:
receiving, at a compute device, an indication of a location of at least one of an asset pilot or an aerial drone asset associated with the asset pilot; matching the location to a characteristic of a mission,
the matching based on a geographic area associated with the mission and a geographic area associated with the location;
operating, at the compute device, multiplexed communications among the asset pilot and an entity associated with the mission, by:
receiving signals including first mission-related data from a communication device of the entity via at least one communication channel from a first subset of communication channels from a plurality of communication channels; and
sending signals including the first mission-related data to a communication device of the asset pilot via at least one communication channel from a second subset of communication channels from the plurality of communication channels; and
providing information to at least one of the communication device of the asset pilot or the communication device of the entity, wherein a second mission-related data is sent from the communication device of the asset pilot and received by the communication device of the entity, during the mission and after providing the information.

2. The method of claim 1, further comprising:
receiving, at the compute device, a plurality of enrollment requests including an enrollment request for the asset pilot, each enrollment request from the plurality of enrollment requests including a mission identifier from a plurality of mission identifiers, the matching including filtering the plurality of enrollment requests based on the plurality of mission identifiers.

3. The method of claim 1, wherein the entity is a first entity, the mission is a first mission, the first mission-related data is associated with the first mission and sent during a first time period, and the method further comprising:
storing data indicating that the asset pilot is mission-enlisted for a second mission;
receiving a third mission-related data from the communication device of the asset pilot, the third mission-related data associated with the second mission; and
sending the third mission-related data to a communication device of a second entity during a second time period that overlaps with the first time period, the second entity associated with the second mission and not associated with the first mission.

4. The method of claim 1, wherein the matching the location to the characteristic of the mission is based on a taxonomy, the taxonomy having tabular data including (1) representations of capabilities and (2) associations between the asset pilot and the capabilities.

5. The method of claim 1, wherein:
the entity is an administrator requestor,
operating, at the compute device, multiplexed communications among the asset pilot and the entity associated with the mission, includes operating by:
receiving signals including the second mission-related data from the communication device of the asset pilot via at least one communication channel from the second subset of communication channels from the plurality of communication channels; and sending signals including the second mission-related data to the communication device of the entity via at least one communication channel from the first subset of communications channels from the plurality of communication channels, the second mission-related data is received in response to associated inputs via an administrator requestor view of a software application that is hosted at the compute device;

the matching the location to the characteristic of the mission is performed in response to associated inputs via the administrator requestor view of the software application; and the receiving the signals including the first mission-related data is received in response to associated inputs via an operator view of the software application.

6. The method of claim 1, further comprising:
receiving, at the compute device, a plurality of enrollment requests including an enrollment request for the asset pilot, the enrollment request for the asset pilot includes an indication of a credential of the asset pilot,
the matching including filtering the plurality of enrollment requests based on the credential.

7. The method of claim 1, further comprising:
sending live feed data associated with the aerial drone asset to the communication device of the entity.

8. A method, comprising:
receiving, at a compute device, an indication of a location of an asset pilot or a aerial drone asset associated with the asset pilot; matching the location to a characteristic of a mission;
operating, at the compute device, multiplexed communications among the asset pilot and an entity associated with the mission, by:
receiving signals including first mission-related data from a communication device of the entity via at least one communication channel from a first subset of communication channels from a plurality of communication channels; and
sending signals including the first mission-related data to a communication device of the asset pilot via at least one communication channel from a second subset of communication channels from the plurality of communication channels; and
providing information to at least one of the communication device of the asset pilot or the communication device of the entity, wherein a second mission-related data is sent from the communication device of the asset pilot and received by the communication device of the entity, during the mission and after providing the information.

9. The method of claim 8, further comprising:
receiving, at the compute device, a plurality of enrollment requests including an enrollment request for the asset pilot, each enrollment request from the plurality of enrollment requests includes a mission identifier,
the matching including filtering the plurality of enrollment requests based on the mission identifier.

10. The method of claim 8, wherein the entity is a first entity, the mission is a first mission, the first mission-related data is associated with the first mission and sent during a first time period, and the method further comprising:
storing data indicating that the asset pilot is mission-enlisted for a second mission;

receiving a third mission-related data from the communication device of the asset pilot, the third mission-related data associated with the second mission; and
sending the third mission-related data to a communication device of a second entity during a second time period that overlaps with the first time period, the second entity associated with the second mission and not associated with the first mission.

11. The method of claim 8, wherein the matching each of the location to the characteristic of the mission is based on a taxonomy, the taxonomy including tabular data including (1) representations of capabilities and (2) associations between the first asset pilot and the capabilities.

12. The method of claim 8, wherein:
the entity is an administrator requestor,
operating, at the compute device, multiplexed communications among the asset pilot and the entity associated with the mission, includes operating by:
receiving signals including the second mission-related data from the communication device of the asset pilot via at least one communication channel from the second subset of communication channels from the plurality of communication channels; and
sending signals including the second mission-related data to the entity via at least one communication channel from the first subset of communication channels from the plurality of communication channels,
the second mission-related data is received in response to associated inputs via an administrator requestor view of a software application that is hosted at the compute device;
the matching the location to the characteristic of the mission is performed in response to associated inputs via the administrator requestor view of the software application; and
the receiving the signals including the first mission-related data is in response to associated inputs via an operator view of the software application.

13. The method of claim 8, further comprising:
receiving, at a compute device, a plurality of enrollment requests including an enrollment request for the asset pilot, the enrollment request for the asset pilot includes an indication of a credential of the asset pilot,
the matching including filtering the plurality of enrollment requests based on the credential.

14. The method of claim 8, further comprising:
sending live feed data associated with the aerial drone asset to the communication device of the entity.

15. A method, comprising:
receiving, at a compute device, an indication of a location of an asset pilot or an aerial drone asset associated with the asset pilot;
matching the location to a characteristic of a mission; and
operating, at the compute device, multiplexed communications among the first asset pilot and an entity associated with the mission, by:
receiving signals including first mission-related data from a communication device of the asset pilot via at least one communication channel from a first subset of communication channels from a plurality of communication channels;
sending signals including the first mission-related data to a communication device of the entity via at least one communication channel from a second subset of communication channels from the plurality of communication channels;

receiving signals including a second mission-related data from the communication device of the entity via at least one communication channel from the second subset of communication channels from the plurality of communication channels; and sending a signal including the second mission-related data to the first asset pilot via at least one communication channel from the first subset of communication channels from the plurality of communication channels.

16. The method of claim 15, further comprising:

receiving, at the compute device, a plurality of enrollment requests including an enrollment request for the asset pilot, each enrollment request from the plurality of enrollment requests includes a mission identifier, the matching including filtering the plurality of enrollment requests based on the mission identifier.

17. The method of claim 15, wherein the entity is a first entity, the mission is a first mission, the first mission-related data associated with the first mission and sent during a first time period, and the method further comprising:

storing data indicating that the asset pilot is mission-enlisted for a second mission;

receiving a third mission-related data from the communication device of the asset pilot, the third mission-related data associated with the second mission; and sending the third mission-related data to a communication device of a second entity during a second time period that overlaps with the first time period, the second entity associated with the second mission and not associated with the first mission.

18. The method of claim 15, wherein the matching the location to the characteristic of the mission is based on a taxonomy, the taxonomy having tabular data including (1) representations of capabilities and (2) associations between the asset pilot and the capabilities.

19. The method of claim 16, wherein:

the entity is an administrator requestor, the second mission-related data is received in response to associated inputs via an administrator requestor view of a software application that is hosted at the compute device, the matching the location to the characteristic of the mission is performed in response to associated inputs via the administrator requestor view of the software application, and the receiving the enrollment request for the asset pilot and the receiving the signals including the first mission-related data are received in response to associated inputs via an operator view of the software application.

20. The method of claim 15, further comprising:

receiving, at the compute device, a plurality of enrollment requests including an enrollment request for the asset pilot, the enrollment request for the asset pilot including an indication of a credential of the asset pilot, the matching including filtering the plurality of enrollment requests based on the credential.

21. The method of claim 15, further comprising:

sending live feed data associated with the aerial drone asset to the communication device of the entity.

* * * * *

UNITED STATES PATENT AND TRADEMARK OFFICE
CERTIFICATE OF CORRECTION

PATENT NO. : 11,631,336 B1
APPLICATION NO. : 17/712680
DATED : April 18, 2023
INVENTOR(S) : Thomas Walker et al.

Page 1 of 1

It is certified that error appears in the above-identified patent and that said Letters Patent is hereby corrected as shown below:

In the Claims

At Column 29, Claim number 8, Line number 32, "a aerial" should read --an aerial--

At Column 30, Claim number 11, Line number 9, "the matching each of" should read --matching--

At Column 30, Claim number 11, Line number 13, "the first asset pilot" should read --the asset pilot--

At Column 30, Claim number 15, Line number 56, "the first asset pilot" should read --the asset pilot--

At Column 31, Claim number 15, Line number 7, "the first asset pilot" should read --the asset pilot--

Signed and Sealed this
Second Day of January, 2024

Katherine Kelly Vidal
*Director of the United States Patent and Trademark Office*